United States Patent
Sakumoto et al.

(10) Patent No.: US 10,020,945 B2
(45) Date of Patent: Jul. 10, 2018

(54) INFORMATION PROCESSING APPARATUS AND TO EFFICIENTLY SUBSTITUTE COEFFICIENTS OF A MULTIVARIATE POLYNOMIAL

(75) Inventors: Koichi Sakumoto, Tokyo (JP); Taizo Shirai, Kanagawa (JP); Harunaga Hiwatari, Kanagawa (JP); Kazuya Kamio, Tokyo (JP)

(73) Assignee: SONY CORPORATION, Tokyo (JP)

( * ) Notice: Subject to any disclaimer, the term of this patent is extended or adjusted under 35 U.S.C. 154(b) by 96 days.

(21) Appl. No.: 14/239,861

(22) PCT Filed: Aug. 14, 2012

(86) PCT No.: PCT/JP2012/070675
§ 371 (c)(1),
(2), (4) Date: Feb. 20, 2014

(87) PCT Pub. No.: WO2013/031533
PCT Pub. Date: Mar. 7, 2013

(65) Prior Publication Data
US 2014/0215222 A1    Jul. 31, 2014

(30) Foreign Application Priority Data

Aug. 29, 2011 (JP) ................. 2011-185947
Mar. 2, 2012 (JP) ................. 2012-046687

(51) Int. Cl.
H04L 29/06 (2006.01)
H04L 9/32 (2006.01)
H04L 9/30 (2006.01)

(52) U.S. Cl.
CPC .......... H04L 9/3247 (2013.01); H04L 9/3093 (2013.01); H04L 9/3252 (2013.01)

(58) Field of Classification Search
None
See application file for complete search history.

(56) References Cited

U.S. PATENT DOCUMENTS 7,961,876 B2 *   6/2011   Ding .................... H04L 9/3093
                                                              380/255
8,019,079 B2 *   9/2011   Delgosha ............. H04L 9/3093
                                                              380/30

(Continued)

FOREIGN PATENT DOCUMENTS

JP    2004-15891 A    6/2004
JP    2009-533705 A   9/2009

OTHER PUBLICATIONS

Computer Desktop Encyclopedia definition of "processor": http://lookup.computerlanguage.com/host_app/search?cid=C999999&term=processor&lookup.x=0&lookup.y=0.*

(Continued)

*Primary Examiner* — Jeremiah Avery
(74) *Attorney, Agent, or Firm* — Chip Law Group

(57) ABSTRACT

Provided an information processing apparatus including a number generation unit configured to generate numbers used in coefficients of terms included in a pair of multi-order multivariate polynomials $F=(f1, \ldots, fm)$, using a predetermined function, from information shared between entities executing an algorithm of a public-key authentication scheme or a digital signature scheme that uses a public key including the pair of multi-order multivariate polynomials F, and an allocation unit configured to allocate the numbers generated by the number generation unit to the coefficients of the multi-order multivariate polynomials for which the pair of multi-order multivariate polynomials F are included in constituent elements.

19 Claims, 25 Drawing Sheets

(56) References Cited

U.S. PATENT DOCUMENTS

| | | | | | |
|---|---|---|---|---|---|
| 8,433,912 | B2* | 4/2013 | Sakumoto | ............ | H04L 9/3093 380/30 |
| 8,958,560 | B2* | 2/2015 | Kipnis | ................. | H04L 9/3073 380/255 |
| 2002/0027986 | A1* | 3/2002 | Brekne | ................ | H04L 9/3073 380/28 |
| 2002/0095581 | A1* | 7/2002 | Imai | ..................... | H04L 9/3247 713/180 |
| 2005/0271203 | A1* | 12/2005 | Akiyama | ............. | H04L 9/3093 380/30 |
| 2008/0013716 | A1* | 1/2008 | Ding | .................... | H04L 9/3093 380/30 |
| 2009/0010428 | A1* | 1/2009 | Delgosha | ............. | H04L 9/3093 380/30 |
| 2009/0279693 | A1* | 11/2009 | Billet | ...................... | G06F 7/584 380/28 |
| 2010/0027210 | A1* | 2/2010 | Tamura | ................... | G06F 1/185 361/679.31 |
| 2010/0111296 | A1* | 5/2010 | Brown | ................. | H04L 9/0643 380/28 |
| 2012/0027210 | A1* | 2/2012 | Takeuchi | ............. | H04L 9/0861 380/255 |

OTHER PUBLICATIONS

Newman, Harvey et al. The UltraLight Project: The Network as an Integrated and Managed Resource for Data-Intensive Science. Computing in Science & Engineering. vol. 7, Issue: 6. Pub. Date: 2005. http://ieeexplore.ieee.org/stamp.jsp?tp=&arnumber=1524857.*

Safavi-Naini, Reihaneh; Jiang, Shaoquan. Unconditionally Secure Conference Key Distribution: Security Definitions and Their Relations. 2008 46th Annual Allerton Conference on Communication, Control, and Computing. Pub. Date: 2008. http://ieeexplore.ieee.org/stamp/stamp.jsp?tp=&arnumber=4797698.*

Koichi Sakumoto et al, "Public-Key Identification Schemes Based on Multivariate Quadratic Polynomials", Aug. 14, 2011, Advances in Communication Networking: 20th EUNICE/IFIP EG 6.2, 6.6 International Workshop, Rennes, France, Sep. 1-5, 2014, Revised Selected Papers; Springer Verlag, pp. 706-723, XP019161037, ISSN: 0302-9743, Germany.

Akpodigha Filatei, et al, "Implementation techniques for fast polynomial arithmetic in a highlevel programming environment", Jul. 9, 2006, pp. 93-100, ISSAC 2006, vol. ACM 1-59593-276-3/06/0007, XP040043579, Genova, Italy.

Come Berbain, et al., "Efficient Implementations of Multivariate Quadratic Systems", Aug. 17, 2006. pp. 174-187, Selected Areas in Cryptography; Springer Berlin Heidelberg, XP019098542, ISBN: 978-3-540-74461-0, Heidelberg, Berlin.

Extended European Search Report for Application No. EP12826899.2 dated Apr. 17, 2015.

International Search report dated Sep. 25, 2012 in PCT/JP2012/070675.

Koichi Sakumoto et al., "Public-Key Identification Schemes Based on Multivariate Quadratic Polynomials", Advances in Cryptology—CRYPTO 2011, 31st Annual Cryptology Conference, vol. 6841, Aug. 14-18, 2011, pp. 706-723 and Cover page.

Come Berbain et al., "Efficient Implementations of Multivariate Quadratic Systems", Selected Areas in Cryptography, 13$^{th}$ International Workshop, vol. 4356, Aug. 17-18, 2006, pp. 174-187 and Cover page.

Koichi Sakutomo et al., "Public-Key Identification Schemes Based on Multivariate Quadratic Polynomials", [online], URL:http://www.iacr.org/cryptodb/archive/2011/CRYPTO/presentation/13-1-Sakumoto.pdf, retrieved Sep. 5, 2012, 19 pages.

Jacques Patarin, "Asymmetric Cryptography with a Hidden Monomial", Crypto 1996, pp. 45-60.

Jacques Patarin, "Quartz, 128-Bit Long Digital Signatures", In Naccache, D., Ed. Topics in Cryptology—CT-RSA 2001, vol. 2020 of Lecture Notes in Computer Science, Springer-Verlag., pp. 282-297.

Office Action received for Japanese Patent Application No. 2012-046687, dated May 10, 2016, 7 Pages of Office Action.

Koichi Sakumoto et al., "Public-Key Identificatino Schemes Based on Multivariate Quadratic Polynomials", Advances in Cryptology—Crypto 2011, Sony Corporation Japan, International Association for Cryptology Research, vol. 6841, 2011, pp. 22.

Anna Inn-Tung Chen et al., "SSE Implementation of Multivariate PKCs on Modern x86 CPUs", International Association for Cryptologic Research, vol. 5747, 2009, pp. 17.

Darrell Hankerson et al., "Guide to Elliptic Curve Cryptography", Springer-Verlag, New York, Inc., 2004, p. 21.

Come Berbain et al, "Efficient Implementations of Multivariate Quadratic Systems,", France Telecom R&D., Springer-Verlag Berlin Heidelberg 2007, p. 15.

* cited by examiner

PUBLIC-KEY AUTHENTICATION SCHEME

DIGITAL SIGNATURE SCHEME

EXAMPLE OF HASH FUNCTION STRUCTURE

NORMAL MOUNTING METHOD
(DIGITAL SIGNATURE SCHEME BASED ON 3-PASS SCHEME)

FIG. 17

EXTRACTION METHOD #1

(UNIFORM RANDOM NUMBERS OF M BINARY SYMBOLS)
$X_{2M}$: 0110110010101100010 ··· 0101100100

⇩

(2-BIT GROUPING: 2 BINARY SYMBOLS → 1 TERNARY SYMBOL)

01 | 10 | 11 | 00 | 10 | 10 | 11 | 00 | 10 | ··· | 01 | 01 | 10 | 01 | 00
‖   ‖   ‖   ‖   ‖   ‖   ‖   ‖   ‖         ‖   ‖   ‖   ‖   ‖
$X_{22}$: 1   2   ×   0   1   2   ×   0   2         1   1   2   1   0
                ↑               ↑
            $X_{22} > 2$     $X_{22} > 2$
            IS EXCLUDED     IS EXCLUDED

FIG. 18

EXTRACTION METHOD #2

(UNIFORM RANDOM NUMBERS OF M BINARY SYMBOLS)
$X_{2M}$: 0110110010101100010 ··· 0101100100

⇩

(NO GROUPING: M BINARY SYMBOLS → L TERNARY SYMBOLS)
$X_{2M}$: 0110110010101100010 ··· 0101100100
                       ↑
            $X_{2M} > 3^L$ IS EXCLUDED

EXTRACTION METHOD #3

(UNIFORM RANDOM NUMBERS OF M BINARY SYMBOLS)
$X_{2M}$ : 011011001010110010 ⋯ 0101100100

⇩

(k-BIT GROUPING: k BINARY SYMBOLS → L TERNARY SYMBOLS)
01101 | 10010 | 10110 | 010 ⋯ | 01011 | 00100

$=$
$X_{2k}$

↑

$X_{2k} > 3^L$ IS EXCLUDED

ADDITIONAL EXTRACTION METHOD

FIG. 22

STRUCTURING TECHNIQUE #1 (APPLIED TO F)

$$F(x_1, \cdots, x_N) = \begin{cases} \sum_{I,J} a_{1IJ} x_I x_J + \sum_I b_{1I} x_I = y_1 \\ \quad\quad\quad\quad\quad\quad \vdots \\ \sum_{I,J} a_{MIJ} x_I x_J + \sum_I b_{MI} x_I = y_M \end{cases}$$

DATA STRUCTURE A     DATA STRUCTURE B

FIG. 23

STRUCTURING TECHNIQUE #1 (APPLIED TO G)

$$G(x_1, \cdots, x_N, y_1, \cdots, y_N) = \begin{cases} \sum_{I,J} (a_{1IJ} + a_{1JI}) x_I y_J = z_1 \\ \quad\quad\quad \vdots \\ \sum_{I,J} (a_{MIJ} + a_{MJI}) x_I y_J = z_M \end{cases}$$

↑
DATA STRUCTURE

FIG. 24

STRUCTURING TECHNIQUE #1 (APPLIED TO CUBIC F)

$$F(x_1, \cdots, x_N) = \begin{cases} \sum_{IJL} a_{1IJL} x_I x_J x_L + \sum_{IJ} b_{1IJ} x_I x_J + \sum_{I} c_{1I} x_I = y_1 \\ \vdots \\ \sum_{IJL} a_{MIJL} x_I x_J x_L + \sum_{IJ} b_{MIJ} x_I x_J + \sum_{I} c_{MI} x_I = y_M \end{cases}$$

DATA STRUCTURE A    DATA STRUCTURE B    DATA STRUCTURE C

FIG. 25

STRUCTURING TECHNIQUE #1 (APPLIED TO CUBIC $G_x$)

$$G_x(x_1,\ldots,x_N,y_1,\ldots,y_N) = \underbrace{\sum_{IJL}(a_{1IJL}+a_{1ILJ}+a_{1LJI})y_Iy_Jx_L}_{\text{DATA STRUCTURE A}} + \cdots + \sum_{IJL}(a_{MIJL}+a_{MILJ}+a_{MLJI})y_Iy_Jx_L + \underbrace{\sum_{IJ}(b_{1IJ}+b_{1JI})x_Iy_J}_{\text{DATA STRUCTURE B}} = z_1$$

$$\cdots \sum_{IJ}(b_{MIJ}+b_{MJI})x_Iy_J = z_N$$

FIG. 26

STRUCTURING TECHNIQUE #1 (APPLIED TO CUBIC $G_y$)

$$G_y(x_1,\ldots,x_N,y_1,\ldots,y_N) = \underbrace{\sum_{IJL}(a_{1IJL}+a_{1ILJ}+a_{1LJI})x_Ix_Jy_L = z_1}_{} \cdots \underbrace{\sum_{IJL}(a_{MIJL}+a_{MILJ}+a_{MLJI})x_Ix_Jy_L = z_N}_{}$$

← DATA STRUCTURE

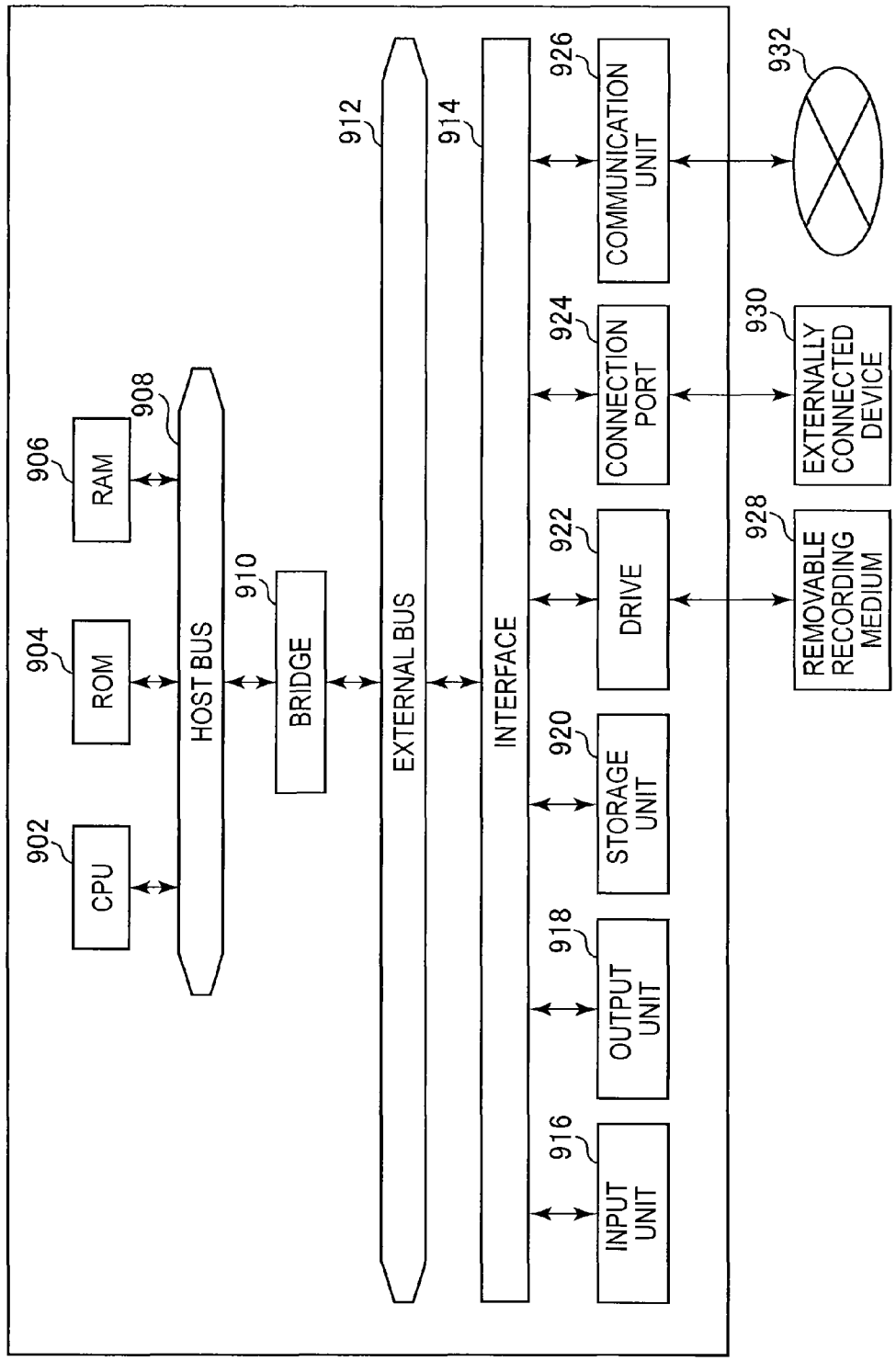

US 10,020,945 B2

INFORMATION PROCESSING APPARATUS AND TO EFFICIENTLY SUBSTITUTE COEFFICIENTS OF A MULTIVARIATE POLYNOMIAL

TECHNICAL FIELD

The present technology relates to an information processing apparatus, an information processing method, and a program.

BACKGROUND ART

With the rapid development of information processing technologies and communication technologies, documents have been digitized rapidly regardless of whether the documents are public or private. With the digitization of such documents, many individuals and companies have a considerable interest in security management of electronic documents. Countermeasures against tampering acts such as wiretapping or forgery of electronic documents have been actively studied in various fields in response to an increase in this interest. Regarding the wiretapping of electronic documents, security is ensured, for example, by encrypting the electronic documents. Further, regarding the forgery of electronic documents, security is ensured, for example, by using digital signatures. However, when the encryption or the digital signature to be used does not have high tampering resistance, sufficient security is not ensured.

The digital signature is used for specifying the author of an electronic document. Accordingly, the digital signature should be able to be generated only by the author of the electronic document. If a malicious third party is able to generate the same digital signature, such third party can impersonate the author of the electronic document. That is, an electronic document is forged by the malicious third party. Various opinions have been expressed regarding the security of the digital signature to prevent such forgery. As digital signature schemes that are currently widely used, a RSA signature scheme and a DSA signature scheme are known, for example.

The RSA signature scheme takes "difficulty of prime factorisation of a large composite number (hereinafter, prime factorisation problem)" as a basis for security. Also, the DSA signature scheme takes "difficulty of solving discrete logarithm problem" as a basis for security. These bases are based on that algorithms that efficiently solve the prime factorisation problem and the discrete logarithm problem by using a classical computer do not exist. That is, the difficulties mentioned above suggest the computational difficulty of a classical computer. However, it is said that solutions to the prime factorisation problem and the discrete logarithm problem can be efficiently calculated when a quantum computer is used.

Similarly to the RSA signature scheme and the DSA signature scheme, many of the digital signature schemes and public-key authentication schemes that are currently used also take difficulty of the prime factorisation problem or the discrete logarithm problem as a basis for security. Thus, if the quantum computer is put to practical use, security of such digital signature schemes and public-key authentication schemes will not be ensured. Accordingly, realizing new digital signature schemes and public-key authentication schemes is desired that take as a basis for security a problem different from problems such as the prime factorisation problem and the discrete logarithm problem that can be easily solved by the quantum computer. As a problem which is not easily solved by the quantum computer, there is a problem related to a multivariate polynomial, for example.

For example, as digital signature schemes that take the multivariate polynomial problem as a basis for security, those based on Matsumoto-Imai (MI) cryptography, Hidden Field Equation (HFE) cryptography, Oil-Vinegar (OV) signature scheme, and Tamed Transformation Method (TTM) cryptography are known. For example, a digital signature scheme based on the HFE is disclosed in the following non-patent literatures 1 and 2.

CITATION LIST

Non-Patent Literature

Non-Patent Literature 1: Jacques Patarin, Asymmetric Cryptography with a Hidden Monomial, CRYPTO 1996, pp. 45-60

Non-Patent Literature 2: Patarin, J., Courtois, N., and Goubin, L., QUARTZ, 128-Bit Long Digital Signatures, In Naccache, D., Ed. Topics in Cryptology—CT-RSA 2001 (San Francisco, Calif., USA, April 2001), vol. 2020 of Lecture Notes in Computer Science, Springer-Verlag., pp. 282-297.

SUMMARY OF INVENTION

Technical Problem

As described above, the multivariate polynomial problem is an example of a problem called NP-hard problem which is difficult to solve even when using the quantum computer. Normally, a public-key authentication scheme that uses the multivariate polynomial problem typified by the HFE or the like uses a multi-order multivariate simultaneous equation with a special trapdoor. For example, a multi-order multivariate simultaneous equation $F(x_1, \ldots, x_n)=y$ related to $x_1, \ldots, x_n$, and linear transformations A and B are provided, and the linear transformations A and B are secretly managed. In this case, the multi-order multivariate simultaneous equation F and the linear transformations A and B are the trapdoors.

An entity that knows the trapdoors F, A, and B can solve an equation $B(F(A(x_1, \ldots, x_n)))=y'$ related to $x_1, \ldots, x_n$. On the other hand, the equation $B(F(A(x_1, \ldots, x_n)))=y'$ related to $x_1, \ldots, x_n$ is not solved by an entity that does not know the trapdoors F, A, and B. By using this mechanism, a public-key authentication scheme and a digital signature scheme that take the difficulty of solving a multi-order multivariate simultaneous equation as a basis for security can be realized.

As mentioned above, in order to realize the public-key authentication scheme or the digital signature scheme, it is necessary to prepare a special multi-order multivariate simultaneous equation satisfying $B(F(A(x_1, \ldots, x_n)))=y$. Further, at the time of the signature generation, it is necessary to solve the multi-order multivariate simultaneous equation F. For this reason, the available multi-order multivariate simultaneous equation F has been limited to relatively easily soluble equations. That is, in the past schemes, only a multi-order multivariate simultaneous equation $B(F(A(x_1, \ldots, x_n)))=y$ of a combined form of three functions (trapdoors) B, F, and A that can be relatively easily solved has been used, and thus it is difficult to ensure sufficient security.

Accordingly, in light of the above-mentioned circumstances, the inventors of the specification have devised a public-key authentication scheme and a digital signature scheme that are efficient and highly secure using multi-order multivariate simultaneous equations that lack a means of efficient solving (trapdoors) (Koichi Sakumoto, Taizo Shirai and Harunaga Hiwatari, "Public-Key Identification Schemes Based on Multivariate Quadratic Polynomials", CRYPTO 2011, LNCS 6841, pp. 706 to 723, 2011.).

However, multivariate polynomials used in the public-key authentication scheme and the digital signature scheme have many coefficients. Thus, to use a multivariate polynomial as a public key, it is necessary to determine a method of efficiently allocating coefficients between a prover and a verifier. The present technology is devised to provide a novel and improved information processing apparatus, a novel and improved information processing method, and a novel and improved program capable of efficiently substituting coefficients of a multivariate polynomial.

Solution to Problem

According to an embodiment of the present technology, there is provided an information processing apparatus including a number generation unit configured to generate numbers used in coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F, and an allocation unit configured to allocate the numbers generated by the number generation unit to the coefficients of the multi-order multivariate polynomials for which the pair of multi-order multivariate polynomials F are included in constituent elements. The allocation unit groups the coefficients of the terms having an identical kind of combination of variables among the coefficients of the multi-order multivariate polynomials for which the pair of multi-order multivariate polynomials F are included in the constituent elements and executes an allocation process in units of groups.

According to another embodiment of the present technology, there is provided an information processing apparatus including a number generation unit configured to generate numbers used in coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F, and an allocation unit configured to allocate the numbers generated by the number generation unit to the coefficients of the multi-order multivariate polynomials for which the pair of multi-order multivariate polynomials F are included in constituent elements. The allocation unit groups a coefficient matrix in each row or column when the multi-order multivariate polynomials for which the pair of multi-order multivariate polynomials F are included in the constituent elements are expressed in a quadratic form, and the allocation unit executes an allocation process in units of groups.

According to another embodiment of the present technology, there is provided an information processing apparatus including a number generation unit configured to generate an identical number of numbers with a number of coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F, and an allocation unit configured to allocate the numbers generated by the number generation unit to the coefficients of the multi-order multivariate polynomials for which the pair of multi-order multivariate polynomials F are included in constituent elements, in a sequence determined in advance between the prover and the verifier.

According to another embodiment of the present technology, there is provided an information processing method including a step of generating numbers used in coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F, and a step of allocating the generated numbers to the coefficients of the multi-order multivariate polynomials for which the pair of multi-order multivariate polynomials F are included in constituent elements. In the step of allocating the numbers, the coefficients of the terms having an identical kind of combination of variables are grouped among the coefficients of the multi-order multivariate polynomials for which the pair of multi-order multivariate polynomials F are included in the constituent elements and an allocation process is executed in units of groups.

According to another embodiment of the present technology, there is provided an information processing method including a step of generating numbers used in coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F, and a step of allocating the generated numbers to the coefficients of the multi-order multivariate polynomials for which the pair of multi-order multivariate polynomials F are included in constituent elements. In the step of allocating the numbers, a coefficient matrix is grouped in each row or column when the multi-order multivariate polynomials for which the pair of multi-order multivariate polynomials F are included in the constituent elements are expressed in a quadratic form, and an allocation process is executed in units of groups.

According to another embodiment of the present technology, there is provided an information processing method including a step of generating an identical number of numbers with a number of coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F, and a step of allocating the numbers generated by the number generation unit to the coefficients of the multi-order multivariate polynomials for which the pair of multi-order multivariate polynomials F are included in constituent elements, in a sequence determined in advance between the prover and the verifier.

According to another embodiment of the present technology, there is provided a program causing a computer to realize a number generation function of generating numbers used in coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F, and an allocation function of allocating the numbers generated by the number generation function to the coefficients of the multi-order multivariate polynomials for which the pair of multi-order multivariate polynomials F are included in constituent elements. The allocation function groups the coefficients of the terms having an identical kind of combination of variables among the coefficients of the multi-order multivariate polynomials for which the pair of multi-order multivariate polynomials F are included in the constituent elements and executes an allocation process in units of groups.

According to another embodiment of the present technology, there is provided a program causing a computer to realize a number generation function of generating numbers used in coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F, and an allocation function of allocating the numbers generated by the number generation function to the coefficients of the multi-order multivariate polynomials for which the pair of multi-order multivariate polynomials F are included in constituent elements. The allocation function groups a coefficient matrix in each row or column when the multi-order multivariate polynomials for which the pair of multi-order multivariate polynomials F are included in the constituent elements are expressed in a quadratic form, and the allocation function executes an allocation process in units of groups.

According to another embodiment of the present technology, there is provided a program causing a computer to realize a number generation function of generating an identical number of numbers with a number of coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F, and an allocation function of allocating the numbers generated by the number generation unit to the coefficients of the multi-order multivariate polynomials for which the pair of multi-order multivariate polynomials F are included in constituent elements, in a sequence determined in advance between the prover and the verifier.

According to another embodiment of the present technology, there is provided a computer-readable recording medium configured to record the above-described program.

Advantageous Effects of Invention

According to the present technology described above, it is possible to efficiently substitute coefficients of a multivariate polynomial.

BRIEF DESCRIPTION OF DRAWINGS

FIG. 17 is an explanatory diagram for describing a method (extraction method #1) of extracting ternary random numbers from binary random numbers.

FIG. 18 is an explanatory diagram for describing a method (extraction method #2) of extracting ternary random numbers from binary random numbers.

FIG. 22 is an explanatory diagram for describing a data structuring technique (structuring technique #1) for efficiently substituting coefficients of a multivariate polynomial.

FIG. 23 is an explanatory diagram for describing a data structuring technique (structuring technique #1) for efficiently substituting coefficients of a multivariate polynomial.

FIG. 24 is an explanatory diagram for describing a data structuring technique (structuring technique #1) for efficiently substituting coefficients of a multivariate polynomial.

FIG. 25 is an explanatory diagram for describing a data structuring technique (structuring technique #1) for efficiently substituting coefficients of a multivariate polynomial.

FIG. 26 is an explanatory diagram for describing a data structuring technique (structuring technique #1) for efficiently substituting coefficients of a multivariate polynomial.

FIG. 28 is an explanatory diagram for describing a hardware configuration example of an information processing apparatus capable of executing the algorithm according to each embodiment of the present technology.

DESCRIPTION OF EMBODIMENTS

Figure 1:
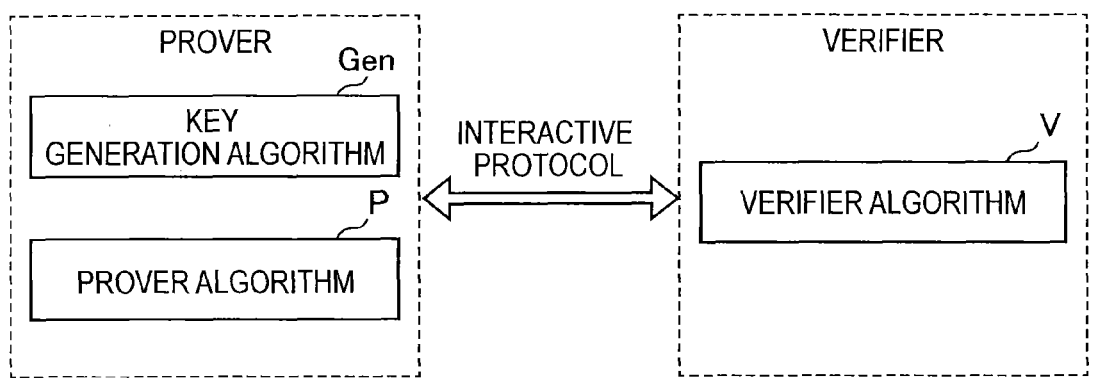
FIG. 1 is an explanatory diagram for describing an algorithm structure related to a public-key authentication scheme.

Hereinafter, preferred embodiments of the present invention will be described in detail with reference to the appended drawings. Note that, in this specification and the drawings, elements that have substantially the same function and structure are denoted with the same reference signs, and repeated explanation is omitted.

[Flow of Description]

Here, a flow of the description of embodiments of the present technology to be made below will be briefly described. First, an algorithm structure of a public-key authentication scheme will be described with reference to FIG. 1. Next, an algorithm structure of a digital signature scheme will be described with reference to FIG. 2. Next, an n-pass public-key authentication scheme will be described with reference to FIG. 3.

Next, an example of an algorithm structure related to a 3-pass public-key authentication scheme will be described with reference to FIGS. 4 to 6. Next, an example of an algorithm structure related to a 5-pass public-key authentication scheme will be described with reference to FIGS. 7 to 9. Next, a method of modifying the efficient algorithms related to the 3-pass and 5-pass public-key authentication schemes into algorithms of the digital signature scheme will be described with reference to FIGS. 10 to 11.

Next, methods of reducing a memory amount necessary for signature verification at the time of execution of the algorithms of the digital signature scheme related to the embodiments herein will be described with reference to FIGS. 12 to 16. Next, methods of efficiently extracting ternary random numbers from binary random numbers will be described with reference to FIGS. 17 to 21. Next, methods of efficiently substituting coefficients of the multivariate polynomials will be described with reference to FIGS. 22 to 27. Next, a hardware configuration example of an information processing apparatus capable of realizing each algorithm according to the embodiments of the present technology will be described with reference to FIG. 28. Finally, a summary of the technical spirit of the embodiments herein and operational advantageous effects obtained from the technical spirit will be described in brief.

(Detailed Articles)
1. Introduction
　1-1: Algorithm of Public-Key Authentication Scheme
　1-2: Algorithms for Digital Signature Scheme
　1-3: N-pass Public-key Authentication Scheme
2. Algorithm Structures Related to 3-pass Public-key Authentication Scheme
　2-1: Example of Specific Algorithm Structure
　2-2: Example of Parallelized Algorithm Structure
　2-3: Example of Algorithm Structure Based on Cubic Multivariate Polynomial
3: Algorithm Structure Related to 5-pass Public-key Authentication Scheme
　3-1: Example of Specific Algorithm Structure
　3-2: Example of Parallelized Algorithm Structure
　3-3: Example of Algorithm Structure Based on Cubic Multivariate Polynomial
4: Modification of Digital Signature Scheme
　4-1: Modification of 3-pass Public-key Authentication Scheme into Digital Signature Scheme
　4-2: Modification of 5-pass Public-key Authentication Scheme into Digital Signature Scheme
5: Method of Reducing Memory Amount Necessary for Signature Verification
　5-1: Structure of Hash Function
　5-2: Example of Application to Digital Signature Scheme Based on 3-pass Scheme
　5-3: Example of Application to Digital Signature Scheme Based on 5-pass Scheme
6: Method of Extracting Ternary Random Number Sequence from Binary Random Number Sequence
　6-1: Extraction Method #1 (2-bit Grouping)
　6-2: Extraction Method #2 (No Grouping)
　6-3: Extraction Method #3 (k-bit Grouping)
　　6-3-1: Basic Structure
　　6-3-2: Additional Extraction Method
7: Method of Efficiently Substituting Coefficients of Multivariate Polynomials
　7-1: Basic Determination
　7-2: Structuring of Data
　　7-2-1: Structuring Technique #1
　　7-2-2: Structuring Technique #2
　　7-2-3: Structuring Technique #3
8: Example of Hardware Configuration
9: Summary

1. INTRODUCTION

The embodiments herein relate to a public-key authentication scheme and a digital signature scheme that base their safety on the difficulty of solving multi-order multivariate simultaneous equations. However, the embodiments herein differ from techniques of the related art such as HFE digital signature schemes, and relate to a public-key authentication scheme and a digital signature scheme that utilize multi-order multivariate simultaneous equations that lack a means of efficient solving (trapdoors). First, algorithms for a public-key authentication scheme, algorithms for a digital signature scheme, and an n-pass public-key authentication scheme will be briefly summarized.

[1-1: Algorithm of Public-Key Authentication Scheme]

First, an overview of algorithm of a public-key authentication scheme will be described with reference to FIG. 1. FIG. 1 is an explanatory diagram for describing an algorithm structure of a public key authentication scheme.

A public key authentication is used when a person (prover) convinces another person (verifier) that she is the prover herself by using a public key pk and a secret key sk. For example, a public key $pk_A$ of a prover A is made known to the verifier B. On the other hand, a secret key $sk_A$ of the prover A is secretly managed by the prover A. According to the public key authentication scheme, a person who knows the secret key $sk_A$ corresponding to the public key $pk_A$ is regarded as the prover A herself.

In order for the prover A to prove to the verifier B that she is the prover A herself using the public-key authentication setup, the prover A, via a interactive protocol, presents proof to the verifier B indicating that she knows the secret key $sk_A$ corresponding to the public key $pk_A$. The proof indicating the prover A knows the secret key $sk_A$ is then presented to verifier B, and in the case where the verifier B is able to confirm that proof, the validity of the prover A (the fact that the prover A is herself) is proven.

However, a public-key authentication setup demands the following conditions in order to ensure safety.

The first condition is "to lower as much as possible the probability of falsification being established, at the time the interactive protocol is performed, by a falsifier not having the secret key sk". That this first condition is satisfied is called "soundness." In other words, the soundness means that "falsification is not established during the execution of an interactive protocol by a falsifier not having the secret key sk with a non-negligible probability". The second condition is that, "even if the interactive protocol is performed, information on the secret key $sk_A$ of the prover A is not at all leaked to the verifier B". That this second condition is satisfied is called "zero knowledge."

Conducting public-key authentication safely involves using an interactive protocol exhibiting both soundness and zero-knowledge. If an authentication process were hypothetically conducted using an interactive protocol lacking soundness and zero-knowledge, there would be a definite chance of false verification and a definite chance of the divulgence of secret key information, and thus the validity of the prover would not be proven even if the process itself is completed successfully. Consequently, the question of how to ensure the soundness and zero-knowledge of a session protocol is important.

(Model)

In a model of the public key authentication scheme, two entities, namely a prover and a verifier, are present, as shown in FIG. 1. The prover generates a pair of public key pk and secret key sk unique to the prover by using a key generation algorithm Gen. Then, the prover performs an interactive protocol with the verifier by using the pair of secret key sk and public key pk generated by using the key generation algorithm Gen. At this time, the prover performs the interactive protocol by using a prover algorithm P. As described above, in the interactive protocol, the prover proves to the verifier, by using the prover algorithm P, that she possesses the secret key sk.

On the other hand, the verifier performs the interactive protocol by using a verifier algorithm V, and verifies whether or not the prover possesses the secret key corresponding to the public key that the prover has published. That is, the verifier is an entity that verifies whether or not a prover possesses a secret key corresponding to a public key. As described, a model of the public-key authentication scheme is configured from two entities, namely the prover and the verifier, and three algorithms, namely the key generation algorithm Gen, the prover algorithm P and the verifier algorithm V.

Additionally, expressions "prover" and "verifier" are used in the following description, but these expressions strictly mean entities. Therefore, the subject that performs the key generation algorithm Gen and the prover algorithm P is an information processing apparatus corresponding to the entity "prover". Similarly, the subject that performs the verifier algorithm V is an information processing apparatus. The hardware configuration of these information processing apparatuses is as shown in FIG. 28, for example. That is, the key generation algorithm Gen, the prover algorithm P, and the verifier algorithm V are performed by a CPU 902 based on a program recorded on a ROM 904, a RAM 906, a storage unit 920, a removable recording medium 928, or the like.

(Key Generation Algorithm Gen)

The key generation algorithm Gen is used by a prover. The key generation algorithm Gen is an algorithm for generating a pair of public key pk and secret key sk unique to the prover. The public key pk generated by the key generation algorithm Gen is published. Furthermore, the published public key pk is used by the verifier. On the other hand, the secret key sk generated by the key generation algorithm Gen is secretly managed by the prover. The secret key sk that is secretly managed by the prover is used to prove to the verifier of possession of the secret key sk corresponding to the public key pk by the prover. Formally, the key generation algorithm Gen is represented as formula (1) below as an algorithm that takes security parameter $1\lambda$ ($\lambda$ is an integer of 0 or more) as an input and outputs the secret key sk and the public key pk.

[Math 1]

$$(sk, pk) \leftarrow Gen(1^\lambda) \qquad (1)$$

(Prover Algorithm P)

The prover algorithm P is used by a prover. The prover algorithm P is an algorithm for proving to the verifier that the prover possesses the secret key sk corresponding to the public key pk. In other words, the prover algorithm P is an algorithm that takes the public key pk and the secret key sk as inputs and performs the interactive protocol.

(Verifier Algorithm V)

The verifier algorithm V is used by the verifier. The verifier algorithm V is an algorithm that verifies whether or not the prover possesses the secret key sk corresponding to the public key pk during the session protocol. The verifier algorithm V is an algorithm that accepts a public key pk as input, and outputs 0 or 1 (1 bit) according to the execution results of the session protocol. At this point, the verifier decides that the prover is invalid in the case where the verifier algorithm V outputs 0, and decides that the prover is valid in the case where the verifier algorithm V outputs 1. Formally, the verifier algorithm V is expressed as in the following formula (2).

[Math 2]

$$0/1 \leftarrow V(pk) \qquad (2)$$

As above, realizing meaningful public-key authentication involves having the interactive protocol satisfy the two conditions of soundness and zero-knowledge. However, proving that the prover possesses the secret key sk involves the prover executing a procedure dependent on the secret key sk, and after notifying the verifier of the result, causing the verifier to execute verification based on the content of the notification. The procedure dependent on the secret key sk is executed to ensure soundness. At the same time, no information about the secret key sk should be revealed to the verifier. For this reason, the above key generation algorithm Gen, prover algorithm P, and verifier algorithm V are skillfully designed to satisfy these requirements.

The foregoing thus summarizes the algorithms in a public-key authentication scheme.

[1-2: Algorithms for Digital Signature Scheme]

Figure 2:
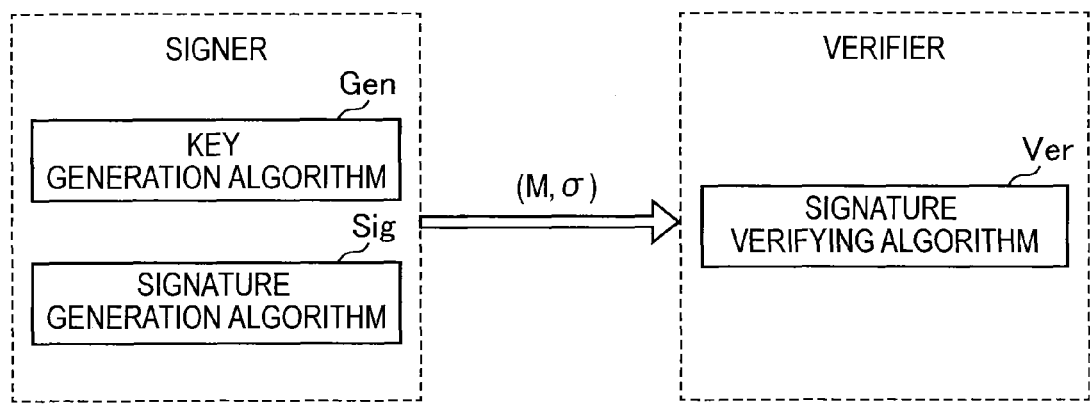
FIG. 2 is an explanatory diagram for describing an algorithm structure related to a digital signature scheme.

Next, algorithms for a digital signature scheme will be summarized with reference to FIG. 2. FIG. 2 is an explanatory diagram summarizing algorithms for a digital signature scheme.

Unlike paper documents, it is not possible to physically sign or affix a seal to digitized data. For this reason, proving the creator of digitized data involves an electronic setup yielding effects similarly to physically signing or affixing a seal to a paper document. This setup is digital signatures. A digital signature refers to a setup that associates given data with signature data known only to the creator of the data, provides the signature data to a recipient, and verifies that signature data on the recipient's end.

(Model)

As illustrated in FIG. 2, the two identities of signer and verifier exist in a model of a digital signature scheme. In addition, the model of a digital signature scheme is made up of three algorithms: a key generation algorithm Gen, a signature generation algorithm Sig, and a signature verifying algorithm Ver.

The signer uses the key generation algorithm Gen to generate a paired signature key sk and verification key pk unique to the signer. The signer also uses the signature generation algorithm Sig to generate a digital signature q to attach to a message M. In other words, the signer is an entity that attaches a digital signature to a message M. Meanwhile, the verifier uses the signature verifying algorithm Ver to verify the digital signature attached to the message M. In other words, the verifier is an entity that verifies the digital signature q in order to confirm whether or not the creator of the message M is the signer.

Note that although the terms "signer" and "verifier" are used in the description hereinafter, these terms ultimately mean entities. Consequently, the agent that executes the key generation algorithm Gen and the signature generation algorithm Sig is an information processing apparatus corresponding to the "signer" entity. Similarly, the agent that executes the signature verifying algorithm Ver is an information processing apparatus. The hardware configuration of these information processing apparatus is as illustrated in FIG. 28, for example. In other words, the key generation algorithm Gen, the signature generation algorithm Sig, and the signature verifying algorithm Ver are executed by a device such as a CPU 902 on the basis of a program recorded onto a device such as ROM 904, RAM 906, a storage unit 920, or a removable recording medium 928.

(Key Generation Algorithm Gen)

The key generation algorithm Gen is used by the signer. The key generation algorithm Gen is an algorithm that generates a paired signature key sk and verification key pk unique to the signer. The verification key pk generated by the key generation algorithm Gen is made public. Meanwhile, the signer keeps the signature key sk generated by the key generation algorithm Gen a secret. The signature key sk is then used to generate digital signature q to attach to a message M. For example, the key generation algorithm Gen accepts a security parameter $1^p$ (where p is an integer equal to or greater than 0) as input, and outputs a signature key sk and a verification key pk. In this case, the key generation algorithm Gen may be expressed formally as in the following formula (3).

[Math 3]

$$(sk, pk) \leftarrow Gen(1^\lambda) \quad (3)$$

(Signature Generation Algorithm Sig)

The signature generation algorithm Sig is used by the signer. The signature generation algorithm Sig is an algorithm that generates a digital signature q to be attached to a message M. The signature generation algorithm Sig is an algorithm that accepts a signature key sk and a message M as input, and outputs a digital signature q. The signature generation algorithm Sig may be expressed formally as in the following formula (4).

[Math 4]

$$\sigma \leftarrow Sig(sk, M) \quad (4)$$

(Signature Verifying Algorithm Ver)

The signature verifying algorithm Ver is used by the verifier. The signature verifying algorithm Ver is an algorithm that verifies whether or not the digital signature q is a valid digital signature for the message M. The signature verifying algorithm Ver is an algorithm that accepts a signer's verification key pk, a message M, and a digital signature q as input, and outputs 0 or 1 (1 bit). The signature verifying algorithm Ver may be expressed formally as in the following formula (5). At this point, the verifier decides that the digital signature q is invalid in the case where the signature verifying algorithm Ver outputs 0 (the case where the verification key pk rejects the message M and the digital signature q), and decides that the digital signature q is valid in the case where the signature verifying algorithm Ver outputs 1 (the case where the verification key pk accepts the message M and the digital signature q).

[Math 5]

$$0/1 \leftarrow Ver(pk, M, \sigma) \quad (5)$$

The foregoing thus summarizes the algorithms in a digital signature scheme.

[1-3: N-Pass Public-Key Authentication Scheme]

Figure 3:
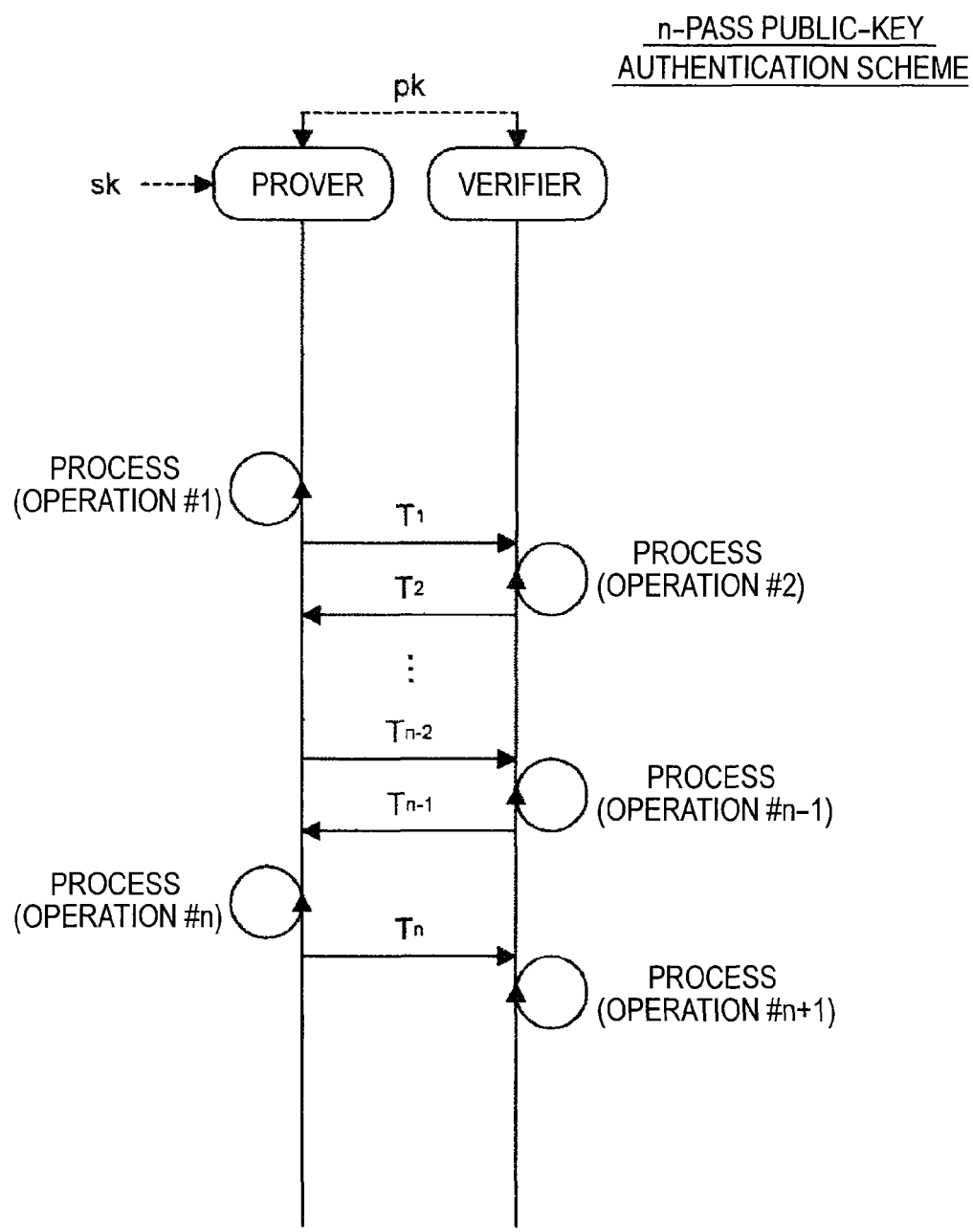
FIG. 3 is an explanatory diagram for describing an algorithm structure related to an n-pass public-key authentication scheme.

Next, an n-pass public-key authentication scheme will be described with reference to FIG. 3. FIG. 3 is an explanatory diagram illustrating an n-pass public-key authentication scheme.

As above, a public-key authentication scheme is an authentication scheme that proves to a verifier that a prover possesses a secret key sk corresponding to a public key pk during an interactive protocol. In addition, the interactive protocol has to satisfy the two conditions of soundness and zero-knowledge. For this reason, during the interactive protocol both the prover and the verifier exchange information n times while executing respective processes, as illustrated in FIG. 3.

In the case of an n-pass public-key authentication scheme, the prover executes a process using the prover algorithm P (operation #1), and transmits information $T_1$ to the verifier. Subsequently, the verifier executes a process using the verifier algorithm V (operation #2), and transmits information $T_2$ to the prover. This execution and processes and transmission of information $T_k$ is successively conducted for k=3 to n, and lastly, a process (operation #n+1) is executed. Transmitting and receiving information n times in this way is thus called an "n-pass" public-key authentication scheme.

The foregoing thus describes an n-pass public-key authentication scheme.

2. ALGORITHM STRUCTURES RELATED TO 3-PASS PUBLIC-KEY AUTHENTICATION SCHEME

Hereinafter, algorithms related to a 3-pass public-key authentication scheme will be described. Note that in the following description, a 3-pass public-key authentication scheme may also be referred to as a "3-pass scheme" in some cases.

[2-1: Example of Specific Algorithm Structure (FIG. 4)]

Figure 4:
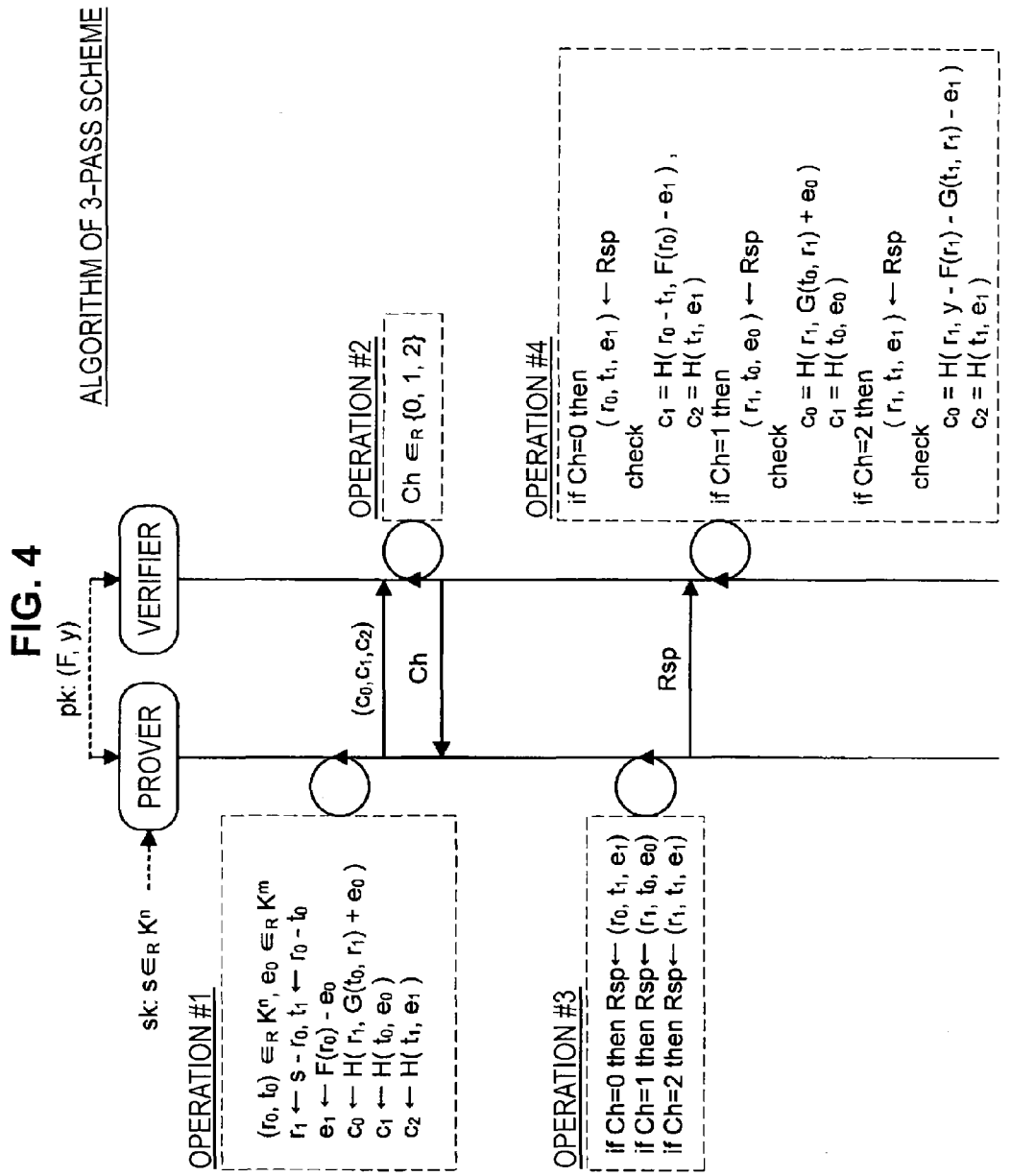
FIG. 4 is an explanatory diagram for describing an efficient algorithm related to a 3-pass public-key authentication scheme.

First, an example of a specific algorithm structure related to the 3-pass scheme will be introduced with reference to FIG. 4. FIG. 4 is an explanatory diagram for describing a specific algorithm structure related to the 3-pass scheme. Here, a case in which a pair of quadratic polynomials $(f_1(x), \ldots, f_m(x))$ are used as a part of the public key pk will be described. Here, a quadratic polynomial $f_1(x)$ is assumed to be expressed as in the following formula (6). Also, a vector $(x_1, \ldots, x_n)$ is represented as x and a pair of quadratic multivariate polynomials $(f_1(x), \ldots, f_m(x))$ are represented as multivariate polynomials F(x).

[Math 6]
$$f_i(x_1, \ldots, x_n) = \sum_{j,k} a_{ijk} x_j x_k + \sum_j b_{ij} x_j \quad (6)$$

Also, the pair of quadratic polynomials $(f_1(x), \ldots, f_m(x))$ can be expressed as in the following formula (7). Also, $A_1, \ldots, A_m$ is an n×n matrix. Further, each of $b_1, \ldots, b_m$ is an n×1 vector.

[Math 7]
$$F(x) = \begin{pmatrix} f_1(x) \\ \vdots \\ f_m(x) \end{pmatrix} = \begin{pmatrix} x^T A_1 x + b_1^T x \\ \vdots \\ x^T A_m x + b_m^T x \end{pmatrix} \quad (7)$$

When this expression is used, a multivariate polynomial F can be expressed as in the following formula (8) and formula (9). From the following formula (10), it can easily be confirmed that this expression is satisfied.

[Math 8]
$$F(x+y) = F(x) + F(y) + G(x, y) \quad (8)$$

$$G(x+y) = \begin{pmatrix} y^T(A_1^T + A_1)x \\ \vdots \\ y^T(A_m^T + A_m)x \end{pmatrix} \quad (9)$$

$$\begin{aligned} f_l(x+y) &= (x+y)^T A_l(x+y) + b_l^T(x+y) \quad (10) \\ &= x^T A_l x + x^T A_l y + y^T A_l x + y^T A_l y + b_l^T x + b_l^T y \\ &= f_l(x) + f_l(y) + x^T A_l y + y^T A_l x \\ &= f_l(x) + f_l(y) + x^T (A_l^T)^T y + y^T A_l x \\ &= f_l(x) + f_l(y) + (A_l^T x)^T y + y^T A_l x \\ &= f_l(x) + f_l(y) + y^T (A_l^T x) + y^T A_l x \\ &= f_l(x) + f_l(y) + y^T (A_l^T + A_l)x \end{aligned}$$

When dividing F(x+y) into a first portion dependent on x, a second portion dependent on y, and a third portion dependent on both x and y in this way, the term G(x, y) corresponding to the third portion becomes bilinear with respect to x and y. Hereinafter, the term G(x, y) is also referred to as a bilinear term. Using this property enables the construction of an efficient algorithm.

For example, use the vector $t_0$ that is an element of the set $K^n$ and the vector $e_0$ that is an element of the set $K^m$ to express the multivariate polynomial $F_1(x)$, which is used to mask the multivariate polynomial F(x+r), as $F_1(x)=G(x, t_0)+e_0$. In this case, the sum of the multivariate polynomial $F(x+r_0)$ and G(x) is expressed as in formula (11) below. Here, when $t_1=r_0+t_0$, $e_1=F(r_0)+e_0$, the multivariate polynomial $F_2(x)=F(x+r_0)+F_1(x)$ can be expressed by the vector $t_1$ which is an element of the set $K^n$ and the vector $e_1$ that is an element of the set $K^m$. For this reason, when $F_1(x)=G(x, t_0)+e_0$ is set, $F_1$ and $F_2$ can be expressed by using a vector in $K^n$ and a vector in $K^m$, and thus it is possible to realize an efficient algorithm of which a data size necessary for communication is small.

[Math 9]
$$\begin{aligned} F(x+r_0) + F_1(x) &= F(x) + F(r_0) + G(x, r_0) + G(x, t_0) + e_0 \quad (11) \\ &= F(x) + G(x, r_0+t_0) + F(r_0) + e_0 \end{aligned}$$

Additionally, information on $r_0$ is not leaked at all from $F_2$ (or $F_1$). For example, even when $e_1$ and $t_1$ (or $e_0$ and $t_0$) are given, the information on $r_0$ is not known at all as long as $e_0$ and $t_0$ (or $e_1$ and $t_1$) are not known. Accordingly, the zero knowledge is ensured. Hereinafter, an algorithm of the 3-pass scheme constructed based on the foregoing logic will be described. The algorithm of the 3-pass scheme to be described here is made up of a key generation algorithm Gen, a prover algorithm P, and a verifier algorithm V to be described below.

(Key Generation Algorithm Gen)

The key generation algorithm Gen generates m multivariate polynomials $f_1(x_1, \ldots, x_n), \ldots, f_m(x_1, \ldots, x_n)$ defined in a ring k and a vector $s=(s_1, \ldots, s_n)$ that is an element of a set $K^n$. Next, the generation algorithm Gen calculates $y=(y_1, \ldots, y_m) \leftarrow (f_1(s), \ldots, f_m(s))$. Also, the generation algorithm Gen sets $(f_1(x_1, \ldots, x_n), \ldots, f_m(x_1, \ldots, x_n), y)$ in the public key pk and sets s as a secret key. Hereinafter, a vector $(x_1, \ldots, x_n)$ is represented as x and a pair of multivariate polynomials $(f_1(x), \ldots, f_m(x))$ is represented as F(x).

(Prover Algorithm P, Verifier Algorithm V)

Hereinafter, a process performed by the prover algorithm P and a process performed by the verifier algorithm V during the interactive protocol will be described with reference to FIG. 4. During the foregoing interactive protocol, a prover does not leak information on the secret key s at all to a verifier and expresses to the verifier that "she herself knows s satisfying y=F(s)." On the other hand, the verifier verifies whether or not the prover knows s satisfying y=F(s). The public key pk is assumed to be made known to the verifier. Also, the secret key s is assumed to be secretly managed by the prover. Hereinafter, the description will be made with reference to the flowchart illustrated in FIG. 4.

Operation #1:

As illustrated in FIG. 4, the prover algorithm P first randomly generates the vector $r_0$, $t_0$ that is an element of the set $K^n$, and the vector $e_0$ that is an element of the set $K^m$.

Subsequently, the prover algorithm P calculates $r_1 \leftarrow s-r_0$. This calculation is equivalent to masking the secret key s with the vector $r_0$. Additionally, the prover algorithm P calculates $t_1 \leftarrow r_0-t_0$. Subsequently, the prover algorithm P calculates $e_1 \leftarrow F(r_0)-e_0$.

Operation #1 (Continued):

Subsequently, the prover algorithm P calculates $c_0 \leftarrow H(r_1, G(t_0, r_1)+e_0)$. Subsequently, the prover algorithm P calculates $c_1 \leftarrow H(t_0, e_0)$. Subsequently, the prover algorithm P calculates $c_2 \leftarrow H(t_1, e_1)$. The message $(c_0, c_1, c_2)$ generated in operation #1 is sent to the verifier algorithm V.

Operation #2:

Upon receiving the message $(c_0, c_1, c_2)$, the verifier algorithm V selects which verification pattern to use from among three verification patterns. For example, the verifier algorithm V may select a numerical value from among three numerical values {0, 1, 2} representing verification patterns, and set the selected numerical value in a challenge Ch. This challenge Ch is sent to the prover algorithm P.

Operation #3:

Upon receiving the challenge Ch, the prover algorithm P generates a response Rsp to send to the verifier algorithm V in response to the received challenge Ch. In the case where Ch=0, the prover algorithm P generates a response Rsp=$(r_0, t_1, e_1)$. In the case where Ch=1, the prover algorithm P generates a response Rsp=$(r_1, t_0, e_0)$. In the case where Ch=2, the prover algorithm P generates a response Rsp=$(r_1, t_1, e_1)$. The response Rsp generated in operation #3 is sent to the verifier algorithm V.

Operation #4:

Upon receiving the response Rsp, the verifier algorithm V executes the following verification process using the received response Rsp.

In the case where Ch=0, the verifier algorithm V verifies whether or not the equality of $c_1=H(r_0-t_1, F(r_0)-e_1)$ holds. In addition, the verifier algorithm V verifies whether or not the equality of $c_2=H(t_1, e_1)$ holds. The verifier algorithm V outputs the value 1 to indicate authentication success in the case where these verifications all succeed, and outputs the value 0 to indicate authentication failure in the case where a verification fails.

In the case where Ch=1, the verifier algorithm V verifies whether or not the equality of $c_0=H(r_1, G(t_0, r_1)+e_0)$ holds. In addition, the verifier algorithm V verifies whether or not the equality of $c_1=H(t_0, e_0)$ holds. The verifier algorithm V outputs the value 1 to indicate authentication success in the case where these verifications all succeed, and outputs the value 0 to indicate authentication failure in the case where a verification fails.

In the case where Ch=2, the verifier algorithm V verifies whether or not the equality of $c_0=H(r_1, y-F(r_1)-G(t_1, r_1)-e_1)$ holds. In addition, the verifier algorithm V verifies whether or not the equality of $c_2=H(t_1, e_1)$ holds. The verifier algorithm V outputs the value 1 to indicate authentication success in the case where these verifications all succeed, and outputs the value 0 to indicate authentication failure in the case where a verification fails.

The example of the efficient algorithm structure related to the 3-pass scheme has been described above.

(2-2: Example of Parallelized Algorithm Structure (FIG. 5))

Next, a method of parallelizing the algorithm of the 3-pass scheme illustrated in FIG. 4 will be described with reference to FIG. 5. However, further description of the structure of the key generation algorithm Gen will be omitted.

In fact, applying the above session protocol makes it possible to keep the probability of a successful forgery to 2/3 or less. Consequently, executing the session protocol twice makes it possible to keep the probability of a successful forgery to $(2/3)^2$ or less. Furthermore, if the session protocol is executed N times, the probability of a successful forgery becomes $(2/3)^N$, and if N is set to a sufficiently large number (N=140, for example), the probability of a successful forgery becomes negligibly small.

Conceivable methods of executing the interactive protocol multiple times include a serial method in which the exchange of message, challenge, and response is sequentially repeated multiple times, and a parallel method in which multiple messages, challenges, and responses are exchanged in a single exchange, for example. Also, a hybrid type method combining the serial method and the parallel method is also conceivable. Here, algorithms that execute the above interactive protocol related to the 3-pass scheme in parallel (hereinafter designated parallelized algorithms) will now be described with reference to FIG. 5.

Figure 5:
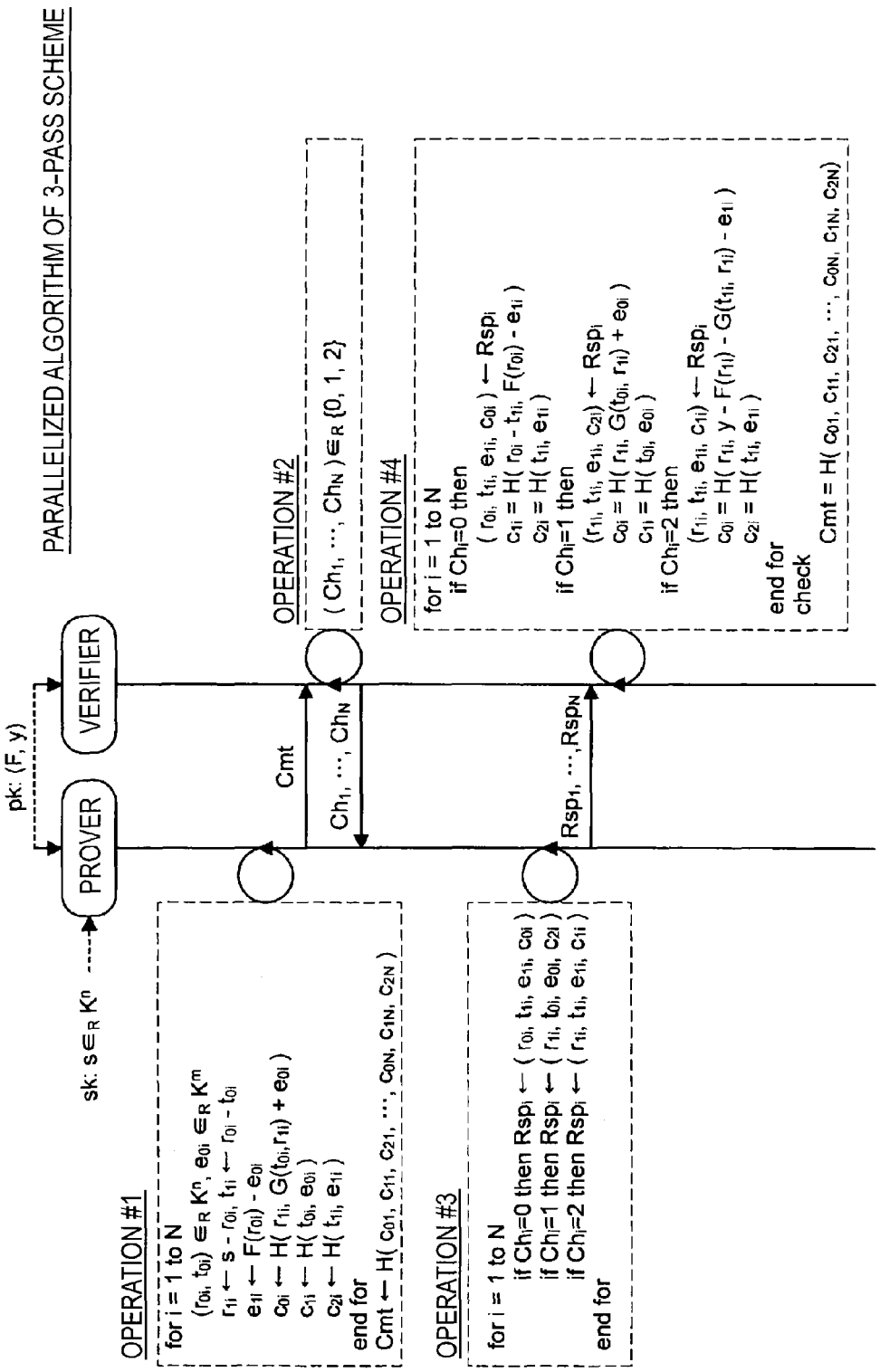
FIG. 5 is an explanatory diagram for describing parallelization of an efficient algorithm related to a 3-pass public-key authentication scheme.

Operation #1:

As described in FIG. 5, the prover algorithm P first executes the following processes (1) to (6) for i=1 to N.

Process (1): The prover algorithm P randomly generates the vectors $r_{0i}, t_{0i}$ that are elements of the set $K^n$, and the vector $e_{0i}$ that is an element of the set $K^m$.

Process (2): The prover algorithm P calculates $r_{1i} \leftarrow s-r_{0i}$. This calculation is equivalent to masking the secret key s with the vector $r_{0i}$. Additionally, the prover algorithm P calculates $t_{1i} \leftarrow r_{0i}+t_{0i}$.

Process (3): The prover algorithm P calculates $e_{1i} \leftarrow F(r_{0i})-e_{0i}$.

Process (4): The prover algorithm P calculates $c_{0i} \leftarrow H(r_{1i}, G(r_{1i}, t_{0i})+e_{0i})$.

Process (5): The prover algorithm P calculates $c_{1i} \leftarrow H(t_{0i}, e_{0i})$.

Process (6): The prover algorithm P calculates $c_{2i} \leftarrow H(t_{1i}, e_{1i})$.

Operation #1 (Continued):

After executing the above processes (1) to (6) for i=1 to N, the prover algorithm P calculates Cmt$\leftarrow H(c_{01}, c_{11}, c_{21}, \ldots, c_{0N}, c_{1N}, c_{2N})$. The hash value Cmt generated in operation #1 is sent to the verifier algorithm V. In this way, the message $(c_{01}, c_{11}, c_{21}, \ldots, c_{0N}, c_{1N}, c_{2N})$ is converted into a hash value before being sent to the verifier algorithm V, thus enabling a reduction in the communication volume.

Operation #2:

Upon receiving the hash value Cmt, the verifier algorithm V selects which verification pattern to use from among three verification patterns, for each of i=1 to N. For example, the verifier algorithm V may, for each of i=1 to N, select a numerical value from among three numerical values {0, 1, 2} representing verification patterns, and set the selected numerical value in a challenge $Ch_i$. The challenges $Ch_1, \ldots, Ch_N$ are sent to the prover algorithm P.

Operation #3:

Upon receiving the challenges $Ch_1, \ldots, Ch_N$, the prover algorithm P generates responses $Rsp_1, \ldots, Rsp_N$ to send to the verifier algorithm V in response to each of the received challenges $Ch_1, \ldots, Ch_N$. In the case where $Ch_i$=0, the prover algorithm P generates a response $Rsp_i=(r_{0i}, t_{1i}, e_{1i}, c_{0i})$. In the case where $Ch_i$=1, the prover algorithm P generates a response $Rsp_i=(r_{1i}, t_{0i}, e_{0i}, c_{2i})$. In the case where $Ch_i$=2, the prover algorithm P generates a response $Rsp_i=(r_{1i}, t_{1i}, e_{1i}, c_{1i})$.

The responses $Rsp_1, \ldots, Rsp_N$ generated in operation #3 are sent to the verifier algorithm V.

Operation #4:

Upon receiving the responses $Rsp_1, \ldots, Rsp_N$, the verifier algorithm V executes the following processes (1) to (3) for i=1 to N, using the received responses $Rsp_1, \ldots, Rsp_N$. Herein, the verifier algorithm V executes the process (1) for the case where $Ch_i=0$, the process (2) in the case where $Ch_i=1$, and the process (3) in the case where $Ch_i=2$.

Process (1): In the case where $Ch_i=0$, the verifier algorithm V retrieves $(r_{0i}, t_{1i}, e_{1i}, c_{0i})$ from $Rsp_i$. Subsequently, the verifier algorithm V calculates $c_{1i}=H(r_{0i}-t_{1i}, F(r_{0i})-e_{1i})$. In addition, the verifier algorithm V calculates $c_{2i}=H(t_{1i}, e_{1i})$. The verifier algorithm V then stores $(c_{0i}, c_{1i}, c_{2i})$.

Process (2): In the case where $Ch_i=1$, the verifier algorithm V retrieves $(r_{1i}, t_{0i}, e_{0i}, c_{2i})$ from $Rsp_i$. Subsequently, the verifier algorithm V calculates $c_{0i}=H(r_{1i}, G(t_{0i}, r_{1i})+e_{0i})$. In addition, the verifier algorithm V calculates $c_{1i}=H(t_{0i}, e_{0i})$. The verifier algorithm V then stores $(c_{0i}, c_{1i}, c_{2i})$.

Process (3): In the case where $Ch_i=2$, the verifier algorithm V retrieves $(r_{1i}, t_{1i}, e_{1i}, c_{1i})$ from $Rsp_i$. Subsequently, the verifier algorithm V calculates $c_{0i}=H(r_{1i}, y-F(r_{1i})-G(t_{1i}, r_{1i}))$. In addition, the verifier algorithm V calculates $c_{2i}=H(t_{1i}, e_{1i})$. The verifier algorithm V then stores $(c_{0i}, c_{1i}, c_{2i})$.

After executing the above processes (1) to (3) for i=1 to N, the verifier algorithm V verifies whether or not the equality of $Cmt=H(c_{0i}, c_{1i}, c_{2i}, \ldots, c_{0N}, c_{1N}, c_{2N})$ holds. The verifier algorithm V outputs the value 1 to indicate authentication success in the case where the verification succeeds, and outputs the value 0 to indicate authentication failure in the case where the verification fails.

The example of the structures of the parallelized efficient algorithms related to the 3-pass scheme has been described above.

[2-3: Example of Algorithm Structure Based on Cubic Multivariate Polynomial]

A method of constructing an efficient algorithm using a cubic polynomial $f_l$ of a ring R expressed as in the following formula (12) will be examined. A multivariate polynomial $F=(f_1, \ldots, f_m)$ expressed with a pair of cubic polynomials $f_l$ satisfies the relation of the following formula (13). Here, $G_x(x, y)$ represents a linear term for x. Additionally, $G_y(x, y)$ represents a linear term for y. When $G_x=(g_{x1}, \ldots, g_{xm})$ and $G_y=(g_{y1}, \ldots, g_{ym})$ are expressed, $g_{x1}$ and $g_{y1}$ can be developed as in the following formula (14) and formula (15), respectively. Here, since the right second term of $g_{x1}$ is also linear for one of x and y, the right second term may include $g_{y1}$.

[Math 10]

$$f_l(x_1, \ldots, x_n) = \sum_{i,j,k} a_{lijk} x_i x_j x_k + \sum_{i,j} b_{lij} x_i x_j + \sum_i c_{li} x_i \quad (12)$$

$$F(x+y) - F(x) - F(y) = G_x(x, y) + G_y(x, y) \quad (13)$$

$$g_{xl}(x_1, \ldots, x_n, y_1, \ldots, y_n) = \sum_{i,j,k}(a_{lijk} + a_{likj} + a_{lkji}) y_i y_j x_k + \sum_{i,j}(b_{lij} + b_{lji}) x_i y_i \quad (14)$$

$$g_{yl}(x_1, \ldots, x_n, y_1, \ldots, y_n) = \sum_{i,j,k}(a_{lijk} + a_{likj} + a_{lkji}) x_i x_j y_k \quad (15)$$

As understood from the foregoing formula (14) and formula (15), $G_x(x, y)$ and $G_y(x, y)$ become additively homomorphic for x and y. Thus, using this property, the public key F(s) is divided by introducing the new variables $r_0, r_1, t_0, u_0,$ and $e_0$, as in the method of constructing the efficient algorithm using the quadratic polynomial $f_1$.

Since the polynomials $G_x$ and $G_y$ are additively homomorphic, a relation among the following formula (16) to formula (19) is established using variables $r_0, r_1, t_0, u_0,$ and $e_0$. The following formula (16) to formula (19) can be divided into a first portion reproducible with $(r_0, t_0, u_0, e_0)$, a second portion reproducible with $(r_0, u_1, e_1)$, a third portion reproducible with $(r_1, t_0, e_0)$, and a fourth portion reproducible with $(r_1, t_1, u_1, e_1)$.

For example, "$r_0, t_0$" included in the following formula (17), "$u_0$" included in the following formula (18), and "$F(r_0), G_y(r_0, u_0), e_0$" included in the following formula (19) are the first portion. Additionally, "$G_y(r_0, u_1), e_1$" included in the following formula (19) is the second portion. Additionally, "$e_0, G_x(r_0, r_1)$" included in the following formula (16) is the third portion. Additionally, "$e_1, F(r_1), G_x(t_1, r_1)$" included in the following formula (16), "$t_1$" included in the following formula (17), and "$u_1$" included in the following formula (18) are the fourth portion.

In other words, the following formula (16) includes the third and fourth portions, the following formula (17) and the following formula (18) include the first and fourth portions, and the following formula (19) includes the first and second portions. In this way, the following formula (16) to formula (19) each include two kinds of portions.

From the definition of the secret key s and the relation among the following formula (16) to formula (19), it is ensured that the secret key s is not obtainable even when any one of $(r_0, t_0, u_0, e_0), (r_0, u_1, e_1), (r_1, t_0, e_0),$ and $(r_1, t_1, u_1, e_1)$ is used. Using this property enables, for example, the construction of an efficient algorithm (hereinafter, an extended algorithm) using the cubic polynomial $f_1$ of the ring R.

[Math 11]

$$F(r_0+r_1) = e_0 + e_1 + F(r_1) + G_x(t_0, r_1) + G_x(t_1, r_1) \quad (16)$$

$$r_0 = t_0 + t_1 \quad (17)$$

$$r_1 = u_0 + u_1 \quad (18)$$

$$F(r_0) + G_y(r_0, u_1) + G_y(r_0, u_0) = e_0 + e_1 \quad (19)$$

Hereinafter, an example of a specific extended algorithm structure will be described. Two basic points regarding design of an extended algorithm are that a message expressed in the following formula (20) to formula (22) is sent to a verifier and that one of the first to fourth portions is verified. However, only in this verification, it may not be verified that "$r_1$" included in the third portion is identical with "$r_1$" included in the fourth portion. Similarly, it may not be verified that "$r_0$" included in the first portion is identical with "$r_0$" included in the second portion and that "$t_0, e_0$" included in the first portion is identical with "$t_0, e_0$" included in the third portion, either. Additionally, it may not be verified that "$u_1, e_1$" included in the second portion is identical with "$u_1, e_1$" included in the fourth portion, either. Accordingly, a structure example enabling this verification will be introduced below.

[Math 12]

$$c_0 = H(G_x(t_0, r_1) + e_0) \quad (20)$$

$$c_1 = H(t_0, u_0) \quad (21)$$

$$c_2 = H(e_1 - G_y(r_0, u_1)) \quad (22)$$

(2-3-1: Basic Structure (FIG. 7))

Hereinafter, a configuration example of an extended algorithm related to the 3-pass scheme will be described with reference to FIG. 6. However, further description of the structure of the key generation algorithm Gen will be omitted.

Figure 6:
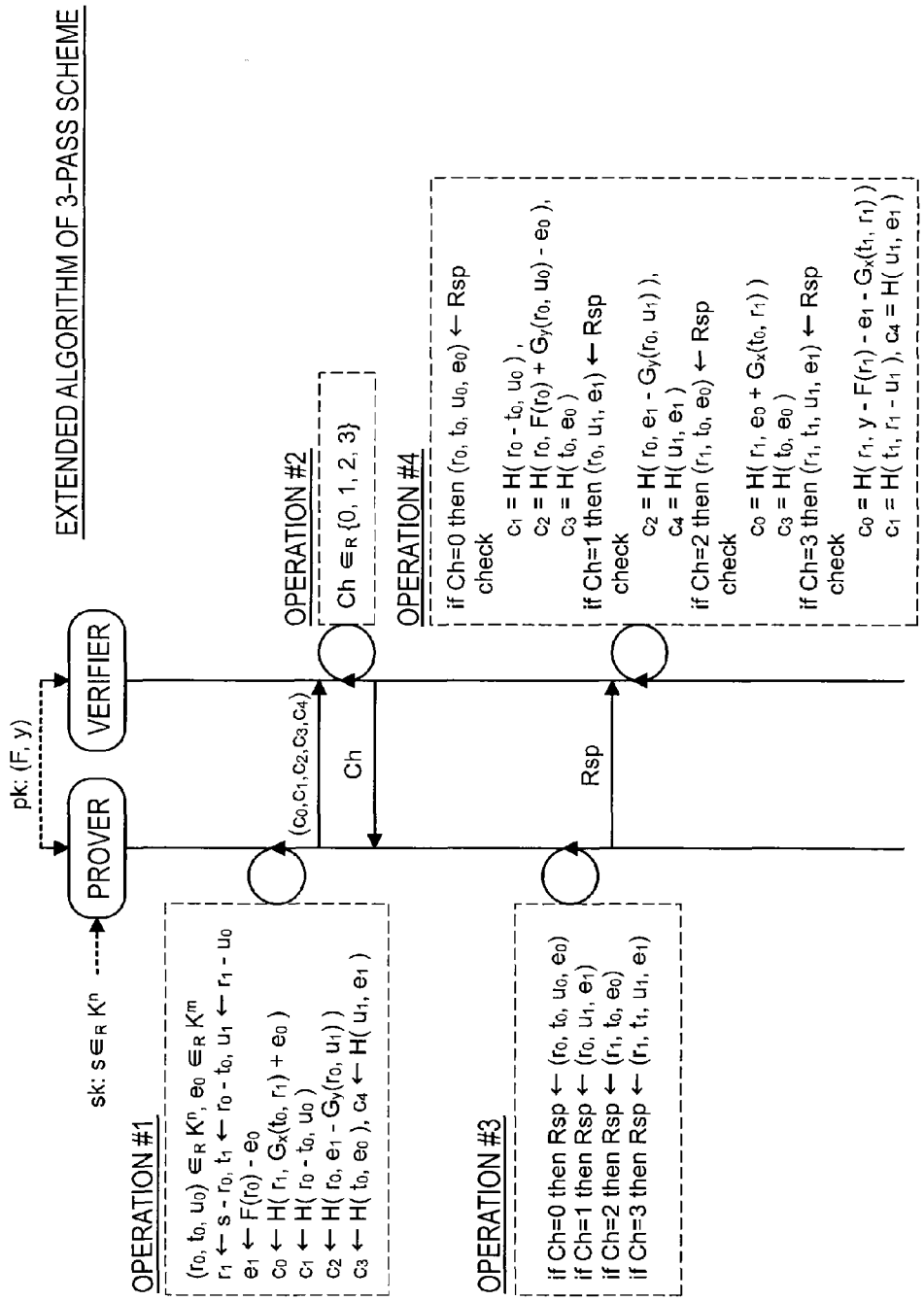
FIG. 6 is an explanatory diagram for describing an efficient algorithm related to a 3-pass public-key authentication scheme.

Operation #1:

As illustrated in FIG. 6, the prover algorithm P randomly generates the vectors $r_0$, $t_0$, $u_0$ that are elements of the set $K^n$, and the vector $e_0$ that is an element of the set $K^m$. Subsequently, the prover algorithm P calculates $r_1 \leftarrow s - r_0$. This calculation is equivalent to masking the secret key s with the vector $r_0$. Subsequently, the prover algorithm P calculates $t_1 \leftarrow r_0 + t_0$. Subsequently, the prover algorithm P calculates $u_1 \leftarrow r_1 + u_0$. Subsequently, the prover algorithm P calculates $e_1 \leftarrow F(r_0) - e_0$.

Operation #1 (Continued):

Subsequently, the prover algorithm P calculates $c_0 \leftarrow H(r_1, G_x(t_0, r_1) + e_0)$. Subsequently, the prover algorithm P calculates $c_1 \leftarrow H(r_0 - t_0, u_0)$. Subsequently, the prover algorithm P calculates $c_2 \leftarrow H(r_0, e_1 - G_y(r_0, u_1))$. Subsequently, the prover algorithm P calculates $c_3 \leftarrow H(t_0, e_0)$. Subsequently, the prover algorithm P calculates $c_4 \leftarrow H(u_1, e_1)$. Messages ($c_0$, $c_1$, $c_2$, $c_3$, $c_4$) generated in operation #1 are sent to the verifier algorithm V.

Operation #2:

Upon receiving the messages ($c_0$, $c_1$, $c_2$, $c_3$, $c_4$), the verifier algorithm V selects which verification pattern to use from among four verification patterns. For example, the verifier algorithm V may select a numerical value from among four numerical values {0, 1, 2, 3} representing verification patterns, and set the selected numerical value in a challenge Ch. The challenge Ch is sent to the prover algorithm P.

Operation #3:

Upon receiving the challenge Ch, the prover algorithm P generates responses Rsp to send to the verifier algorithm V in response to each of the received challenge Ch. In the case where Ch=0, the prover algorithm P generates a response Rsp=($r_0$, $t_0$, $u_0$, $e_0$). In the case where Ch=1, the prover algorithm P generates a response Rsp=($r_0$, $u_1$, $e_1$). In the case where Ch=2, the prover algorithm P generates a response Rsp=($r_1$, $t_0$, $e_0$). In the case where Ch=3, the prover algorithm P generates a response Rsp=($r_1$, $t_1$, $u_1$, $e_1$). The response Rsp generated in operation #3 is sent to the verifier algorithm V.

Operation #4:

Upon receiving the response Rsp, the verifier algorithm V executes the following verification process using the received response Rsp.

In the case where Ch=0, the verifier algorithm V verifies whether or not the equality of $c_1 = H(r_0 - t_0, u_0)$ holds. Subsequently, the verifier algorithm V verifies whether or not the equality of $c_2 = H(r_0, F(r_0) + G_y(r_0, u_0) - e_0)$ holds. Subsequently, the verifier algorithm V verifies whether or not the equality of $c_3 = H(t_0, e_0)$ holds. The verifier algorithm V outputs the value 1 to indicate authentication success in the case where the verifications all succeed, and outputs the value 0 to indicate authentication failure in the case where a verification fails.

In the case where Ch=1, the verifier algorithm V verifies whether or not the equality of $c_2 = H(r_0, e_1 - G_y(r_0, u_1))$ holds. Subsequently, the verifier algorithm V verifies whether or not the equality of $c_4 = H(u_1, e_1)$ holds. The verifier algorithm V outputs the value 1 to indicate authentication success in the case where the verifications all succeed, and outputs the value 0 to indicate authentication failure in the case where a verification fails.

In the case where Ch=2, the verifier algorithm V verifies whether or not the equality of $c_0 = H(r_1, e_0 - G_x(t_0, r_1))$ holds. Subsequently, the verifier algorithm V verifies whether or not the equality of $c_3 = H(t_0, e_0)$ holds. The verifier algorithm V outputs the value 1 to indicate authentication success in the case where the verifications all succeed, and outputs the value 0 to indicate authentication failure in the case where a verification fails.

In the case where Ch=3, the verifier algorithm V verifies whether or not the equality of $c_0 = H(r_1, y - F(r_1) - e_1 - G_x(t_1, r_1))$ holds. Subsequently, the verifier algorithm V verifies whether or not the equality of $c_1 = H(t_1, r_1, u_1)$ holds. Subsequently, the verifier algorithm V verifies whether or not the equality of $c_4 = H(u_1, e_1)$ holds. The verifier algorithm V outputs the value 1 to indicate authentication success in the case where the verifications all succeed, and outputs the value 0 to indicate authentication failure in the case where a verification fails.

The example of the extended algorithm structure related to the 3-pass scheme has been described above. Using the cubic polynomial enables realization of higher security.

3: ALGORITHM STRUCTURE RELATED TO 5-PASS PUBLIC-KEY AUTHENTICATION SCHEME

Next, algorithms related to a 5-pass public-key authentication scheme will be described. Note that in the following description, a 5-pass public-key authentication scheme may also be referred to as a "5-pass scheme" in some cases.

In the case of the 3-pass scheme, the probability of the false verification is 2/3 per time of the interactive protocol. However, in the case of the 5-pass scheme, the probability of the false verification per time of the interactive protocol is 1/2+1/q. Here, q is an order of a ring to be used. Accordingly, when the order of the ring is sufficiently large, the probability of the false verification per time of the 5-pass scheme can be reduced, and thus the probability of the false verification can be sufficiently reduced by executing the interactive protocol a small number of times.

For example, when the probability of the false verification is desired to be equal to or less than $1/2^n$, the interactive protocol has to be executed n/(log 3−1)=1.701n times or more in the 3-pass scheme. On the other hand, when the probability of the false verification is desired to be equal to or less than $1/2^n$, the interactive protocol has to be executed n/(1−log(1+1/q)) times or more in the 5-pass scheme. Accordingly, when q=24, a communication quantity necessary to realize the same security level is less in the 5-pass scheme than in the 3-pass scheme.

[3-1: Example of Specific Algorithm Structure (FIG. 7)]

Figure 7:
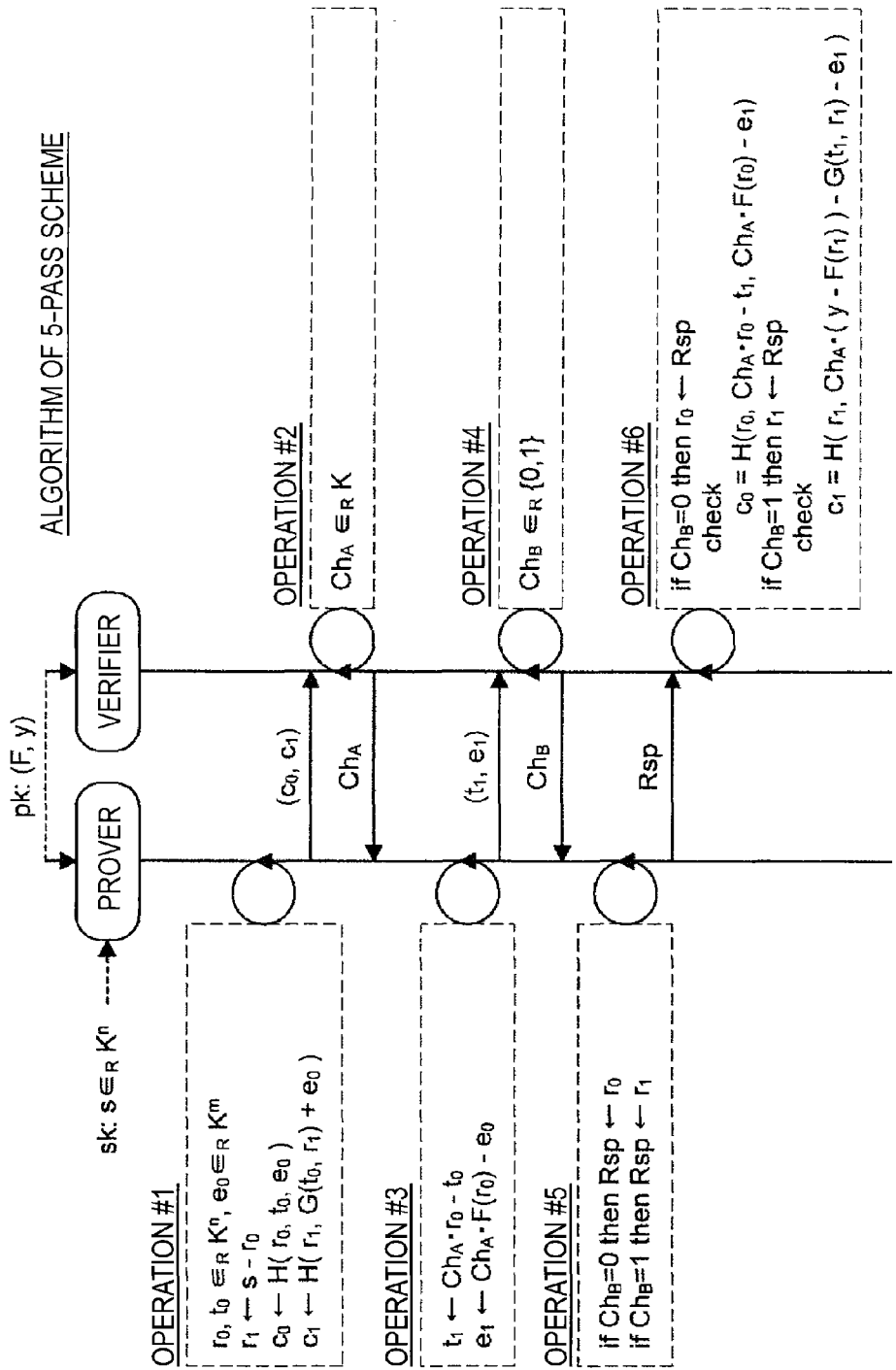
FIG. 7 is an explanatory diagram for describing an example of an efficient algorithm structure related to a 5-pass public-key authentication scheme.

First, an example of a specific algorithm structure related to the 5-pass scheme will be introduced with reference to FIG. 7. FIG. 7 is an explanatory diagram for describing a specific algorithm structure related to the 5-pass scheme. Here, a case in which a pair of quadratic polynomials ($f_1(x)$, . . . , $f_m(x)$) are used as a part of the public key pk will be described. Here, a quadratic polynomial $f_i(x)$ is assumed to be expressed as in the foregoing formula (6). Also, a vector ($x_1$, . . . , $x_1$) is represented as x and a pair of quadratic multivariate polynomials ($f_1(x)$, . . . , $f_m(x)$) are represented as multivariate polynomials F(x).

As in the efficient algorithms related to the 3-pass scheme, two vectors, i.e., the vector $t_0$ that is an element of the set $K^n$ and the vector $e_0$ that is an element of the set $K^m$, are used to express the multivariate polynomial $F_1(x)$, which is used to mask the multivariate polynomial $F(x+r_0)$, as $F_1(x)=G(x, t_0)+e_0$. When this expression is used, a relation expressed in the following formula (23) can be obtained for the multivariate polynomial $F(x+r_0)$.

[Math 13]

$$Ch_A \cdot F(x+r_0) + F_1(x) = Ch_A \cdot F(x) + Ch_A \cdot F(r_0) + Ch_A \cdot G(x, r_0) + \quad (23)$$
$$G(x, t_0) + e_0$$
$$= Ch_A \cdot F(x) + G(x, Ch_A \cdot r_0 + t_0) + Ch_A \cdot$$
$$F(r_0) + e_0$$

For this reason, when $t_1=Ch_A \cdot r_0+t_0$, $e_1=Ch_A \cdot F(r_0)+e_0$, the multivariate polynomial $F_2(x)=Ch_A \cdot F(x+r_0)+F_1(x)$ after the masking can also be expressed by two vectors, i.e., the vector $t_1$ which is an element of the set $K^n$ and the vector $e_1$ that is an element of the set $K^m$. For this reason, when $F_1(x)=G(x, t_0)+e_0$ is set, $F_1$ and $F_2$ can be expressed by using a vector in $K^n$ and a vector in $K^m$, and thus it is possible to realize an efficient algorithm of which a data size necessary for communication is small.

Additionally, information on $r_0$ is not at all leaked from $F_2$ (or $F_1$). For example, even when $e_1$ and $t_1$ (or $e_0$ and $t_0$) are given, the information on $r_0$ is not known at all as long as $e_0$ and $t_0$ (or $e_1$ and $t_1$) are not known. Accordingly, the zero knowledge is ensured. Hereinafter, an algorithm of the 5-pass scheme constructed based on the foregoing logic will be described. The algorithm of the 5-pass scheme to be described here is made up of a key generation algorithm Gen, a prover algorithm P, and a verifier algorithm V to be described below.

(Key Generation Algorithm Gen)

The key generation algorithm Gen generates multivariate polynomials $f_1(x_1, \ldots, x_n), \ldots, f_m(x_1, \ldots, x_n)$ defined in a ring k and a vector $s=(s_1, \ldots, s_n)$ that is an element of a set $K^n$. Next, the key generation algorithm Gen calculates $y=(y_1, \ldots, y_m) \leftarrow (f_1(s), \ldots, f_m(s))$. Also, the key generation algorithm Gen sets $(f_1, \ldots, f_m, y)$ in the public key pk and sets s as a secret key. Hereinafter, a vector $(x_1, \ldots, x_n)$ is represented as x and a pair of multivariate polynomials $(f_1(x), \ldots, f_m(x))$ is represented as $F(x)$.

(Prover Algorithm P, Verifier Algorithm V)

Hereinafter, a process performed by the prover algorithm P and a process performed by the verifier algorithm V during the interactive protocol will be described with reference to FIG. 7. During the foregoing interactive protocol, a prover does not leak information on the secret key s at all to a verifier and expresses to the verifier that "she herself knows s satisfying y=F(s)." On the other hand, the verifier verifies whether or not the prover knows s satisfying y=F(s). The public key pk is assumed to be made known to the verifier. Also, the secret key s is assumed to be secretly managed by the prover. Hereinafter, the description will be made with reference to the flowchart illustrated in FIG. 7.

Operation #1:

As illustrated in FIG. 7, the prover algorithm P randomly generates the vector $r_0$ that is an element of the set $K^n$, the vector to that is an element of the set $K^n$, and the vector $e_0$ that is an element of the set $K^m$. Subsequently, the prover algorithm P calculates $r_1 \leftarrow s-r_0$. This calculation is equivalent to masking the secret key s with the vector $r_0$. Subsequently, the prover algorithm P calculates the hash value $c_0$ of the vectors $r_0, t_0, e_0$. That is, the prover algorithm P calculates $c_0 \leftarrow H(r_0, t_0, e_0)$. Subsequently, the prover algorithm P generates $G(t_0, r_1)+e_0$ and the hash value $c_1$ of $r_1$. That is, the prover algorithm P calculates $c_0 \leftarrow H(r_1, G(t_0, r_1) e_0)$. The messages $(c_0, c_1)$ generated in operation #1 is sent to the verifier algorithm V.

Operation #2:

Upon receiving the messages $(c_0, c_1)$, the verifier algorithm V randomly selects one number $Ch_A$ from the origins of q rings K and sends the selected number $Ch_A$ to the prover algorithm P.

Operation #3:

Upon receiving the number $Ch_A$, the prover algorithm P calculates $t_1 \leftarrow Ch_A \cdot r_0 - t_0$. Additionally, the prover algorithm P calculates $e_1 \leftarrow Ch_A \cdot F(r_0) - e_0$. The prover algorithm P sends $t_1$ and $e_1$ to the verifier algorithm V.

Operation #4:

Upon receiving $t_1$ and $e_1$, the verifier algorithm V selects which verification pattern to use from between two verification patterns. For example, the verifier algorithm V may select a numerical value from between two numerical values $\{0, 1\}$ representing verification patterns, and set the selected numerical value in a challenge $Ch_B$. This challenge $Ch_B$ is sent to the prover algorithm P.

Operation #5:

Upon receiving the challenge $Ch_B$, the prover algorithm P generates a response Rsp to send to the verifier algorithm V in response to the received challenge $Ch_B$. In the case where $Ch_B=0$, the prover algorithm P generates a response $Rsp=r_0$. In the case where $Ch_B=1$, the prover algorithm P generates a response $Rsp=r_1$. The response Rsp generated in operation #5 is sent to the verifier algorithm V.

Operation #6:

Upon receiving the response Rsp, the verifier algorithm V executes the following verification process using the received response Rsp.

In the case where $Ch_B=0$, the verifier algorithm V executes $r_0 \leftarrow Rsp$. Then, the verifier algorithm V verifies whether or not the equality of $c_0=H(r_0, Ch_A \cdot r_0 - t_1, Ch_A \cdot F(r_0)-e_1)$ holds. The verifier algorithm V outputs the value 1 to indicate authentication success in the case where these verifications all succeed, and outputs the value 0 to indicate authentication failure in the case where a verification fails.

In the case where $Ch_B=1$, the verifier algorithm V executes $r_1 \leftarrow Rsp$. Then, the verifier algorithm V verifies whether or not the equality of $c_1=H_1(r_1, Ch_A \cdot (y-F(r_1))-G(t_1, r_1)-e_1)$ holds. The verifier algorithm V outputs the value 1 to indicate authentication success in the case where these verifications all succeed, and outputs the value 0 to indicate authentication failure in the case where a verification fails.

The example of the efficient algorithm structure related to the 5-pass scheme has been described above.

[3-2: Example of Parallelized Algorithm Structure (FIG. 8)]

Next, a method of parallelizing the algorithm of the 5-pass scheme illustrated in FIG. 7 will be described with reference to FIG. 8. However, further description of the structure of the key generation algorithm Gen will be omitted.

As described above, applying the above interactive protocol related to the 5-pass scheme makes it possible to keep the probability of a successful forgery to $(1/2+1/q)$ or less. Consequently, executing the interactive protocol twice makes it possible to keep the probability of a successful forgery to $(1/2+1/q)^2$ or less. Furthermore, if the interactive protocol is executed N times, the probability of a successful forgery becomes $(1/2+1/q)^N$, and if N is set to a sufficiently large number (N=80, for example), the probability of a successful forgery becomes negligibly small.

Conceivable methods of executing an interactive protocol multiple times include a serial method in which the exchange of message, challenge, and response is sequentially repeated multiple times, and a parallel method in which multiple messages, challenges, and responses are exchanged in a single exchange, for example. Also, a hybrid type method combining the serial method and the parallel method is also conceivable. Here, algorithms that execute the above interactive protocol related to the 5-pass scheme in parallel (hereinafter designated parallelized algorithms) will now be described.

Figure 8:
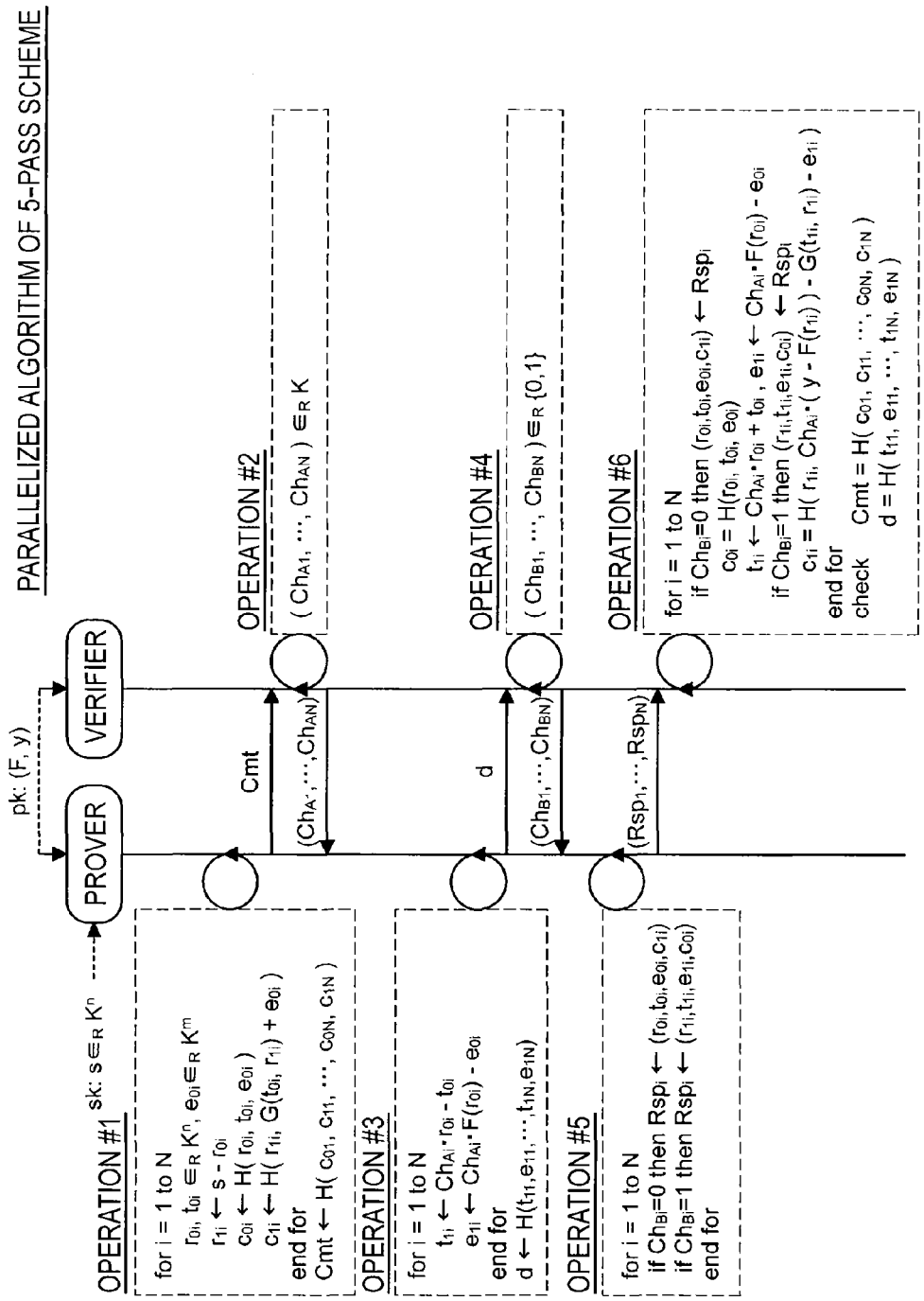
FIG. 8 is an explanatory diagram for describing parallelization of an efficient algorithm related to the 5-pass public-key authentication scheme.

Operation #1:

As described in FIG. 8, the prover algorithm P first executes the following processes (1) to (4) for i=1 to N.

Process (1): The prover algorithm P randomly generates the vectors $r_{0i}$, $t_{0i}$ that are elements of the set and the vector $e_{0i}$ that is an element of the set $K^m$.

Process (2): The prover algorithm P calculates $r_{1i} \leftarrow s - r_{0i}$. This calculation is equivalent to masking the secret key s with the vector $r_{0i}$.

Process (3): The prover algorithm P calculates $c_{0i} \leftarrow H(r_{0i}, t_{0i}, e_{0i})$.

Process (4): The prover algorithm P calculates $c_{1i} \leftarrow H(r_{1i}, G(t_{0i}, r_{1i}) + e_{0i})$.

After executing the above processes (1) to (4) for i=1 to N, the prover algorithm P executes the hash value $Cmt \leftarrow H(c_{01}, c_{11}, \ldots, c_{0N}, c_{1N})$. The hash value Cmt generated in operation #1 is sent to the verifier algorithm V.

Operation #2:

Upon receiving the hash value Cmt, the verifier algorithm V randomly selects one number $Ch_{Ai}$ from the origins of q rings K for i=1 to N and sends the selected number $Ch_{Ai}$ (i=1 to N) to the prover algorithm P.

Operation #3:

Upon receiving the number $Ch_{Ai}$ (i=1 to N), the prover algorithm P calculates $t_{1i} \leftarrow Ch_{Ai} \cdot r_{0i} - t_0$ for i=1 to N. Additionally, the prover algorithm P calculates $e_{1i} \leftarrow Ch_{Ai} \cdot F(r_{0i}) - e_{0i}$ for i=1 to N. Further, the prover algorithm P calculates the hash value $d \leftarrow H(t_{011}, e_{11}, \ldots, t_{1N}, e_{1N})$ Then, the prover algorithm P sends the hash value to the verifier algorithm V.

Operation #4:

Upon receiving the hash value, the verifier algorithm V selects which verification pattern to use from between two verification patterns for i=1 to N. For example, the verifier algorithm V may select a numerical value from between two numerical values {0, 1} representing verification patterns, and set the selected numerical value in a challenge $Ch_{Bi}$. This challenge $Ch_{Bi}$ (i=1 to N) is sent to the prover algorithm P.

Operation #5:

Upon receiving the challenge $Ch_{Bi}$ (i=1 to N), the prover algorithm P generates a response $Rsp_i$ to send to the verifier algorithm V in response to the received challenge $Ch_{Bi}$ for i=1 to N. In the case where $Ch_{Bi}=0$, the prover algorithm P generates a response $Rsp_i = (r_{0i}, c_{1i})$. In the case where $Ch_{Bi}=1$, the prover algorithm P generates a response $Rsp_i = (r_{0i}, t_{0i}, e_{0i}, c_1 t_{1i}, e_{1i}, c_{0i})$. The response $Rsp_i$ (i=1 to N) generated in operation #5 is sent to the verifier algorithm V.

Operation #6:

Upon receiving the response $Rsp_i$ (i=1 to N), the verifier algorithm V executes the following processes (1) and (2) using the received response $Rsp_i$ (i=1 to N).

Process (1): In the case where $Ch_{Bi}=0$, the verifier algorithm V executes $(r_{0i}, t_{0i}, e_{0i}, e_{1i}) \leftarrow Rsp_i$. Then, the verifier algorithm V calculates $c_{0i} = H(r_{0i}, t_{0i}, e_{0i})$. Further, the verifier algorithm V calculates $t_{1i} \leftarrow Ch_{Ai} \cdot r_{0i} + t_{0i}$, and $e_{1i} \leftarrow Ch_{Ai} \cdot F(r_{0i}) - e_{0i}$. The verifier algorithm V then stores $(c_{0i}, c_{1i}, t_{1i}, e_{1i})$.

Process (2): In the case where $Ch_{Bi}=1$, the verifier algorithm V executes $(r_{1i}, t_{1i}, e_{1i}, c_{0i}) \leftarrow Rsp_i$. Then, the verifier algorithm V calculates $c_{1i} = H(r_{1i} - Ch_{Ai} \cdot (y - F(r_{1i})) - G(t_{1i}, r_{1i}) - e_{1i})$. The verifier algorithm V then stores $(c_{0i}, c_{1i}, t_{1i}, e_{1i})$.

After executing the processes (1) and (2) for i=1 to N, the verifier algorithm V verifies whether or not the equality of $Cmt = H(c_{01}, c_{11}, \ldots, c_{0N}, c_{1N})$ holds. Further, the verifier algorithm V verifies whether or not the equality of $d = H(t_{11}, e_{11}, \ldots, t_{1N}, e_{1N})$ holds. Then, the verifier algorithm V outputs the value 1 to indicate authentication success in the case where these verifications succeed, and outputs the value 0 to indicate authentication failure in the case where a verification fails.

The example of the structures of the parallelized efficient algorithms related to the 5-pass scheme has been described above.

[3-3: Example of Algorithm Structure Based on Cubic Multivariate Polynomial]

A method of constructing an efficient algorithm using a cubic polynomial $f_1$ of a ring R will be examined as in the case of the 3-pass scheme. When a cubic polynomial $f_1$ is expressed as in the foregoing formula (12), the fact that $G_x(x, y)$ and $G_y(x, y)$ become linear for x and y can be understood from formula (14) and formula (15).

Thus, using the foregoing property, the public key F(s) is divided into a term which is $Ch_A$ times by introducing new variables $r_0$, $r_1$, $t_0$, $u_0$, and $e_0$. Since polynomials $G_x$ and $G_y$ are linear for x and y, a relation among the following formula (24) to formula (27) is established using the variables $r_0$, $r_1$, $t_0$, $u_0$, and $e_0$. The following formula (24) to formula (27) can be divided into a first portion dependent on $Ch_A$ and a second portion not dependent on $Ch_A$. Here, the first portion can be reproduced with $(r_1, t_1, u_1, e_1)$. The second portion can be reproduced with $(r_0, t_1, u_1, e_1)$.

For example, "$e_0$, $G_x(t_0, r_1)$" included in the following formula (32), "$t_0$" included in the following formula (33), "$u_0$" included in the following formula (26), and "$e_0$, $G_y(r_0, u_0)$" included in the following formula (27) are the first portions. On the other hand, "$Ch_{Ai} \cdot F(r_0 + r_1)$, $e_1$, $Ch_A \cdot F(r_1)$, $G_x(t_1, r_1)$" included in the following formula (24), "$Ch_A \cdot r_0$, $t_1$" included in the following formula (25), "$Ch_A \cdot r_1$, $u_1$" included in the following formula (34), and "$Ch_A \cdot F(r_0)$, $G_y(r_0, u_1)$, $e_1$" included in the following formula (27) are the second portions.

From the definition of the secret key s and the relation among the following formula (24) to formula (27), the fact the secret key s is not obtainable is ensured even when any one of $(r_1, t_1, u_1, e_1)$ and $(r_0, t_1, u_1, e_1)$ is used. Using this property enables, for example, the construction of an efficient algorithm (hereinafter, an extended algorithm) using the cubic polynomial $f_1$ of the ring R.

[Math 14]

$$Ch_A \cdot F(r_0 + r_1) = e_0 + e_1 + Ch_A \cdot F(r_1) + G_x(t_0, r_1) + G_x(t_1, r_1) \quad (24)$$

$$Ch_A \cdot r_0 = t_0 + t_1 \quad (25)$$

$$Ch_A \cdot r_1 = u_0 + u_1 \quad (26)$$

$$Ch_A \cdot F(r_0) + G_y(r_0, u_1) + G_y(r_0, u_0) = e_0 + e_1 \quad (27)$$

Hereinafter, an example of a specific extended algorithm structure will be described. Two basic points regarding design of an extended algorithm are that a message expressed in the following formula (28) and formula (29) is sent to a verifier and that a portion (first portion) dependent on $Ch_A$ is verified for $Ch_A$ selected by the verifier. Here, since "$r_0$ and $r_1$ used at the time of generation of a message are prevented from being substituted with other $r_0$ and $r_1$ at the time of verification," an example of a structure to which the verification on $r_0$ and $r_1$ is added will be introduced below.

[Math 15]

$$c_0 = H(t_0, e_0 - G_y(r_0, u_0)) \tag{28}$$

$$c_1 = H(u_0, G_x(t_0, r_1) + e_0) \tag{29}$$

A basic structure of an extended algorithm related to the 5-pass scheme will be described with reference to FIG. 9. However, further description of the structure of the key generation algorithm Gen will be omitted.

Figure 9:
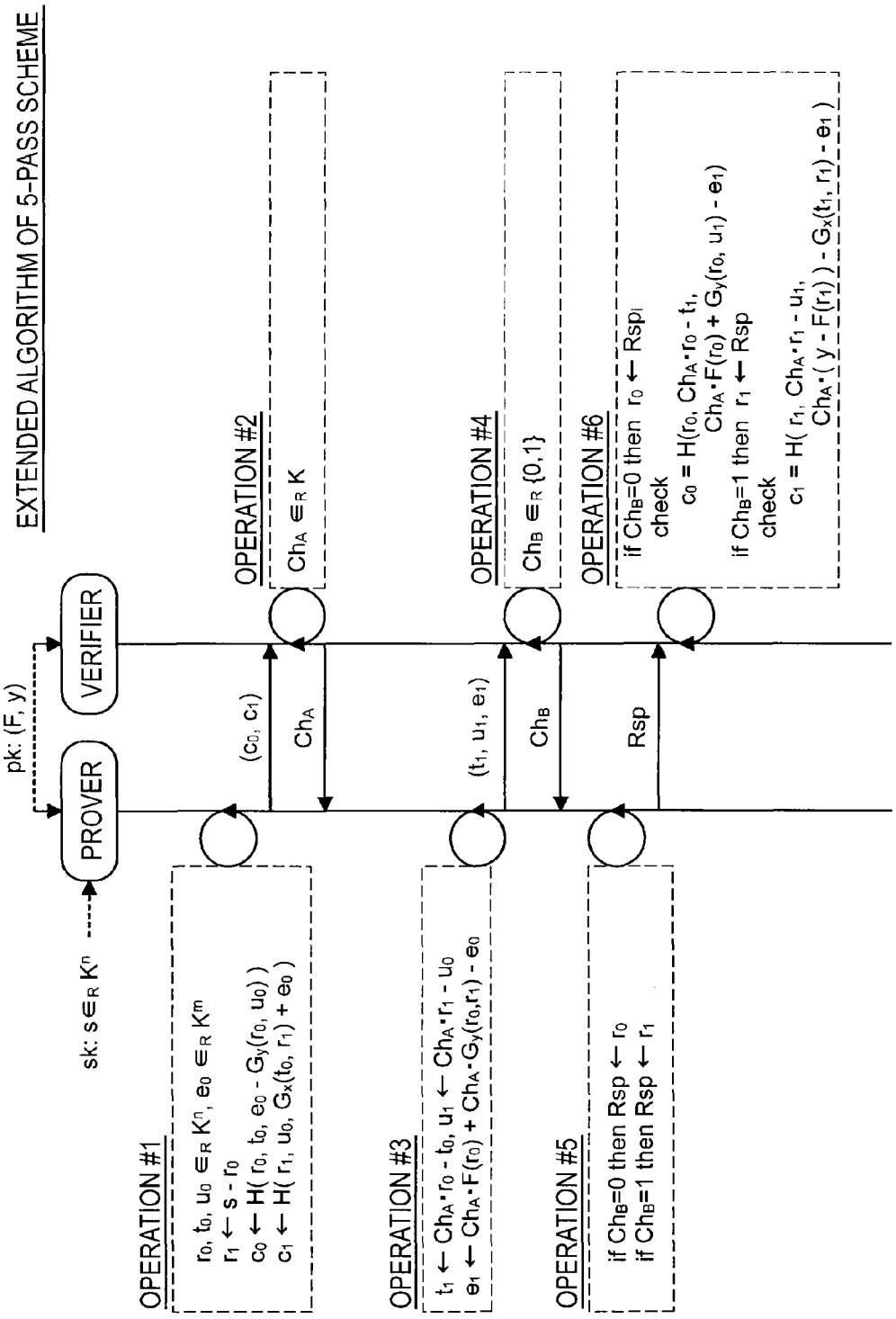
FIG. 9 is an explanatory diagram for describing the parallelization of the efficient algorithm related to the 5-pass public-key authentication scheme.

Operation #1:

As illustrated in FIG. 9, the prover algorithm P randomly generates the vectors $r_0$, $t_0$, $u_0$ that are elements of the set $K^n$, and the vector $e_0$ that is an element of the set $K^m$. Subsequently, the prover algorithm P calculates $r_1 \leftarrow s - r_0$. This calculation is equivalent to masking the secret key s with the vector $r_0$. Subsequently, the prover algorithm P calculates $c_0 \leftarrow H(r_0, t_0, e_0 - G_y(r_0, u_0))$. Subsequently, the prover algorithm P calculates $c_1 \leftarrow H(r_1, u_0, G_x(t_0, r_1) + e_0)$. Messages ($c_0$, $c_1$) generated in operation #1 are sent to the verifier algorithm V.

Operation #2:

Upon receiving the messages ($c_0$, $c_1$), the verifier algorithm V randomly selects a number $Ch_A$. The number $Ch_A$ is sent to the prover algorithm P.

Operation #3:

Upon receiving the number $Ch_A$, the prover algorithm P calculates $t_1 \leftarrow Ch_A \cdot r_0 - t_0$. Subsequently, the prover algorithm P calculates $u_1 \leftarrow Ch_A \cdot r_1 - u_0$. Subsequently, the prover algorithm P calculates $e_1 \leftarrow Ch_A \cdot F(r_0) + Ch_A \cdot G_y(r_0, r1) - e_0$. Then, ($t_1$, $u_1$, $e_1$) generated in operation #3 is sent to the verifier algorithm V.

Operation #4:

Upon receiving ($t_1$, $u_1$, $e_1$), the verifier algorithm V selects which verification pattern to use from between two verification patterns. For example, the verifier algorithm V may select a numerical value from between two numerical values {0, 1} representing verification patterns, and set the selected numerical value in a challenge $Ch_B$. This challenge $Ch_B$ is sent to the prover algorithm P.

Operation #5:

Upon receiving the challenge $Ch_B$, the prover algorithm P generates a response Rsp to send to the verifier algorithm V in response to the received challenge $Ch_B$. In the case where $Ch_B = 0$, the prover algorithm P generates a response $Rsp = r_0$. In the case where $Ch_B = 1$, the prover algorithm P generates a response $Rsp = r_1$. The response Rsp generated in operation #5 is sent to the verifier algorithm V.

Operation #6:

Upon receiving the response Rsp, the verifier algorithm V executes the following verification process using the received response Rsp.

In the case where $Ch_B = 0$, the verifier algorithm V verifies whether or not the equality of $c_0 = H(r0, Ch_A \cdot r_0 - t_1, Ch_A \cdot F(r_0) + G_y(r_0, u_1) - e_1)$ holds. The verifier algorithm V outputs the value 1 to indicate authentication success in the case where these verifications succeed, and outputs the value 0 to indicate authentication failure in the case where a verification fails.

In the case where $Ch_B = 1$, the verifier algorithm V verifies whether or not the equality of $c_1 = H(r_1, Ch_A \cdot r_1 - u_1, Ch_A \cdot (y - F(r_1)) - G_x(t_1, r_1) - e_1)$ holds. The verifier algorithm V outputs the value 1 to indicate authentication success in the case where these verifications succeed, and outputs the value 0 to indicate authentication failure in the case where a verification fails.

The example of the extended algorithm structure related to the 5-pass scheme has been described above. Also, using the cubic polynomial enables realization of higher security.

4: MODIFICATION OF DIGITAL SIGNATURE SCHEME

Next, a method of modifying the foregoing public-key authentication scheme into a digital signature scheme will be introduced.

When a prover in a model of a public-key authentication scheme matches a signer in a digital signature scheme, an approximation to the model of the digital signature scheme can easily be understood in that only a prover can convince a verifier. Based on this idea, a method of modifying the above-described public-key authentication scheme into a digital signature scheme will be described.

[4-1: Modification of 3-Pass Public-Key Authentication Scheme into Digital Signature Scheme (FIG. 10)]

First, modification of a public-key authentication scheme of 3-pass into a digital signature scheme will be described.

Figure 10:
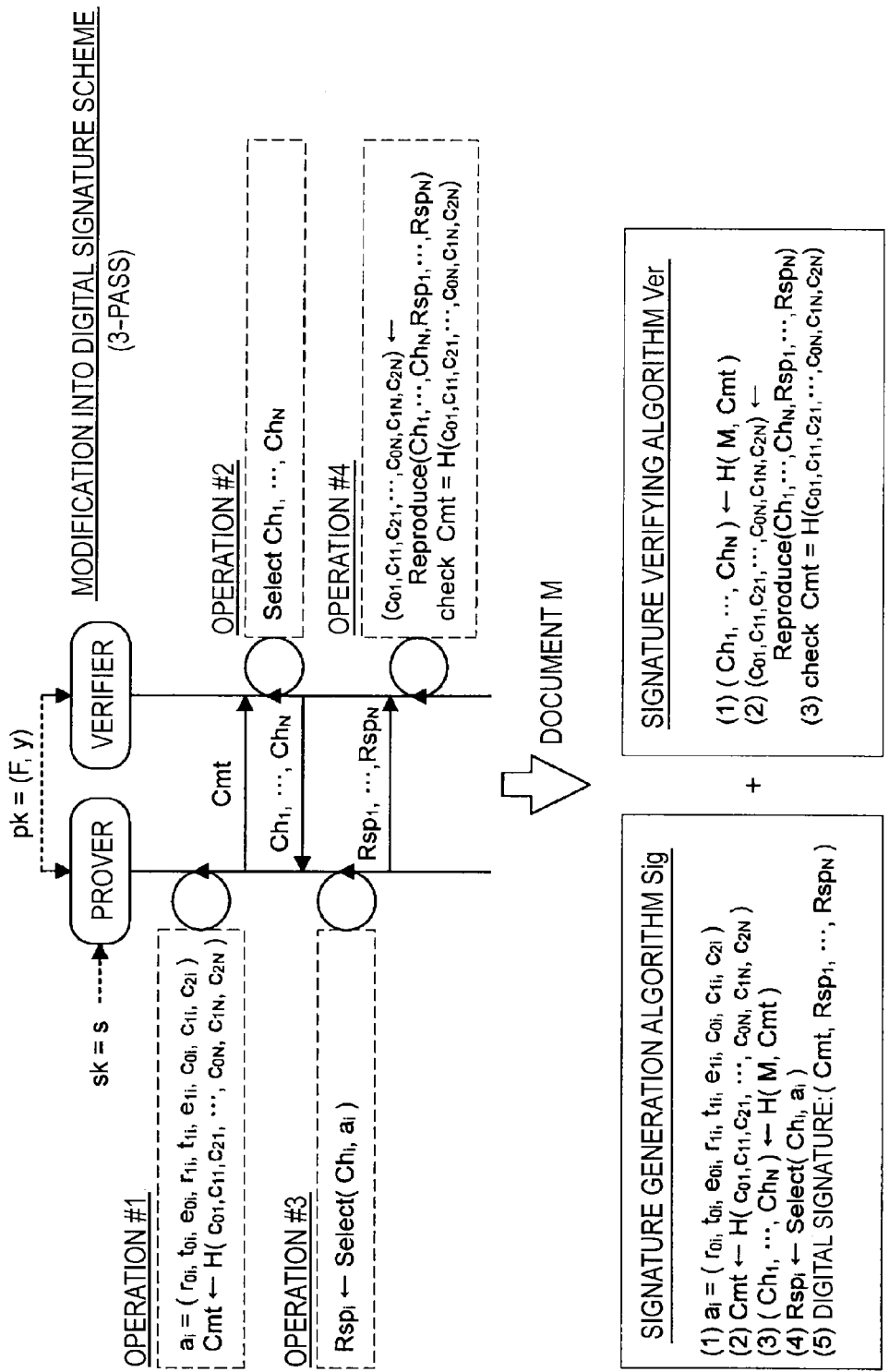
FIG. 10 is an explanatory diagram for describing a method of modifying the efficient algorithm related to the 3-pass public-key authentication scheme into an algorithm of a digital signature scheme.

As illustrated in FIG. 10, an efficient algorithm (for example, see FIG. 5) related to the 3-pass scheme is expressed with interactivity of three times and four operations, i.e., operation #1 to operation #4.

Operation #1 includes a process (1) of generating $a_i = (r_{0i}, t_{0i}, e_{0i}, r_{1i}, t_{1i}, e_{1i}, c_{0i}, c_{1i}, c_{2i})$ and a process (2) of calculating $Cmt \leftarrow H(c_{01}, c_{11}, c_{21}, \ldots, c_{0N}, c_{1N}, c_{2N})$. Cmt generated in operation #1 by the prover algorithm P is sent to the verifier algorithm V.

Operation #2 includes a process of selecting $Ch_1, \ldots, Ch_N$. $Ch_1, \ldots, Ch_N$ selected in operation #2 by the verifier algorithm V are sent to the prover algorithm P.

Operation #3 includes a process of generating $Rsp_1, \ldots, Rsp_N$ using $Ch_1, \ldots, Ch_N$ and $a_1 \ldots, a_N$. This process is expressed as $Rsp_i \leftarrow$ Select $(Ch_i, a_i)$. $Rsp_1, \ldots, Rsp_N$ generated in operation #3 by the prover algorithm P are sent to the verifier algorithm V.

Operation #4 includes a process (1) of reproducing $c_{01}, c_{11}, c_{21}, \ldots, c_{0N}, c_{1N}, c_{2N}$ using $Ch_1, \ldots, Ch_N$ and $Rsp_1, \ldots, Rsp_N$ and a process (2) of verifying $Cmt = H(c_{01}, c_{11}, c_{21}, \ldots, c_{0N}, c_{1N}, c_{2N})$ using the reproduced $c_{01}, c_{11}, c_{21}, \ldots, c_{0N}, c_{1N}, c_{2N}$.

The algorithm of the public-key authentication scheme expressed with the foregoing operation #1 to operation #4 is modified into a signature generation algorithm Sig and a signature verifying algorithm Ver illustrated in FIG. 10.

(Signature Generation Algorithm Sig)

First, the structure of the signature generation algorithm Sig will be described. The signature generation algorithm Sig includes the following processes (1) to (5).

Process (1): The signature generation algorithm Sig generates $a_i = (r_{0i}, t_{0i}, e_{0i}, r_{1i}, t_{1i}, e_{1i}, c_{0i}, c_{1i}, c_{2i})$.

Process (2): The signature generation algorithm Sig calculates $Cmt \leftarrow H(c_{01}, c_{11}, c_{21}, \ldots, c_{0N}, c_{1N}, c_{2N})$.

Process (3): The signature generation algorithm Sig calculates $(Ch_1, \ldots, Ch_N) \leftarrow H(M, Cmt)$. Here, M is a document to which a signature is attached.

Process (4): The signature generation algorithm Sig calculates $Rsp_i \leftarrow$ Select $(Ch_i, a_i)$.

Process (5): The signature generation algorithm Sig sets (Cmt, $Rsp_1, \ldots, Rsp_N$) as a signature.

(Signature Verifying Algorithm Ver)

Next, the structure of the signature verifying algorithm Ver will be described. The signature verifying algorithm Ver includes the following processes (1) to (3).

Process (1): The signature verifying algorithm Ver calculates $(Ch_1, \ldots, Ch_N) \leftarrow H(M, Cmt)$.

Process (2): The signature verifying algorithm Ver generates $c_{01}, c_{11}, c_{21}, \ldots, c_{0N}, c_{1N}, c_{2N}$ using $Ch_1, \ldots, Ch_N$ and $Rsp_1, \ldots, Rsp_N$.

Process (3): The signature verifying algorithm Ver verifies $Cmt=H(c_{01}, c_{11}, c_{21}, \ldots, c_{0N}, c_{1N}, c_{2N})$ using the reproduced $c_{01}, c_{11}, c_{21}, \ldots, c_{0N}, c_{1N}, c_{2N}$.

As described above, by matching the prover in the model of the public-key authentication scheme with the signer in the digital signature scheme, the algorithm of the public-key authentication scheme can be modified into the algorithm of the digital signature scheme.

[4-2: Modification of 5-Pass Public-Key Authentication Scheme into Digital Signature Scheme (FIG. 11)]

Next, a modification of the public-key authentication scheme related to the 5-pass into a digital signature scheme will be described.

Figure 11:
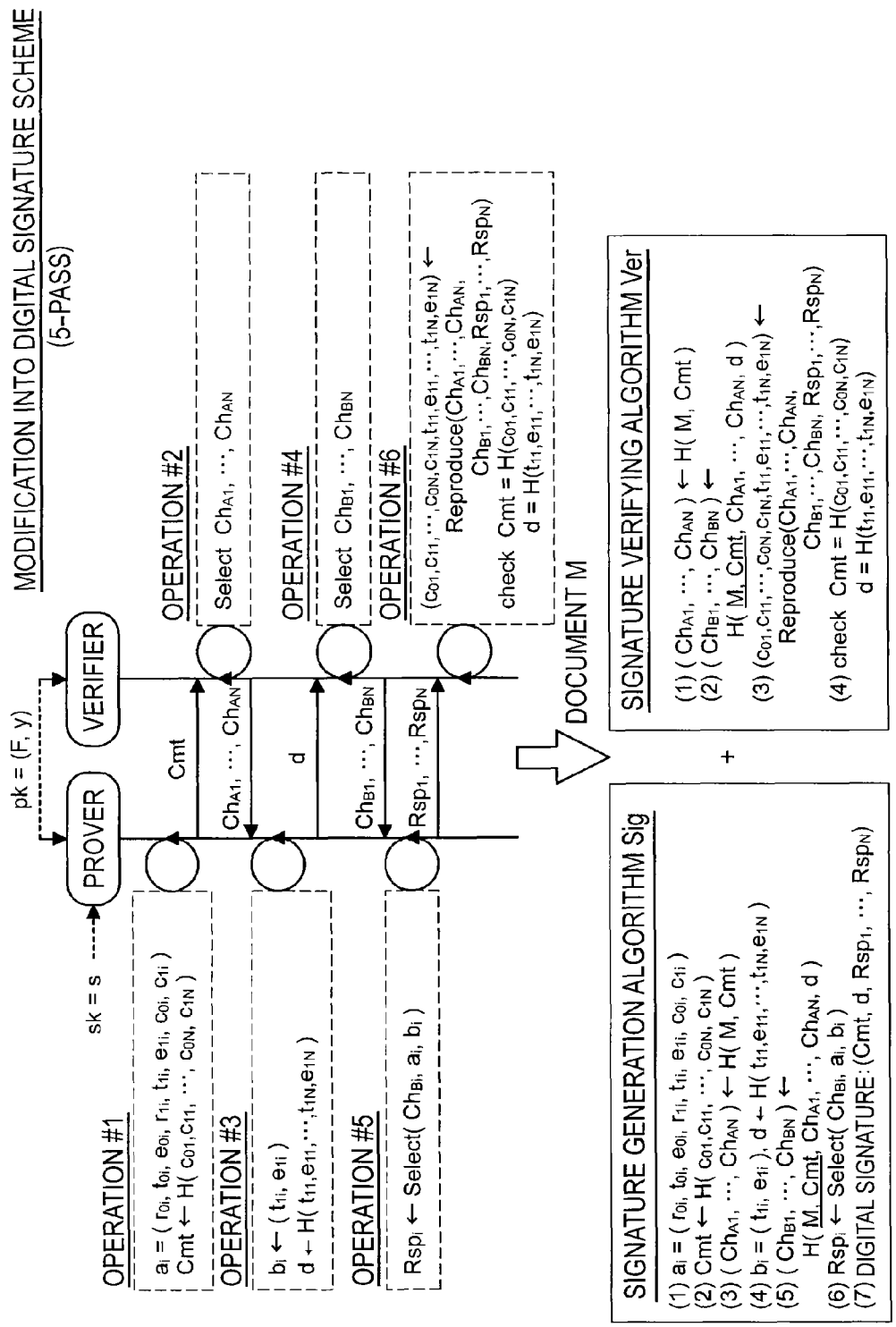
FIG. 11 is an explanatory diagram for describing a method of modifying the efficient algorithm related to the 5-pass public-key authentication scheme into an algorithm of a digital signature scheme.

As illustrated in FIG. 11, an efficient algorithm (for example, see FIG. 8) related to the 5-pass scheme is expressed with interactivity of five times and six operations, i.e., operation #1 to operation #6.

Operation #1 includes a process (1) of generating $a_i=(r_{0i}, t_{0i}, e_{0i}, r_{1i}, t_{1i}, e_{1i}, c_{0i}, c_{1i})$ for i=1 to N and a process (2) of calculating $Cmt \leftarrow H(c_{01}, c_{11}, \ldots, c_{0N}, c_{1N})$. Cmt generated in operation #1 by the prover algorithm P is sent to the verifier algorithm V.

Operation #2 includes a process of selecting $Ch_{A1}, \ldots, Ch_{AN}$. $Ch_{A1}, \ldots, Ch_{AN}$ selected in operation #2 by the verifier algorithm V are sent to the prover algorithm P.

Operation #3 includes a process of generating $b_i=(t_{1i}, e_{1i})$ and a process of generating $d=H(t_{11}, e_{11}, \ldots, t_{1N}, e_{1N})$ for i=1 to N. Here, d generated in operation #3 by the prover algorithm P are sent to the verifier algorithm V.

Operation #4 includes a process of selecting $ChB1, \ldots, Ch_{BN}$. $ChB1, \ldots, Ch_{BN}$ selected in operation #4 by the verifier algorithm V are sent to the prover algorithm P.

Operation #5 includes a process of generating $Rsp_1, \ldots, Rsp_N$ using $Ch_{B1}, \ldots, Ch_{BN}, a_1, \ldots, a_N, b_1, \ldots, b_N$. This process is expressed as $Rsp_i \leftarrow Select(Ch_{Bi}, a_i, b_i)$. $Rsp_1, \ldots, Rsp_N$ generated in operation #5 by the prover algorithm P are sent to the verifier algorithm V.

Operation #6 includes a process of reproducing $c_{01}, c_{11}, \ldots, c_{0N}, c_{1N}, t_{11}, e_{11}, \ldots, t_{1N}, e_{1N}$ using $Ch_{A1}, \ldots, Ch_{AN}, Ch_{B1}, \ldots, Ch_{BN}, Rsp_1, \ldots, Rsp_N$, and a process of verifying $Cmt=H(c_{01}, c_{11}, \ldots, c_{0N}, c_{1N})$ using the reproduced $c_{01}, c_{11}, \ldots, c_{0N}, c_{1N}$ and a process of verifying $d=H(t_{11}, e_{11}, \ldots, t_{1N}, e_{1N})$.

The algorithm of the public-key authentication scheme expressed with the foregoing operation #1 to operation #6 is modified into a signature generation algorithm Sig and a signature verifying algorithm Ver illustrated in FIG. 11.

(Signature Generation Algorithm Sig)

First, the structure of the signature generation algorithm Sig will be described. The signature generation algorithm Sig includes the following processes (1) to (7).

Process (1): The signature generation algorithm Sig generates $a_i=(r_{0i}, t_{0i}, e_{0i}, r_{1i}, t_{1i}, e_{1i}, c_{0i}, c_{1i})$.

Process (2): The signature generation algorithm Sig calculates $Cmt \leftarrow H(c_{01}, c_{11}, \ldots, c_{0N}, c_{1N})$.

Process (3): The signature generation algorithm Sig calculates $(Ch_{A1}, \ldots, Ch_{AN}) \leftarrow H(M, Cmt)$. Here, M is a document to which a signature is attached.

Process (4): The signature generation algorithm Sig generates $b_i=(t_{1i}, e_{1i})$ for i=1 to N. Further, the signature generation algorithm Sig calculates $d=H(t_{11}, e_{11}, \ldots, t_{1N}, e_{1N})$.

Process (5): The signature generation algorithm Sig calculates $(Ch_{B1}, \ldots, Ch_{BN}) \leftarrow H(M, Cmt, Ch_{A1}, \ldots, Ch_{AN}, d)$. Additionally, modification into $(Ch_{B1}, \ldots, Ch_{BN}) \leftarrow H(Ch_{A1}, \ldots, Ch_{AN}, d)$ may be performed.

Process (6): The signature generation algorithm Sig calculates $Rsp_i \leftarrow Select(Ch_{Bi}, a_i, b_i)$.

Process (7): The signature generation algorithm Sig sets (Cmt, d, $Rsp_1, \ldots, Rsp_N$) as a digital signature.

(Signature Verifying Algorithm Ver)

Next, the structure of the signature verifying algorithm Ver will be described. The signature verifying algorithm Ver includes the following processes (1) to (4).

Process (1): The signature verifying algorithm Ver calculates $(Ch_{A1}, \ldots, Ch_{AN})=H(M, Cmt)$.

Process (2): The signature verifying algorithm Ver calculates $(Ch_{B1}, \ldots, Ch_{BN})=H(M, Cmt, Ch_{A1}, \ldots, Ch_{AN}, d)$. When modification into $(Ch_{B1}, \ldots, Ch_{BN})=H(Ch_{A1}, \ldots, Ch_{AN}, d)$ is performed in the process (5) performed by the signature verifying algorithm Ver, the signature verifying algorithm Ver calculates $(Ch_{B1}, \ldots, Ch_{BN})=H(Ch_{A1}, \ldots, Ch_{AN}, d)$.

Process (3): The signature verifying algorithm Ver generates $t_{11}, e_{11}, \ldots, t_{1N}, e_{1N}, c_{01}, c_{11}, \ldots, c_{0N}, c_{1N}$ using $Ch_{A1}, \ldots, Ch_{AN}, Ch_{B1}, Ch_{BN}, Rsp_1, \ldots, Rsp_N$.

Process (4): The signature verifying algorithm Ver verifies $Cmt=H(c_{01}, c_{11}, \ldots, c_{0N}, c_{1N})$ using the reproduced $c_{01}, c_{11}, \ldots, c_{0N}, c_{1N}$, and $d=H(t_{11}, e_{11}, \ldots, t_{1N}, e_{1N})$.

As described above, by matching the prover in the model of the public-key authentication scheme with the signer in the digital signature scheme, the algorithm of the public-key authentication scheme can be modified into the algorithm of the digital signature scheme.

5: METHOD OF REDUCING MEMORY AMOUNT NECESSARY FOR SIGNATURE VERIFICATION

Incidentally, in the above-described algorithm of the digital signature scheme, the signature verifying process has been executed after the signature verifying algorithm Ver receives all of the digital signatures. However, in the case of the above-described digital signature scheme, a data size of the digital signature is relatively large. For this reason, when authentication is executed using a device such as Radio Frequency IDentification (RFID), having only a small memory capacity, it is necessary to pay attention to a free capacity of a memory, a memory use ratio during an authentication process, or the like. Also, when a device having insufficient memory capacity is used, authentication is assumed not to be executed in some cases. Accordingly, the inventors of the present technology have devised a method of reducing a memory amount necessary for signature verification.

[5-1: Structure of Hash Function (FIG. 12)]

First, the inventors of the present technology focused on the structure of a hash function. In many cases, a hash function has a structure for grouping inputs in units of blocks and executing a process sequentially in the units of blocks. For example, in the case of SHA-1, the hash function has a structure illustrated in FIG. 12. The hash function illustrated in FIG. 12 generates a hash value by grouping padded inputs M into Z blocks $m_1, \ldots, m_Z$ and operating blocks $m_j$ to a predetermined function CF along with an initial value IV or an intermediate value $CV_j$ sequentially while increasing an index j. Thus, when the intermediate value $CV_j$ is obtained, the previously used blocks become unnecessary. Accordingly, based on the characteristics, a structure (hereinafter referred to as a memory reduction method) for efficiently reducing a memory amount necessary for executing an algorithm has been devised. A method of applying this structure to the above-described digital signature scheme will be described below.

[5-2: Example of Application to Digital Signature Scheme Based on 3-Pass Scheme (FIG. 14)]

First, a method of applying the foregoing memory reduction method to the algorithm of the digital signature scheme based on the 3-pass scheme illustrated in FIG. 10 will be described.

Figure 13:
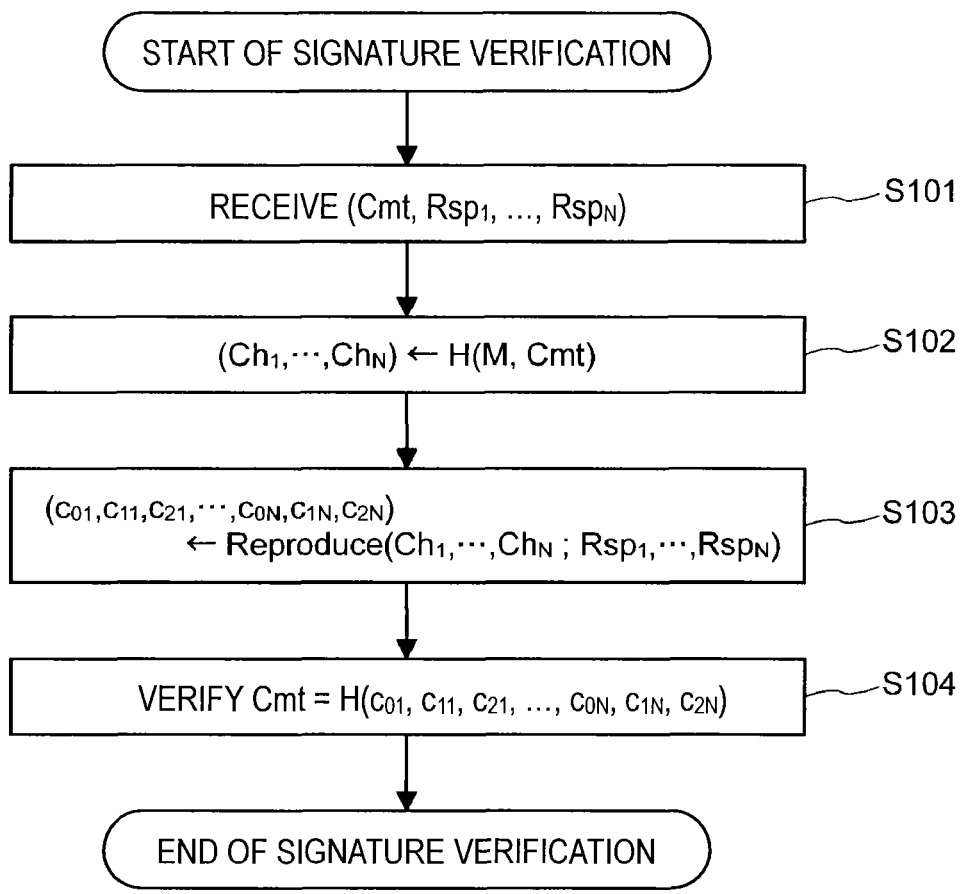
FIG. 13 is an explanatory diagram for describing a signature verification method (normal mounting method) related to the digital signature scheme based on the 3-pass scheme.

(Normal Mounting Method: FIG. 13)

Normally, as illustrated in FIG. 13, the signature verifying algorithm Ver related to the above-described digital signature scheme receives (Cmt, $Rsp_1, \ldots, Rsp_N$) included in the digital signature at one time (S101). Subsequently, the signature verifying algorithm Ver executes ($Ch_1, \ldots, Ch_N$)←H(M, cmt) (S102). Subsequently, the signature verifying algorithm Ver executes ($c_{01}, c_{11}, c_{21}, \ldots, c_{0N}, c_{1N}, c_{2N}$)←Reproduce ($Ch_1, \ldots, Ch_N; Rsp_1, \ldots, Rsp_N$) (S103). Subsequently, the signature verifying algorithm Ver verifies Cmt=H($c_{01}, c_{11}, c_{21}, \ldots, c_{0N}, c_{1N}, c_{2N}$) (S104) and ends the series of processes related to signature verification.

Figure 14:
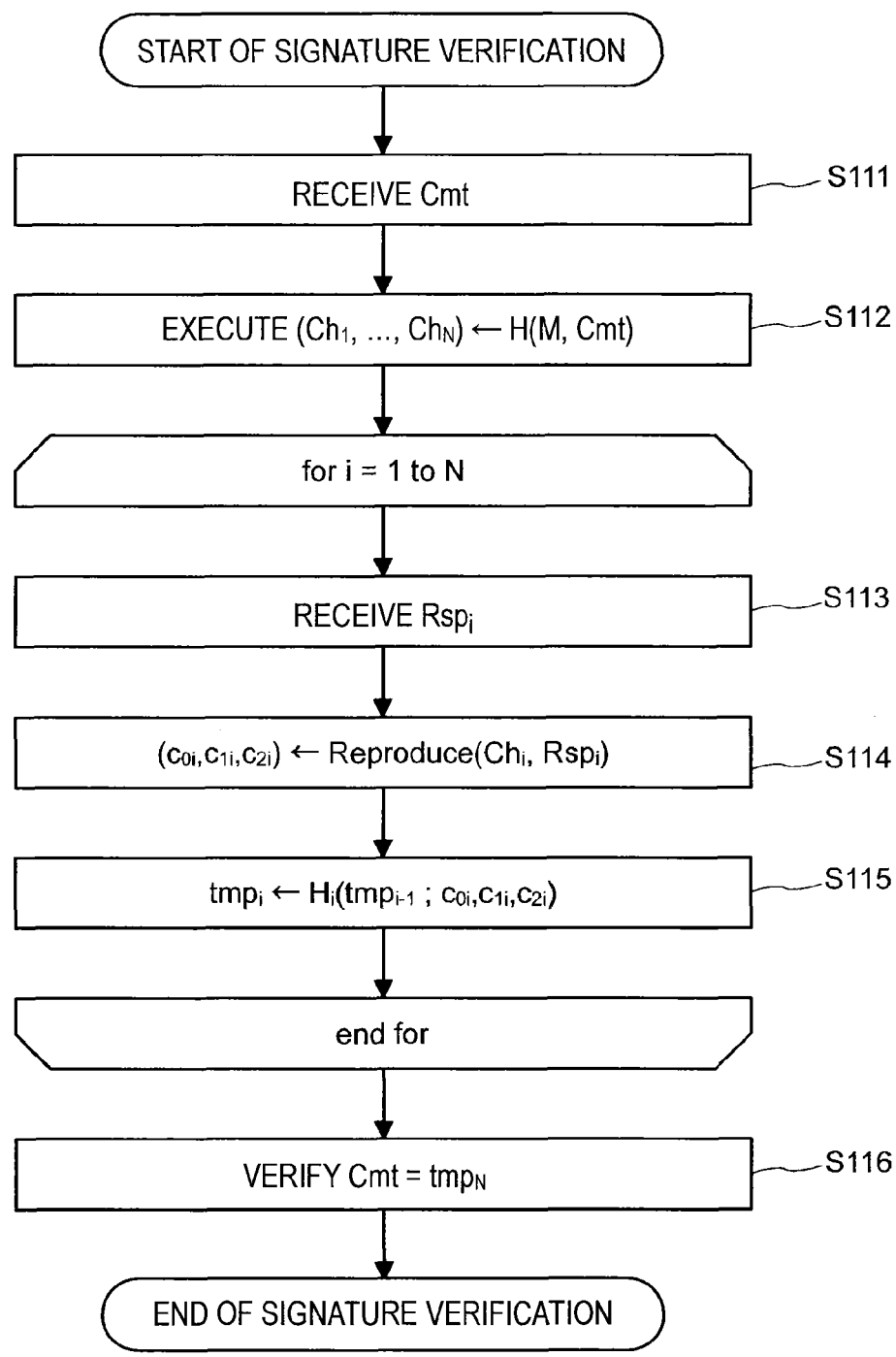
FIG. 14 is an explanatory diagram for describing a signature verification method (memory reduction method) related to the digital signature scheme based on the 3-pass scheme.

(Memory Reduction Method: FIG. 14)

Figure 12:
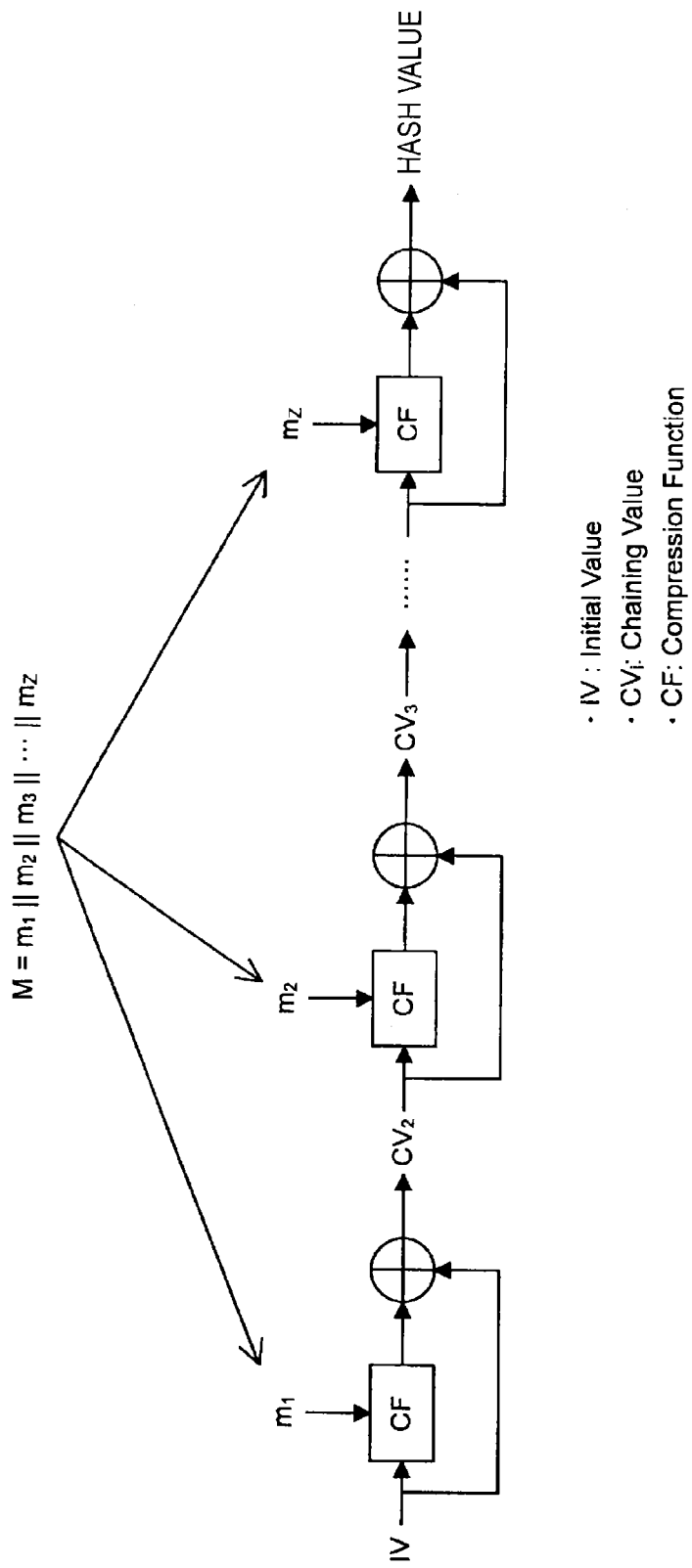
FIG. 12 is an explanatory diagram for describing an example of a hash function structure.

In the case of the normal mounting method, when the digital signatures are received at one time as in step S101 of FIG. 13, a memory used to store ($Rsp_1, \ldots, Rsp_N$) until completion of the process of step S103 is necessary. However, as understood from the algorithm structure of FIG. 5, no information is used except ($Ch_i; Rsp_i$) in the reproduction of ($c_{0i}, c_{1i}, c_{2i}$) executed in step S103. Also, when the hash function structure illustrated in FIG. 12 is considered, the calculation of the hash function executed in step S104 is understood to be grouped and executed in the units of blocks. Accordingly, the structure related to the signature verification is improved to a structure illustrated in FIG. 14.

In the case of the structure illustrated in FIG. 14, the signature verifying algorithm Ver first receives only Cmt included in the digital signature (S111). Subsequently, the signature verifying algorithm Ver executes ($Ch_1, \ldots, Ch_N$)←H(M, cmt) (S112). Subsequently, the signature verifying algorithm Ver sequentially executes processes of steps S113 to S115 while increasing i for i=1 to N.

In step S113, the signature verifying algorithm Ver receives $Rsp_i$ (S113). Subsequently, the signature verifying algorithm Ver executes ($c_{0i}, c_{1i}, c_{2i}$)←Reproduce ($Ch_i; Rsp_i$) using the received $Rsp_i$ (S114). After the process of step S114 is executed, $Ch_i$ and $Rsp_i$ become unnecessary. Accordingly, the signature verifying algorithm Ver erases $Ch_i$ and $Rsp_i$ from the memory after executing the process of step S114.

Subsequently, the signature verifying algorithm Ver executes $tmp_i$←$H_i$ ($tmp_{i-1}; c_{0i}, c_{1i}, c_{2i}$) (step S115). Also, the hash function $H_i$ is a function that outputs an intermediate value generated when up to $c_{0i}, c_{1i}, c_{2i}$ are calculated in the hash function H. In practice, since an input size of the function $H_i$ is different according to the selected function, suitable correction of an input length such as addition of bits is executed as necessary. When the function Hi is used, the hash function H is expressed as an algorithm including processes (1) to (3) to be described below. Then, $tmp_N$ is the final output (hash value) of the hash function H. In practice, an addition process of padding is executed in the final process according to the specification of the hash function.

Process (1): $tmp_0$←null character string
Process (2):
for i=1 to N
$tmp_i$←$H_i$ ($tmp_{i-1}; c_{0i}, c_{1i}, c_{2i}$)
end for
Process (3): output $tmp_N$ After executing the processes of steps S113 to S115 for i=1 to N, the signature verifying algorithm Ver verifies whether or not Cmt=$tmp_N$ holds (S116) and ends the series of processes related to the signature verification. As described above, the signature verifying algorithm Ver erases the information that becomes unnecessary during the repeated execution of the processes of steps S113 to S115 from the memory. For this reason, a memory amount necessary for the signature verification is suppressed to be as small as possible. Consequently, the foregoing signature verification can be executed even in a device having only a small memory capacity.

[5-3: Example of Application to Digital Signature Scheme Based on 5-Pass Scheme (FIG. 16)]

Next, a method of applying the foregoing memory reduction method to the algorithm of the digital signature scheme based on the 5-pass scheme illustrated in FIG. 11 will be described.

Figure 15:
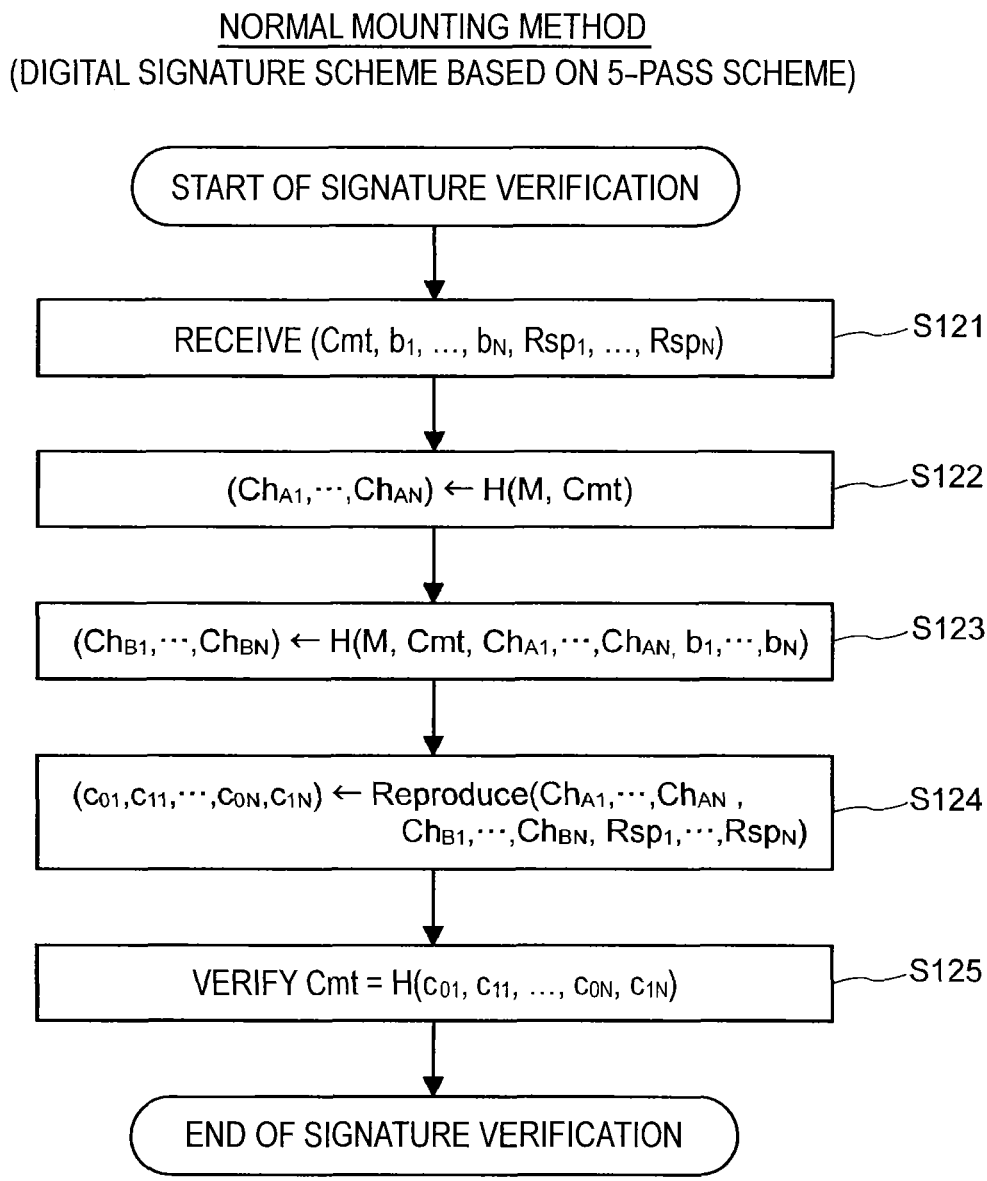
FIG. 15 is an explanatory diagram for describing a signature verification method (normal mounting method) related to the digital signature scheme based on the 5-pass scheme.

(Normal Mounting Method: FIG. 15)

Normally, as illustrated in FIG. 15, the signature verifying algorithm Ver related to the above-described digital signature scheme receives (Cmt, d, $Rsp_1, \ldots, Rsp_N$) included in the digital signature at one time (S121). Subsequently, the signature verifying algorithm Ver executes ($Ch_{A1}, \ldots, Ch_{AN}$)←H(M, cmt) (S122). Subsequently, the signature verifying algorithm Ver executes ($Ch_{B1}, \ldots, Ch_{BN}$)←H(M, Cmt, $Ch_{A1}, \ldots, Ch_{AN}$, d) (S123). Subsequently, the signature verifying algorithm Ver executes ($c_{01}, c_{11}, \ldots, c_{0N}, c_{1N}, d_{11}, e_{11}, \ldots, d_{1N}, e_{1N}$)←Reproduce ($Ch_{A1}, \ldots, Ch_{AN}, Ch_{B1}, \ldots, Ch_{BN}; Rsp_1, \ldots, Rsp_N$) (S124). Subsequently, the signature verifying algorithm Ver verifies Cmt=H($c_{01}, c_{11}, \ldots, c_{0N}, c_{1N}$) and d=H($d_{11}, e_{11}, \ldots, d_{1N}, e_{1N}$) (S125) and ends the series of processes related to signature verification.

Figure 16:
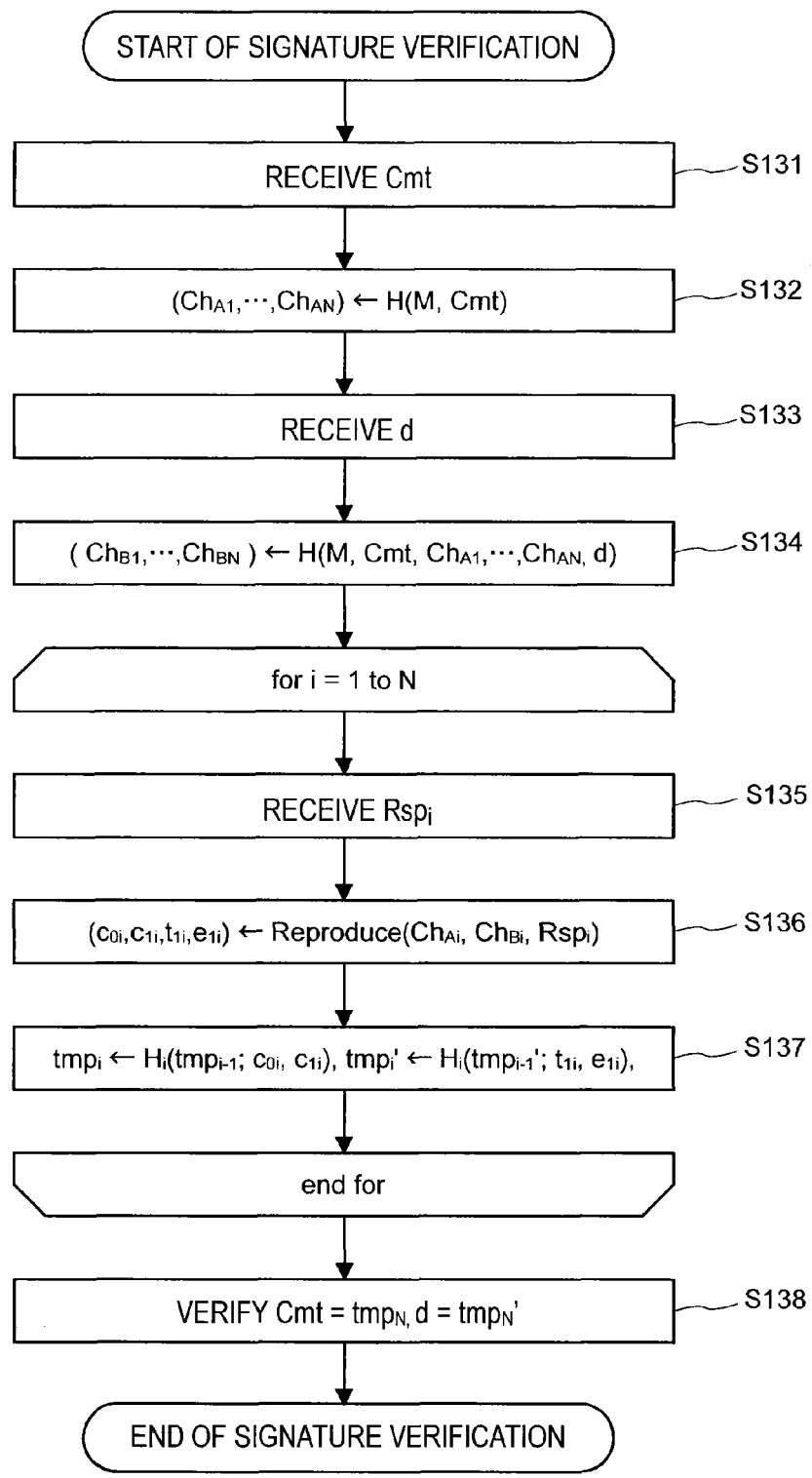
FIG. 16 is an explanatory diagram for describing a signature verification method (memory reduction method) related to the digital signature scheme based on the 5-pass scheme.

(Memory Reduction Method: FIG. 16)

When the digital signatures are received at one time as in step S121 of FIG. 15, a memory used to store ($Rsp_1, \ldots, Rsp_N$) until completion of the process of step S124 is necessary. However, as understood from the algorithm structure of FIG. 8, no information is used except ($Ch_{Ai}, Ch_{Bi}; Rsp_i$) in the reproduction of ($c_{0i}, c_{1i}, d_{1i}, e_{1i}$) executed in step S124. Also, when the hash function structure illustrated in FIG. 12 is considered, the calculation of the hash function executed in step S125 is understood to be grouped and executed in the units of blocks. Accordingly, the structure related to the signature verification is improved to a structure illustrated in FIG. 16.

In the case of the structure illustrated in FIG. 16, the signature verifying algorithm Ver first receives only Cmt included in the digital signature (S131). Subsequently, the signature verifying algorithm Ver executes ($Ch_{A1}, \ldots, Ch_{AN}$)←H(M, cmt) (S132).

Subsequently, the signature verifying algorithm Ver receives d (S133). Subsequently, the signature verifying algorithm Ver executes ($Ch_{B1}, \ldots, Ch_{BN}$)←H(M, Cmt, $Ch_{A1}, \ldots, Ch_{AN}$, d) using the received d (S134). After the process of step S134 is executed, d becomes unnecessary.

Accordingly, the signature verifying algorithm Ver erases d from the memory after executing the process of step S134. Subsequently, the signature verifying algorithm Ver sequentially executes processes of steps S135 to S137 while increasing i for i=1 to N.

In step S135, the signature verifying algorithm Ver receives $Rsp_i$ (S135). Subsequently, the signature verifying algorithm Ver executes $(c_{0i}, c_{1i}, t_{1i}, e_{1i}) \leftarrow$ Reproduce $(Ch_{Ai}, Ch_{Bi}; Rsp_i)$ using the received $Rsp_i$ (S136). After the process of step S136 is executed, $Ch_{Ai}$, $Ch_{Bi}$, and $Rsp_i$ become unnecessary. Accordingly, the signature verifying algorithm Ver erases $Ch_{Ai}$, $Ch_{Bi}$, and $Rsp_i$ from the memory after executing the process of step S136.

Subsequently, the signature verifying algorithm Ver executes $tmp_i \leftarrow H_i (tmp_{i-1}; c_{0i}, c_{1i})$ and $tmp_i' \leftarrow H_i (tmp_{i-1}'; t_{1i}, e_{1i})$ (step S137). After executing the processes of steps S135 to S137 for i=1 to N, the signature verifying algorithm Ver verifies whether or not $Cmt = tmp_N$ and $d = tmp_N'$ hold (S138) and ends the series of processes related to the signature verification. As described above, the signature verifying algorithm Ver erases the information that becomes unnecessary during the repeated execution of the processes of steps S135 to S137 from the memory. For this reason, a memory amount necessary for the signature verification is suppressed to be as small as possible. Consequently, the foregoing signature verification can be executed even in a device having only a small memory capacity.

The methods of reducing a memory amount necessary for the signature verification have been described above.

6: METHOD OF EXTRACTING TERNARY RANDOM NUMBER SEQUENCE FROM BINARY RANDOM NUMBER SEQUENCE

Incidentally, there is a situation in which N or more ternary uniform random numbers are generated in the algorithm of the public-key authentication scheme based on the 3-pass scheme. However, an excellent random number generator generating ternary uniform random numbers is not typical. For this reason, it is necessary to consider a method of generating ternary uniform random numbers using an excellent random number generator that generates binary uniform random numbers. Accordingly, the inventors of the present technology have devised methods of efficiently generating ternary uniform random numbers from binary uniform random numbers. Hereinafter, these methods will be described in detail. In the following description, one number expressed in base 1 (where 1 is 2 or 3) is assumed to be counted as 1 symbol.

[6-1: Extraction Method #1 (2-Bit Grouping) (FIG. 17)]

First, a method (hereinafter referred to as extraction method #1) of grouping binary numbers of M bits by two bits each and extracting ternary numbers will be introduced with reference to FIG. 17. As illustrated in FIG. 17, when a random number string in binary representation is grouped by two bits each, M/2 2-bit random numbers can be obtained. For example, when "00" is matched with the ternary numeral "0," "01" is matched with the ternary numeral "1," and "10" is matched with the ternary numeral "2," ternary random number strings can be obtained from the random number of the binary representation in the units of 2 bits. However, the 2-bit value "11" is excluded. That is, extraction method #1 is a method of extracting $3^1$ methods expressed by 1 ternary symbol from $2^2$ methods expressed by 2 binary symbols. Thus, a probability $P_1$ of N or more ternary numerals not being extractable is expressed as in the following formula (30).

[Math 16]

$$P_1 = \sum_{M/2 - N < i \leq M/2} {}_{M/2}C_i (1/4)^i (3/4)^{M/2-i} \tag{30}$$

[6-2: Extraction Method #2 (No Grouping) (FIG. 18)]

Next, a method (hereinafter referred to as extraction method #2) of extracting random numbers of L ternary symbols using random numbers of M binary symbols without grouping will be introduced with reference to FIG. 18. Here, L is the maximum integer satisfying $3^L \leq 2^M$. There is a number $2^M$ expressible by the M binary symbols. On the other hand, there is only a number $3^L$ expressible by L ternary symbols. For this reason, of $2^M$ expressed by the M binary symbols, $2^M - 3^L$ are not used as the random numbers of the ternary representation. Thus, a probability $P_2$ of N or more ternary numerals not being extractable is expressed as in the following formula (31).

[Math 17]

$$P_2 = 1 - 3^L / 2^M \tag{31}$$

[6-3: Extraction Method #3 (k-Bit Grouping) (FIG. 19)]

Figures 19, 20:
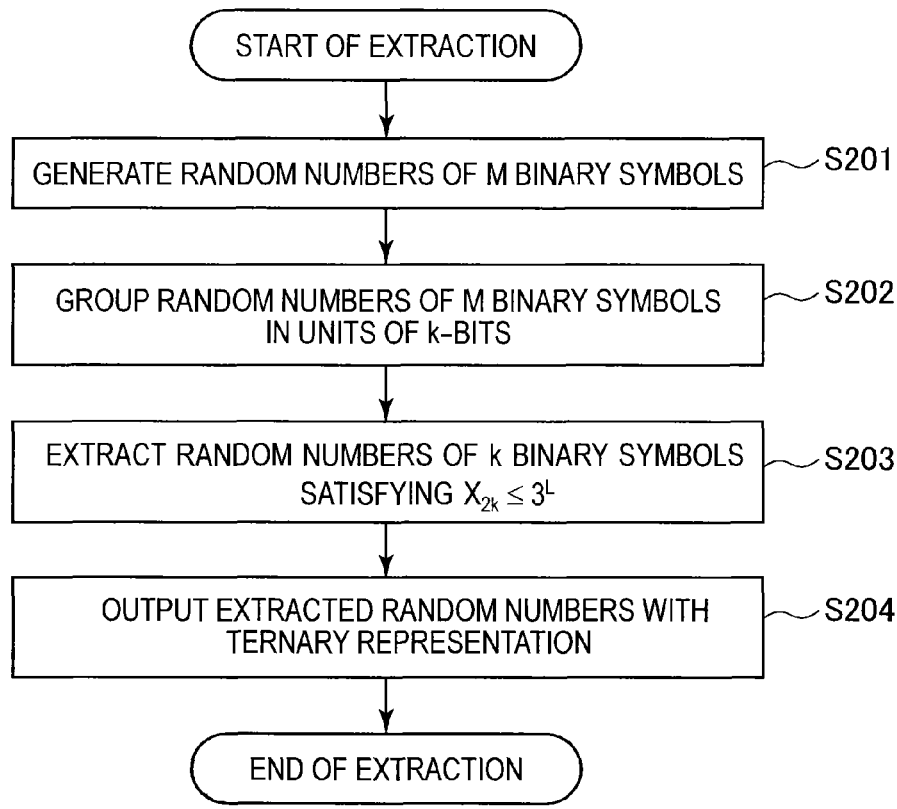
FIG. 19 is an explanatory diagram for describing a method (extraction method #3) of extracting ternary random numbers from binary random numbers.
FIG. 20 is an explanatory diagram for describing a method (extraction method #3) of extracting ternary random numbers from binary random numbers.

The foregoing extraction method #1 is a method of grouping a random number string of the binary representation in the minimum grouping unit. On the other hand, the foregoing extraction method #2 is a method of grouping a random number string of the binary representation in the maximum grouping unit (since M-bit grouping is considered). As understood from the foregoing formulas (30) and (31), a probability that N or more ternary numerals may not be extracted is different according to the grouping length. Additionally, when a random number string of M binary symbols is grouped in units of k bits, as illustrated in FIG. 19, a probability $P_3$ of N or more ternary numerals not being extractable is expressed as in the following formula (32).

[Math 18]

$$P_3 = \sum_{M/k - N/L < i \leq M/k} {}_{M/k}C_i (1 - 3^L/2^k)^i (3^L/2^k)^{M/k-i} \tag{32}$$

When the probability $P_3$ of N or more ternary numerals not being extractable can be minimized, a random number string of the ternary representation can be extracted most efficiently. For example, when M=512 and N=140, the probability $P_3$ is minimized when k=8.

(6-3-1: Basic Structure (FIG. 20))

Here, the flow of a process of extracting a random number string of L ternary symbols from a random number string of M binary symbols will be described with reference to FIG. 20. As illustrated in FIG. 20, a random number string of M binary symbols is first generated (S201). Subsequently, the random number string of the M binary symbols is grouped in units of k bits (S202). Subsequently, a bit string satisfying $X_{2k} \leq 3^L$ is extracted from the bit strings $X_{2k}$ grouped in the units of k bits (S203). Subsequently, the extracted bit string is output with ternary representation (S204) and the series of processes ends.

(6-3-2: Additional Extraction Method (FIG. 21))

By calculating the length k of the grouping by which the probability $P_3$ expressed in the foregoing formula (15) is the minimum and executing the algorithm illustrated in FIG. 20, it is possible to efficiently extract a random number string of the ternary representation from a random number string of the binary representation. However, the inventors of the present technology have devised a method of extracting a random number string of the ternary representation more efficiently by focusing on the fact that a bit string satisfying $X_{2k} > 3^L$ is not used in step S204 of FIG. 20. This method will be described below with reference to FIG. 21.

Figure 21:
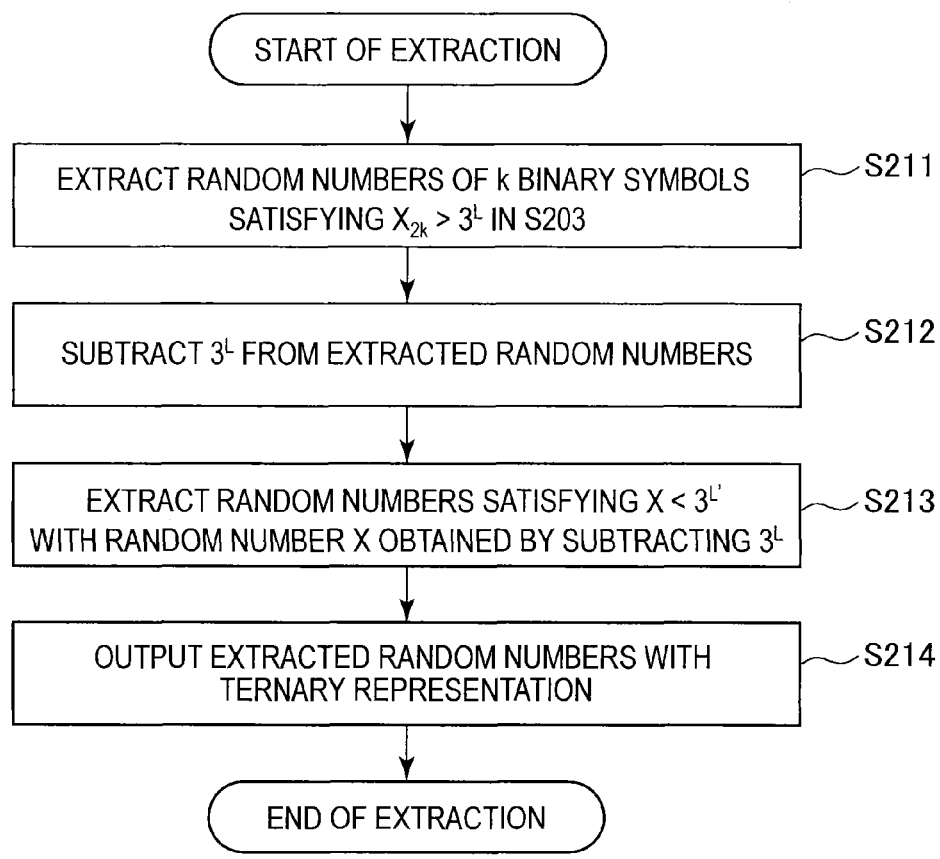
FIG. 21 is an explanatory diagram for describing a method (extraction method #3) of extracting ternary random numbers from binary random numbers.

This method is a method of extracting a symbol string of the ternary representation using bit strings not extracted in step S204 of FIG. 20. As illustrated in FIG. 21, a set of bit strings that are not extracted in step S204 of FIG. 20 and satisfy $X_{2k} > 3^L$ (for example, when a set of bit strings is expressed as $y_1 y_2 \ldots y_N$, an individual bit string $y_i$ satisfies $3^L \leq y_i < 2^k$) is first extracted (S211). Subsequently, $3^L$ is subtracted from each extracted bit string $y_i$ and a set of new bits strings (for example, when a set of new bit strings is expressed as $z_1 z_2 \ldots z_N$, an individual bit string $z_i = y_i - 3^L$ satisfies $0 \leq z_i < 2^k - 3^L$) is calculated (S212).

Subsequently, a bit string X satisfying $X < 3^{L'}$ is extracted from the set of new bit strings (S213). Here, L' is the maximum integer satisfying $3^{L'} \leq 2^k - 3^L$. Subsequently, the bit string extracted in step S213 is output with the ternary representation (S214) and the series of processes ends. By applying this algorithm, L' ternary numerals can be newly extracted at a probability $3^{L'}/(2^k - 3^L)$. Also, by recursively using this method, more ternary numerals can be extracted. That is, ternary numerals can be extracted similarly from the bit strings satisfying $X \geq 3^{L'}$ in step S213.

The method of efficiently generating ternary uniform random numbers from binary uniform random numbers has been described above.

7: METHOD OF EFFICIENTLY SUBSTITUTING COEFFICIENTS OF MULTIVARIATE POLYNOMIALS

However, a method of sharing the multivariate polynomials between a prover (or a signer) and a verifier has not been specifically described above. A conceivable method of sharing the multivariate polynomials includes a method of sharing a seed used at the time of generation of coefficients (random numbers) of the multivariate polynomials between the prover and the verifier. However, the multivariate polynomials may not be shared as long as a sequence by which random numbers generated using the shared seed are applied to the coefficients is not shared between the prover and the verifier.

[7-1: Basic Determination]

Accordingly, basic determination is executed with regard to a sequence by which a random number string generated using a seed shared between a prover (or a signer) and a verifier is applied to the multivariate polynomials. Then, when the multivariate polynomials are used, a random number string is applied to the multivariate polynomials according to this basic determination. When this method is used, the multivariate polynomials are shared between a prover (or a signer) and a verifier.

[7-2: Structuring of Data]

However, a number of coefficients of the multivariate polynomials is considerable. When one coefficient is expressed in units of 1 bit, data of at least several tens of thousands of bits is necessary to express a multivariate polynomial. For this reason, the load of a process of substituting numbers for the coefficients of a multivariate polynomial is very high. Accordingly, the inventors of the present technology have devised techniques (structuring techniques #1 and #2) for realizing efficiency of the process of substituting numbers for coefficients by structuring the coefficients of a multivariate polynomial in predetermined units. Also, the inventors of the present technology have devised a technique (structuring technique #3) for improving the processing efficiency when a substitution process is executed a plurality of times on the coefficients of the same multivariate polynomial. These techniques will be described in detail below.

(7-2-1: Structuring Technique #1 (FIGS. 22 to 26))

First, structuring technique #1 will be described. As illustrated in FIGS. 22 and 23, structuring technique #1 is a technique for collecting coefficients of the same kind of terms included in a multivariate polynomial as one data structure. In the example of FIG. 22, coefficients $a_{1IJ}$ to $a_{MIJ}$ of a multivariate polynomial F are collected as data structure A and coefficients $b_{1I}$ to $b_{MI}$ are collected as data structure B. Also, as illustrated in FIG. 23, the same technique is also applicable to a multivariate polynomial G. In this case, the coefficients $(a_{1IJ} + a_{1JI})$ to $(a_{MIJ} + a_{MJI})$ are collected as data structures.

When structuring technique #1 is not applied, calculation of the multivariate polynomial F including M N-variable polynomials is executed by an algorithm shown in (example 1). In the case of (example 1), it is necessary to execute a 1-bit AND operation (&) $2 \times N \times (N+1) \times M/2$ times. Also, it is necessary to execute a 1-bit XOR operation (^) $1 \times N \times (N+1) \times M/2$ times. Here, an input x is assumed to have N bits.

Example 1

```
input x;
for L = 1 to M
    for I = 1 to N
        for J = I to N
            [L^{th} bit of y] ^ = [a_{LIJ}] & [I^{th} bit of x] & [J^{th} bit of x];
        end for
    end for
end for
output y;
```

On the other hand, as illustrated in FIG. 22, when the coefficients are structured and generated random numbers are applied sequentially some at a time as the coefficients of the multivariate polynomial F, a coefficient substitution algorithm is expressed as in (example 2). In the case of (example 2), an M-bit AND operation (&) is executed merely $2 \times N \times (N+1)/2$ times and an M-bit XOR operation (^) is executed merely $N \times (N+1)/2$ times. Also, $a_{(1 \text{ to } M)IJ}$ are generated at a timing of each loop. The coefficients may be used in reverse. For example, when a loop is executed $N(N-1)/2$ times, $[a_{(1 \text{ to } M)IJ}]$ may not be generated every time, but may be generated only once every M times. Also, during a loop of M times, $[a_{(1 \text{ to } M)IJ}]$ may be used whiling rotating them bit by bit.

Example 2

```
input x;
for I = 1 to N
    for J = I to N
        [1^{st} to M^{th} bits of y] ^ = [a_{(1 to M)IJ}] & [I^{th} bit of x] & [J^{th} bit of x];
    end for
end for
output y;
```

As illustrated in FIG. 22, when the coefficients are structured, an intermediate result obtained by applying the coefficients of the multivariate polynomial F may be stored in a table. In this case, the foregoing algorithm is expressed as in (example 3). Also, $a_{IJ}$ $[x_1, \ldots, x_k]$ $[z_1, \ldots, z_k]$=$(a_{(k(I-1)+1)(k(J-1)+1)}$ $\&x_1$ $\&z_1)\hat{}\ldots\hat{}(a_{(k(I-1)+1)(k(J-1)+k)}$ $\&x_1$ $\&z_k)\hat{}\ldots\hat{}(a_{(k(I-1)+k)(k(J-1)+1)}$ $\&x_k$ $\&z_1)\hat{}\ldots\hat{}(a_{(k(I-1)+k)(k(J-1)+k)}$ $\&x_k$ $\&z_k)$ are stored in arrays $a_{IJ}$ [0] [0] to $a_{IJ}$ $[2^k-1]$ $[2^k-1]$, respectively. In the case of (example 3), an M-bit XOR operation (^) is executed merely (N/k)(N/k+1)/2 times. However, a necessary memory amount is $2^{2k}/k^2$ times the memory amount of the algorithm of (example 2).

For example, when k=1, the M-bit XOR operation is executed 120*119/2=7140 times, a necessary memory amount is $2^2$=4 times the memory amount of (example 2), and the number of loops is not changed. Also, when k=2, the M-bit XOR operation is executed 60*59/2=1770 times, a necessary memory amount is $2^4/4$=4 times, and the number of loops is 1/4. When k=4, the M-bit XOR operation is executed 30*29/2=435 times, a necessary memory amount is $2^8/4^2$=16 times, and the number of loops is 1/16.4. When k=6, the M-bit XOR operation is executed 20*19/2=190 times, a necessary memory amount is $2^{12}/6^2$=114 times, and the number of loops is 1/37.6. When k=8, the M-bit XOR operation is executed 15*14/2=135 times, a necessary memory amount is $2^{16}/8^2$=1024 times, and the number of loops is 1/52.9.

Example 3

```
input x;
    for I = 1 to N/k
        for J = I to N/k
            [1st to Mth bit of y]^ = a(1 to M)IJ [k(I − 1) + 1th to kth bits of x] [k(J − 1) + 1th to kth bits of x];
        end for
    end for
output y;
```

The technique described in (example 3) can be exactly said to be a technique for calculating values of $F_{IJ}(\ldots)$ defined in the following formula (33) in advance and storing the values as an array.

[Math 19]

$$F(x_1, \ldots, x_n) = \sum_{I,J} F_{IJ}(x_{k(I-1)+1}, \ldots, x_{k(I-1)+k}, x_{k(J-1)+1}, \ldots, x_{k(J-1)+k}) = y \quad (33)$$

Here, $F_{IJ}(x_{k(I-1)+1}, \ldots, x_{k(I-1)+k}, x_{k(J-1)+1}, \ldots, x_{k(J-1)+k})$ indicates a portion determined by $[x_{k(I-1)+1}, \ldots, x_{k(I-1)+k}]$ and $[x_{k(J-1)+1}, \ldots, x_{k(J-1)+k}]$ in $F(x_1, \ldots, x_n)$.

The specific algorithms have been described exemplifying the cases in which structuring technique #1 is applied to the multivariate polynomial F. In the structure, a process can be expected to be executed at a high speed when the algorithm is executed.

(Application to G)

The algorithm for calculating the multivariate polynomial F applying structuring technique #1 has been described above with reference to FIG. 22. On the other hand, each element of the multivariate polynomial G is expressed in a quadratic form. Therefore, as illustrated in FIG. 23, the foregoing structuring technique #1 is likewise applicable to calculation of the multivariate polynomial G without change.

For example, when the foregoing structuring technique #1 is not applied, an algorithm for calculating the multivariate polynomial G is expressed in the following (example 1'). Here, inputs x and y are each assumed to have N bits.

Example 1'

```
input x, y;
    for L = 1 to M
        for I = 1 to N
            for J = I to N
                [Lth bit of z]^ = [aLIJ + aLJI] & [Ith bit of x] & [Jth bit of y];
            end for
        end for
    end for
output z;
```

When the above-described structuring scheme #1 is applied to the foregoing (example 1'), the algorithm for calculating the multivariate polynomial G is expressed in the following (example 2').

Example 2'

```
input x, y;
    for I = 1 to N
        for J = 1 to N
            [1st to Mth bits of z]^ = a(1 to M)IJ + a(1 to M)JI] & [Ith bit of x] & [Jth bit of y];
        end for
    end for
output z;
```

In the case of a technique for storing an intermediate result obtained by applying the coefficients of the multivariate polynomial G in a table, the algorithm for calculating the multivariate polynomial G is expressed in the following (example 3') in correspondence with the foregoing (example 3). Also, $a_{IJ}$ $[x_1, \ldots, x_k]$ $[y_1, \ldots, y_k]$=$(a_{(k(I-1)+1)(k(J-1)+1)}$ $\&x_1$ $\&y_1)\hat{}\ldots\hat{}(a_{(k(I-1)+1)(k(J-1)+k)}$ $\&x_1$ $\&y_k)\hat{}\ldots\hat{}(a_{(k(I-1)+k)(k(J-1)+1)}$ $\&x_k$ $\&y_1)\hat{}\ldots\hat{}(a_{(k(I-1)+k)(k(J-1)+k)}$ $\&x_k$ $\&y_k)$ are stored in arrays $a_{IJ}$ [0] [0]) to $a_{IJ}$ $[2^k-1]$ $[2^k-1]$, respectively.

In the case of (example 3'), an M-bit XOR operation (^) is executed merely $(N/k)^2$ times. However, a necessary memory amount is $2^{2k}/k^2$ times the memory amount of the algorithm of (example 2').

For example, when k=1, the M-bit XOR operation is executed $120^2$=14400 times, a necessary memory amount is $2^2$=4 times the memory amount of (example 2'), and the number of loops is not changed. Also, when k=2, the M-bit XOR operation is executed $60^2$=3600 times, a necessary memory amount is $2^4/4$=4 times, and the number of loops is 1/4. When k=4, the M-bit XOR operation is executed $30^2$=900 times, a necessary memory amount is $2^8/4^2$=16 times, and the number of loops is 1/16. When k=6, the M-bit XOR operation is executed $20^2$=400 times, a necessary memory amount is $2^{12}/6^2$=114 times, and the number of loops is 1/36. When k=8, the M-bit XOR operation is executed $15^2$=225 times, a necessary memory amount is $2^{16}/8^2$=1024 times, and the number of loops is 1/64.

Example 3'

```
input x, y;
    for I = 1 to N/k
        for J = I to N/k
            [1st to Mth bits of z] ^ = a(1 to M)IJ [k(I – 1) + 1th to kth bits
of x] [k(J – 1) + 1th to kth bits of y];
        end for
    end for
output z;
```

The technique described in (example 3') can specifically be said to be a technique for calculating values of $G_{IJ}(\ldots)$ defined in the following formula (34) in advance and storing the values as an array.

[Math 20]

$$G(x_1, \ldots, x_n) = \sum_{I,J} G_{IJ}(x_{k(I-1)+1}, \ldots, x_{k(I-1)+k}, y_{k(J-1)+1}, \ldots, y_{k(J-1)+k}) = z \quad (34)$$

Here, $G_{IJ}(x_{k(I-1)+1}, \ldots, x_{k(I-1)+k}, x_{k(J-1)+1}, \ldots, x_{k(J-1)+k})$ indicates a portion determined by $[x_{k(I-1)+1}, \ldots, x_{k(I-1)+k}]$ and $[x_{k(J-1)+1}, \ldots, x_{k(J-1)+k}]$ in $G(x_1, \ldots, x_n, y_1, \ldots, y_N)$.

The specific algorithm structures related to structuring technique #1 have been described exemplifying the case in which the multivariate polynomial G is calculated. In this structure, a process can be expected to be executed at a high speed when the algorithm is executed.

(Application to Cubic Multivariate Polynomial F)

The techniques for structuring the coefficients of a quadratic multivariate polynomial have been introduced above as the specific examples of structuring technique #1. Similarly, coefficients of a cubic multivariate polynomial can also be structured. In the example of FIG. 24, coefficients $a_{LIJL}$ to $a_{MIJL}$ are collected as data structure A, coefficients $b_{LIJ}$ to $b_{MIJ}$ are collected as data structure B, and coefficients $c_{1I}$ to $c_{MI}$ are collected as data structure C. By structuring the coefficients in this way, a multivariate polynomial is efficiently calculated.

For example, calculation related to data structure A will be considered specifically. When the coefficients are not structured, an algorithm of the calculation related to data structure A herein is expressed as in the following (example 4), for example.

Example 4

```
input x;
    for Q = I to M
        for I = 1 to N
            for J = I to N
                for L = J to N
                    [Qth bit of y] ^ = [a_QIJL] & [Ith bit of x] &
[Jth bit of x] & [Lth bit of x]
                end for
            end for
        end for
    end for
output y;
```

On the other hand, when the coefficients are structured, an algorithm is expressed as in the following (example 5). In the case of (example 5), an M-bit AND operation (&) is executed merely $2\times N\times(N+1)\times(N+2)/6$ times and an M-bit XOR operation (^) is executed merely $1\times N\times(N+1)\times(N+2)/6$ times. Also, $a_{(1\ to\ M)IJL}$ are generated at a timing of each loop. The coefficients may be used in reverse. For example, when a loop is executed, $[a_{(1\ to\ M)IJL}]$ may not be generated every time, but may be generated only once every M times. Also, during a loop of M times, $[a_{(1\ to\ M)IJ}]$ may be used whiling rotating them bit by bit.

Example 5

```
input x;
    for I = 1 to N
        for J = I to N
            for L = J to N
                [1st to Mth bits of y] ^ = [a(1 to M)IJL] & [Ith bit of x]
& [Jth bit of x] & [Lth bit of x]
            end for
        end for
    end for
output y;
```

When the coefficients are structured, an intermediate result obtained by applying the coefficients of the multivariate polynomial F may be stored in a table. In this case, the foregoing algorithm is expressed as in (example 6). Also, $a_{IJL}[x_1, \ldots, x_k][z_1, \ldots, z_k][w_1, \ldots, w_k] = \Sigma_{1 \leq \alpha,\ \beta,\ \gamma \leq k}(a_{(k(I-1)+\alpha)(k(J-1)+\beta)(k(L-1)+\gamma)}$ & $x_\alpha$ & $z_\beta$ & $w_\gamma$) are stored in arrays $a_{IJL}[0][0][0]$ to $a_{IJL}[2^k-1][2^k-1][2^k-1]$, respectively. In the case of (example 6), an M-bit XOR operation (^) is executed merely $(N/k)(N/k+1)(N/k+2)/6$ times. However, a necessary memory amount is $2^{3k}/k^3$ times the memory amount of the algorithm of (example 4).

For example, when k=1, the M-bit XOR operation is executed $120*121*122/6=295240$ times, a necessary memory amount is $2^3=8$ times the memory amount of (example 4), and the number of loops is not changed. Also, when k=2, the M-bit XOR operation is executed $60*61*62/6=37820$ times, a necessary memory amount is $2^6/8=8$ times, and the number of loops is 1/7.8. When k=4, the M-bit XOR operation is executed $30*31*32/6=4960$ times, a necessary memory amount is $2^{12}/4^3=64$ times, and the number of loops is 1/59.5. When k=6, the M-bit XOR operation is executed $20*21*22/6=1540$ times, a necessary memory amount is $2^{18}/6^3=1214$ times, and the number of loops is 1/192.

Example 6

```
input x;
    for I = 1 to N/k
        for J = I to N/k
            for L = J to N/k
                [1st to Mth bits of y] ^ = a(1 to M)IJL[k(I – 1) +1th to
kth bits of x] [k(J – 1) +1th to kth bits of x] [k(L – 1) +1th to kth bits of x]
            end for
        end for
    end for
output y;
```

The technique described in (example 6) can specifically be said to be a technique for calculating values of $F_{IJ}(\ldots)$ defined in the following formula (35) in advance and storing the values as an array.

[Math 21]

$$F(x_1, \ldots, x_n) = \qquad (35)$$
$$y = \sum_{I,J} F_{IJ}\begin{pmatrix} x_{k(I-1)+1}, \ldots, x_{k(I-1)+k}, x_{k(J-1)+1}, \ldots, \\ x_{k(J-1)+k}, x_{k(L-1)+1}, \ldots, x_{k(L-1)+k} \end{pmatrix}$$

Here, $F_{IJ}(x_{k(I-1)+1}, \ldots, x_{k(I-1)+k}, x_{k(J-1)+1}, \ldots, x_{k(J-1)+k}, x_{k(L-1)+1}, \ldots, x_{k(L-1)+k})$ indicates a portion determined by $[x_{k(I-1)+1}, \ldots, x_{k(I-1)+k}]$, $[x_{k(J-1)+1}, \ldots, x_{k(J-1)+k}]$, and $[x_{k(L-1)+1}, \ldots, x_{k(L-1)+k}]$ in $F(x_1, \ldots, x_n)$.

The cases in which structuring technique #1 is applied to the cubic multivariate polynomial F have been described above. In the structure, a process can be expected to be executed at a high speed when the algorithm is executed.

(Application to Cubic Multivariate Polynomials $G_x$ and $G_y$)

As in the foregoing (example 5) and (example 6), structuring technique #1 is also applicable to cubic multivariate polynomials $G_x$ and $G_y$, as illustrated in FIGS. 25 and 26. When structuring technique #1 is not applied, calculation related to data structure A of the cubic multivariate polynomial $G_x$ is executed by, for example, an algorithm of the following (example 4'X).

Example 4'X

```
input x, y;
for Q = 1 to M
    for I = 1 to N
        for J = 1 to N
            for L = 1 to N
                [Q^th bit of z] ^= [a_QIJL + a_QILJ + a_QLJI] &
                [I^th bit of y] & [J^th bit of y] & [L^th bit of x]
            end for
        end for
    end for
end for
output z;
```

When the above-described structuring scheme #1 is applied to the foregoing (example 4'X), the algorithm for calculating the multivariate polynomial $G_x$ is expressed in the following (example 5'X). Also, as in the foregoing (example 6), an intermediate result obtained by applying the coefficients of the multivariate polynomial $G_x$ may be stored in a table.

Example 5'X

```
input x, y;
for I = 1 to N
    for J = 1 to N
        for L = 1 to N
            [1^st to M^th bits of z] ^= [a_(1 to M)IJL + a_(1 to M)ILJ +
            a_(1 to M)LJI] & [I^th bit of y] & [J^th bit of y] & [L^th bit of x]
        end for
    end for
end for
output z;
```

When structuring technique #1 is not applied, calculation of the cubic multivariate polynomial $G_y$ is executed by, for example, an algorithm of the following (example 4'Y).

Example 4'Y

```
input x, y;
for Q = 1 to M
    for I = 1 to N
        for J = 1 to N
            for L = 1 to N
                [Q^th bit of z] ^= [a_QIJL + a_QILJ + a_QLJI] &
                [I^th bit of x] & [J^th bit of x] & [L^th bit of y]
            end for
        end for
    end for
end for
output z;
```

When the above-described structuring scheme #1 is applied to the foregoing (example 4'Y), the algorithm for calculating the multivariate polynomial $G_y$ is expressed in the following (example 5'Y). Also, as in the foregoing (example 6), an intermediate result obtained by applying the coefficients of the multivariate polynomial $G_y$ may be stored in a table.

Example 5'Y

```
input x, y;
for I = 1 to N
    for J = 1 to N
        for L = 1 to N
            [1^st to M^th bits of z] ^= [a_(1 to M)IJL + a_(1 to M)ILJ +
            a_(1 to M)LJI] & [I^th bit of x] & [J^th bit of x] & [L^th bit of y]
        end for
    end for
end for
output z;
```

The cases in which structuring technique #1 is applied to the cubic multivariate polynomials $G_x$ and $G_y$ have been described above. In the structure, a process can be expected to be executed at a high speed when the algorithm is executed.

(7-2-2: Structuring Technique #2 (FIG. 27))

Figure 27:
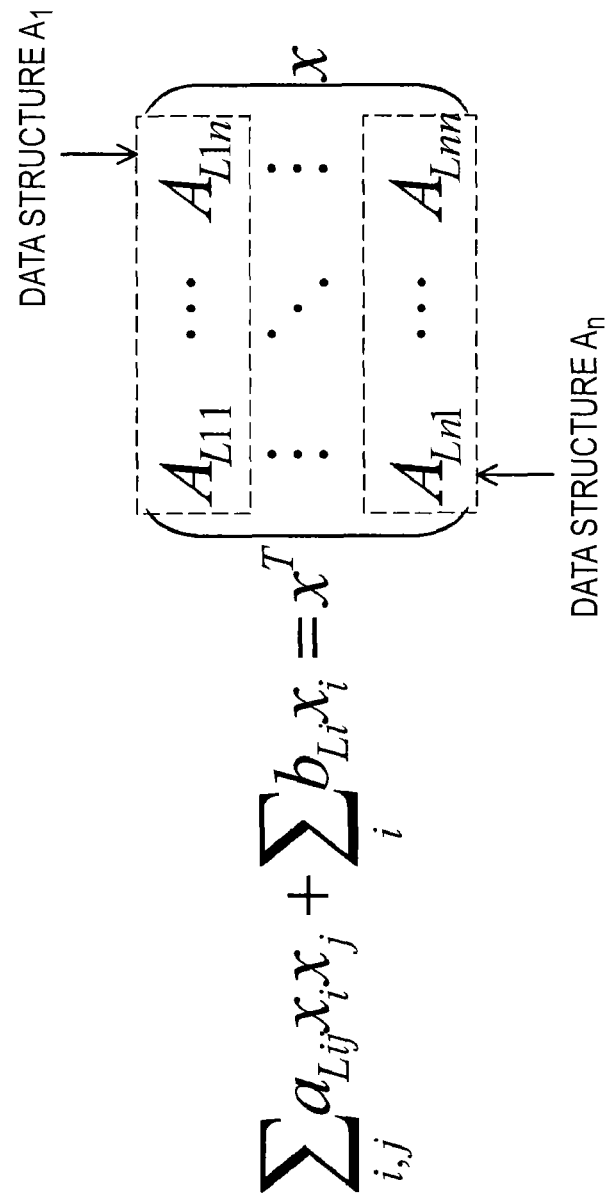
FIG. 27 is an explanatory diagram for describing a data structuring technique (structuring technique #2) for efficiently substituting coefficients of a multivariate polynomial.

Next, structuring technique #2 will be described. As illustrated in FIG. 27, structuring technique #2 is a technique for expressing a multivariate polynomial in a quadratic form and collecting the rows and the columns of the quadratic form as one data structure. In the example of FIG. 27, the data structure is collected in the row direction.

As illustrated in FIG. 27, when the coefficients are structured and the generated random numbers are applied sequentially some at a time as the coefficients of a multivariate polynomial, a coefficient substitution algorithm is expressed as in (example 4). In the case of example 4, an N-bit AND operation (&) is executed merely (N+1)×M times, an N-bit XOR operation (^) is executed merely N×M times, and an operation of a function Q is performed merely M times.

Example 4

```
for I = 1 to N
    T ^= A_I & [I^th bit of x]
end for
T &= x;
output Q(T);
Q(z) {
```

-continued

```
    z = z ^ (z >> 1);
    Z = z ^ (z >> 2);
    z = z ^ (z >> 4);
    z = z ^ (z >> 8);
    ...
    Z = z ^ (z >> 2^{Log(N)});
    return z & 1;
}
```

As illustrated in FIG. 27, when the coefficients are structured, an intermediate result obtained by applying the coefficients of the multivariate polynomial may be stored in a table. In this case, the coefficient substitution algorithm is expressed as in (example 5). Also, $A_1[x_1, \ldots, x_k] = (A_{k(I-1)+1}\ \&x_1)\ \hat{}\ \ldots\ \hat{}\ (A_{k(I-1)+k}\ \&x_k)$ are stored in $A_I[0]$ to $A_I[2^k-1]$, respectively. In the case of example 5, an N-bit XOR operation (^) is executed merely (N/k)×M times and an N-bit operation of the function Q is executed merely M times. However, a necessary memory amount is $2^k/k$ times the memory amount of the algorithm of (example 4).

For example, when k=1, the N-bit XOR operation is executed 120 times, a necessary memory amount is twice the memory amount of (example 4), and the number of loops is not changed. Also, when k=4, the N-bit XOR operation is executed 30 times, a necessary memory amount is $2^4/4=4$ times, and the number of loops is 1/4. When k=8, the N-bit XOR operation is executed 15 times, a necessary memory amount is $2^8/8=32$ times, and the number of loops is 1/8. When k=16, the N-bit XOR operation is executed 8 times, a necessary memory amount is $2^{16}/16=4096$ times, and the number of loops is 1/15.

Example 5

```
    for I = 1 to N/k
        T ^ = A_I [k(I - 1) + 1^{th} to k(I - 1) + k^{th} bits of x]
    end for
    T & = x;
    output Q(T);
```

The specific coefficient substitution algorithms related to structuring technique #2 have been described. In the structure, a process can be expected to be executed at a high speed when the algorithm is executed.

(7-2-3: Structuring Technique #3)

Next, structuring technique #3 will be described. Structuring technique #3 is a technique for sequentially executing a process N times (where N≥2) in parallel by setting a portion "for generating some of the coefficients and executing a substitution process on some of the coefficients N times" in units, rather than generating a polynomial from random numbers N times and executing a substitution process, when the substitution process is executed on the same multivariate polynomial N times. When this technique is applied, a throughput is improved in all of the processes of N times in a case in which a cost of random number generation is not negligible.

For example, in the algorithm illustrated in FIG. 5, the calculation of the multivariate polynomials F and G is executed N times repeatedly while factors in operation #1 are updated. Accordingly, in such a calculation portion, computation is configured to be executed repeatedly using the same coefficients. When the multivariate polynomial $F(r_{0i})$ (where i=1 to N) is calculated using the algorithm of the foregoing (example 2), all of the N $r_{0i}$ are configured to be applied to once generated $[a_{IJL}]$, and then a process related to a subsequent $[a_{IJL}]$ is configured to be executed. In this configuration, the same coefficient $[a_{IJL}]$ is not generated N times in the end.

The specific coefficient substitution algorithm related to structuring technique #3 has been described above. In the configuration, a throughput is improved in a total of the processes performed N times.

8: EXAMPLE OF HARDWARE CONFIGURATION (FIG. 28)

Each algorithm described above can be performed by using, for example, the hardware configuration of the information processing apparatus shown in FIG. 28. That is, processing of each algorithm can be realized by controlling the hardware shown in FIG. 28 using a computer program. Additionally, the mode of this hardware is arbitrary, and may be a personal computer, a mobile information terminal such as a mobile phone, a PHS or a PDA, a game machine, a contact or non-contact IC chip, a contact or non-contact IC card, or various types of information appliances. Moreover, the PHS is an abbreviation for Personal Handy-phone System. Also, the PDA is an abbreviation for Personal Digital Assistant.

As shown in FIG. 28, this hardware mainly includes a CPU 902, a ROM 904, a RAM 906, a host bus 908, and a bridge 910. Furthermore, this hardware includes an external bus 912, an interface 914, an input unit 916, an output unit 918, a storage unit 920, a drive 922, a connection port 924, and a communication unit 926. Moreover, the CPU is an abbreviation for Central Processing Unit. Also, the ROM is an abbreviation for Read Only Memory. Furthermore, the RAM is an abbreviation for Random Access Memory.

The CPU 902 functions as an arithmetic processing unit or a control unit, for example, and controls entire operation or a part of the operation of each structural element based on various programs recorded on the ROM 904, the RAM 906, the storage unit 920, or a removable recording medium 928. The ROM 904 is means for storing, for example, a program to be loaded on the CPU 902 or data or the like used in an arithmetic operation. The RAM 906 temporarily or perpetually stores, for example, a program to be loaded on the CPU 902 or various parameters or the like arbitrarily changed in execution of the program.

These structural elements are connected to each other by, for example, the host bus 908 capable of performing high-speed data transmission. For its part, the host bus 908 is connected through the bridge 910 to the external bus 912 whose data transmission speed is relatively low, for example. Furthermore, the input unit 916 is, for example, a mouse, a keyboard, a touch panel, a button, a switch, or a lever. Also, the input unit 916 may be a remote control that can transmit a control signal by using an infrared ray or other radio waves.

The output unit 918 is, for example, a display device such as a CRT, an LCD, a PDP or an ELD, an audio output device such as a speaker or headphones, a printer, a mobile phone, or a facsimile, that can visually or auditorily notify a user of acquired information. Moreover, the CRT is an abbreviation for Cathode Ray Tube. The LCD is an abbreviation for Liquid Crystal Display. The PDP is an abbreviation for Plasma Display Panel. Also, the ELD is an abbreviation for Electro-Luminescence Display.

The storage unit 920 is a device for storing various data. The storage unit 920 is, for example, a magnetic storage device such as a hard disk drive (HDD), a semiconductor storage device, an optical storage device, or a magneto-optical storage device. The HDD is an abbreviation for Hard Disk Drive.

The drive 922 is a device that reads information recorded on the removable recording medium 928 such as a magnetic disk, an optical disk, a magneto-optical disk, or a semiconductor memory, or writes information in the removable recording medium 928. The removable recording medium 928 is, for example, a DVD medium, a Blu-ray medium, an HD-DVD medium, various types of semiconductor storage media, or the like. Of course, the removable recording medium 928 may be, for example, an electronic device or an IC card on which a non-contact IC chip is mounted. The IC is an abbreviation for Integrated Circuit.

The connection port 924 is a port such as an USB port, an IEEE1394 port, a SCSI, an RS-232C port, or a port for connecting an externally connected device 930 such as an optical audio terminal. The externally connected device 930 is, for example, a printer, a mobile music player, a digital camera, a digital video camera, or an IC recorder. Moreover, the USB is an abbreviation for Universal Serial Bus. Also, the SCSI is an abbreviation for Small Computer System Interface.

The communication unit 926 is a communication device to be connected to a network 932, and is, for example, a communication card for a wired or wireless LAN, Bluetooth (registered trademark), or WUSB, an optical communication router, an ADSL router, or a device for contact or non-contact communication. The network 932 connected to the communication unit 926 is configured from a wire-connected or wirelessly connected network, and is the Internet, a home-use LAN, infrared communication, visible light communication, broadcasting, or satellite communication, for example. Moreover, the LAN is an abbreviation for Local Area Network. Also, the WUSB is an abbreviation for Wireless USB. Furthermore, the ADSL is an abbreviation for Asymmetric Digital Subscriber Line.

9: SUMMARY

Lastly, the technical contents according to the embodiment of the present technology will be briefly described. The technical contents stated here can be applied to various information processing apparatuses, such as a personal computer, a mobile phone, a game machine, an information terminal, an information appliance, a car navigation system, and the like. Further, the function of the information processing apparatus described below can be realized by using a single information processing apparatus or using a plurality of information processing apparatuses. Furthermore, a data storage means and an arithmetic processing means which are used for performing a process by the information processing apparatus described below may be mounted on the information processing apparatus, or may be mounted on a device connected via a network.

The functional configuration of the foregoing information processing apparatus is realized as follows. For example, an information processing apparatus described in the following (1) has a function of executing an algorithm related to an efficient public-key authentication scheme or a digital signature scheme that bases its safety on the difficulty of solving multi-order multivariate simultaneous equations.

(1)

An information processing apparatus including:

a number generation unit configured to generate numbers used in coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F; and an allocation unit configured to allocate the numbers generated by the number generation unit to the coefficients of the multi-order multivariate polynomials for which the pair of multi-order multivariate polynomials F are included in constituent elements, wherein the allocation unit groups the coefficients of the terms having an identical kind of combination of variables among the coefficients of the multi-order multivariate polynomials for which the pair of multi-order multivariate polynomials F are included in the constituent elements and executes an allocation process in units of groups.

(2)

An information processing apparatus including:

a number generation unit configured to generate numbers used in coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F; and an allocation unit configured to allocate the numbers generated by the number generation unit to the coefficients of the multi-order multivariate polynomials for which the pair of multi-order multivariate polynomials F are included in constituent elements, wherein the allocation unit groups a coefficient matrix in each row or column when the multi-order multivariate polynomials for which the pair of multi-order multivariate polynomials F are included in the constituent elements are expressed in a quadratic form, and the allocation unit executes an allocation process in units of groups.

(3)

The information processing apparatus according to (1) or (2), wherein the number generation unit generates the numbers by a number of coefficients belonging to one group when the allocation unit executes the allocation process on the one group.

(4)

The information processing apparatus according to (3), wherein the number generation unit generates one number when generating the numbers by the number of coefficients belonging to the one group, and generates a necessary number of numbers by rotating the generated numbers by each bit.

(5)

The information processing apparatus to (1) or (2), further including:

a table storage unit configured to store, as a table, values obtained by allocating the coefficients to a kind of term corresponding to each of the groups and substituting a given number for the variables of the corresponding terms.

(6)

An information processing apparatus including:

a number generation unit configured to generate an identical number of numbers with a number of coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F; and an allocation unit configured to allocate the numbers generated by the number generation unit to the coefficients of the multi-order multivariate polynomials for which the pair of multi-order multivariate polynomials F are included in constituent elements, in a sequence determined in advance between the prover and the verifier.

(7)

The information processing apparatus according to any one of (1) to (7), wherein the information is a seed of a random number, and wherein the predetermined function is a random number generator configured to generate a random number using the seed.

(8)

The information processing apparatus according to any one of (1) to (7), including:

a message generation unit configured to generate a message based on the pair of multi-order multivariate polynomials $F=(f_1, \ldots, f_m)$ defined in a ring K and a vector s that is an element of a set $K^n$;

a message supply unit configured to supply the message to a verifier storing the pair of multi-order multivariate polynomials F and vectors $y=(y_1, \ldots, y_m)=(f_1(s), \ldots, f_m(s))$; and a response supply unit configured to supply the verifier with response information corresponding to a verification pattern which the verifier selects from among k (where k≥3) verification patterns, wherein the vector s is a secret key, wherein the pair of multi-order multivariate polynomials F and the vectors y are public keys, wherein the response information is information selected from among a pair of the random numbers and the message according to the verification pattern, and wherein the message is information obtained by executing calculation prepared in advance for the verification pattern corresponding to the response information based on the public keys and the response information.

(9)

The information processing apparatus according to any one of (1) to (7), including:

an information storage unit configured to store the pair of multi-order multivariate polynomials $F=(f_1, \ldots, f_m)$ defined in a ring K and vectors $y=(y_1, \ldots, y_m)=(f_1(s), \ldots, f_m(s))$;

a message acquisition unit configured to acquire a message generated based on the pair of multi-order multivariate polynomials F and a vector s that is an element of a set $K^n$;

a pattern information supply unit configured to supply a prover supplying the message with information on one verification pattern randomly selected from among k (where k≥3) verification patterns;

a response acquisition unit configured to acquire response information corresponding to the selected verification pattern from the prover; and a verification unit configured to verify whether or not the prover stores the vector s based on the message, the pair of multi-order multivariate polynomials F, the vectors y, and the response information, wherein the vector s is a secret key, wherein the pair of multi-order multivariate polynomials F and the vectors y are public keys, and wherein the message is information obtained by executing calculation prepared in advance for the verification pattern corresponding to the response information based on the public keys and the response information.

(10)

The information processing apparatus according to any one of (1) to (7), including:

a message generation unit configured to generate a message based on the pair of multi-order multivariate polynomials $F=(f_1, \ldots, f_m)$ defined in a ring K and a vector s that is an element of a set $K^n$;

a message supply unit configured to supply the message to a verifier storing the pair of multi-order multivariate polynomials F and vectors $y=(y_1, \ldots, y_m)=(f_1(s), \ldots, f_m(s))$;

an intermediate information generation unit configured to generate third information using first information randomly selected by the verifier and second information obtained at a time of generation of the message;

an intermediate information supply unit configured to supply the third information to the verifier; and a response supply unit configured to supply the verifier with response information corresponding to a verification pattern which the verifier selects from among k (where k≥2) verification patterns, wherein the vector s is a secret key, wherein the pair of multi-order multivariate polynomials F and the vectors y are public keys, wherein the response information is information selected from among the messages according to the verification pattern, and wherein the message is information obtained by executing calculation prepared in advance for the verification pattern corresponding to the response information based on the public keys, the first information, the third information, and the response information.

(11)

The information processing apparatus according to any one of (1) to (7), including:

an information storage unit configured to store the pair of multi-order multivariate polynomials $F=(f_1, \ldots, f_m)$ defined in a ring K and vectors $y=(y_1, \ldots, y_m)=(f_1(s), \ldots, f_m(s))$;

a message acquisition unit configured to acquire a message generated based on the pair of multi-order multivariate polynomials F and a vector s that is an element of a set $K^n$;

an information supply unit configured to supply a prover supplying the message with randomly selected first information;

an intermediate information acquisition unit configured to acquire third information which the prover generates based on the first information and second information obtained at a time of generation of the message;

a pattern information supply unit configured to supply the prover with information on one verification pattern randomly selected from among k (where k≥3) verification patterns;

a response acquisition unit configured to acquire response information corresponding to the selected verification pattern from the prover; and a verification unit configured to verify whether or not the prover stores the vector s based on the message, the first information, the third information, the pair of multi-order multivariate polynomials F, and the response information, wherein the vector s is a secret key, wherein the pair of multi-order multivariate polynomials F and the vectors y are public keys, and wherein the message is information obtained by executing calculation prepared in advance for the verification pattern corresponding to the response information based on the public keys, the first information, the third information, and the response information.

(12)

The information processing apparatus according to (1) or (2), wherein, when the algorithm is executed repeatedly a plurality of times, the number generation unit generates the numbers only once and the allocation unit executes the allocation process only once, and wherein the algorithm repeatedly uses the coefficients allocated by the allocation unit.

(13)

The information processing apparatus according to any one of (1) to (7), including:

a signature generation unit configured to generate a digital signature for a document M using the pair of multi-order multivariate polynomials $F=(f_1, \ldots, f_m)$ defined in a ring K and a signature key that is an element of a set $K^n$; and a signature supply unit configured to supply the digital signature to a verifier storing the pair of multi-order multivariate polynomials F and vectors $y=(f_1(s), \ldots, f_m(s))$.

(14)

An information processing method including:

a step of generating numbers used in coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F; and a step of allocating the generated numbers to the coefficients of the multi-order multivariate polynomials for which the pair of multi-order multivariate polynomials F are included in constituent elements, wherein, in the step of allocating the numbers, the coefficients of the terms having an identical kind of combination of variables are grouped among the coefficients of the multi-order multivariate polynomials for which the pair of multi-order multivariate polynomials F are included in the constituent elements and an allocation process is executed in units of groups.

(15)

An information processing method including:

a step of generating numbers used in coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F; and a step of allocating the generated numbers to the coefficients of the multi-order multivariate polynomials for which the pair of multi-order multivariate polynomials F are included in constituent elements, wherein, in the step of allocating the numbers, a coefficient matrix is grouped in each row or column when the multi-order multivariate polynomials for which the pair of multi-order multivariate polynomials F are included in the constituent elements are expressed in a quadratic form, and an allocation process is executed in units of groups.

(16)

An information processing method including:

a step of generating an identical number of numbers with a number of coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F; and a step of allocating the numbers generated by the number generation unit to the coefficients of the multi-order multivariate polynomials for which the pair of multi-order multivariate polynomials F are included in constituent elements, in a sequence determined in advance between the prover and the verifier.

(17)

A program causing a computer to realize:

a number generation function of generating numbers used in coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F; and an allocation function of allocating the numbers generated by the number generation function to the coefficients of the multi-order multivariate polynomials for which the pair of multi-order multivariate polynomials F are included in constituent elements, wherein the allocation function groups the coefficients of the terms having an identical kind of combination of variables among the coefficients of the multi-order multivariate polynomials for which the pair of multi-order multivariate polynomials F are included in the constituent elements and executes an allocation process in units of groups.

(18)

A program causing a computer to realize:

a number generation function of generating numbers used in coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F; and an allocation function of allocating the numbers generated by the number generation function to the coefficients of the multi-order multivariate polynomials for which the pair of multi-order multivariate polynomials F are included in constituent elements, wherein the allocation function groups a coefficient matrix in each row or column when the multi-order multivariate polynomials for which the pair of multi-order multivariate polynomials F are included in the constituent elements are expressed in a quadratic form, and the allocation function executes an allocation process in units of groups.

(19)

A program causing a computer to realize:

a number generation function of generating an identical number of numbers with a number of coefficients of terms included in a pair of multi-order multivariate polynomials $F=(f_1, \ldots, f_m)$, using a predetermined function, from information shared between entities executing an algorithm of a public-key authentication scheme or a digital signature scheme that uses a public key including the pair of multi-order multivariate polynomials F; and an allocation function of allocating the numbers generated by the number generation unit to the coefficients of the multi-order multivariate polynomials for which the pair of multi-order multivariate polynomials F are included in constituent elements, in a sequence determined in advance between the prover and the verifier.

(20) A computer-readable recording medium having the program according to (19) recorded thereon.

(Remark)

The above prover algorithm P, the above verifier algorithm V, the above signature generation algorithm Sig, and the above signature verifying algorithm Ver are examples of the number generation unit, the allocation unit, and the table storage unit. The above prover algorithm P is an example of the message generation unit, the message supply unit, the response supply unit, the intermediate information generation unit, and the intermediate information supply unit. Also, the above verifier algorithm V is an example of the information storage unit, the message acquisition unit, the pattern information supply unit, the response acquisition unit, the verification unit, and the intermediate information acquisition unit.

The preferred embodiments of the present invention have been described above with reference to the accompanying drawings, whilst the present invention is not limited to the above examples, of course. A person skilled in the art may find various alternations and modifications within the scope of the appended claims, and it should be understood that they will naturally come under the technical scope of the present invention.

In the above description, the algorithms using the hash function H have been introduced, but a commitment function COM may be used instead of the hash function H. The commitment function COM is a function in which a character string S and a random number p are used as factors. An example of the commitment function includes a scheme presented by Shai Halevi and Silvio Micali at the international conference CRYPT01996.

REFERENCE SIGNS LIST

Gen key generation algorithm
P prover algorithm
V verifier algorithm
Sig signature generation algorithm
Ver signature verifying algorithm

The invention claimed is:

1. An information processing apparatus, comprising:
a memory configured to store challenge-response information; and
one or more processors configured to:
generate numbers used in coefficients of terms included in a pair of multi-order multivariate polynomials $F=(f1, \ldots, fm)$,
wherein the pair of multi-order multivariate polynomials F is based on a function,
wherein the numbers are generated based on the challenge-response information shared between entities that execute document authentication,
wherein the document authentication is based on a public-key authentication scheme or a digital signature scheme that uses a public key,
wherein the public key includes the pair of multi-order multivariate polynomials F, and
wherein the numbers are generated based on a group of a number of bits of a binary random number sequence;
allocate the generated numbers to the coefficients of the multi-order multivariate polynomials,
wherein the coefficients are constituent elements of the pair of multi-order multivariate polynomials F;
group a set of coefficients of the terms that have an identical combination of variables among the coefficients of the multi-order multivariate polynomials;
execute an allocation process based on the group;
generate a message based on the pair of multi-order multivariate polynomials F defined in a ring K and a vector s, wherein the vector s is an element of a set $K^n$;
transmit, via a communication network, the message to a verifier apparatus,
wherein the verifier apparatus stores the pair of multi-order multivariate polynomials F and vectors $y=(y1, \ldots, ym)=(f1(s), \ldots, fm(s))$, and
wherein the verifier apparatus uses the pair of multi-order multivariate polynomials F for authentication of a prover apparatus;
generate third information based on first information and second information,
wherein the first information is randomly selected by the verifier apparatus and the second information is obtained at a time of the generation of the message,
wherein a grouping length of the group of the number of bits of the binary random number sequence is such that a probability of N or more ternary numerals that are unextractable is below a threshold probability, and
wherein N is a number of times of execution of a session protocol that corresponds to the challenge-response information; and
erase the challenge-response information from the memory after the execution of the document authentication based on the public-key authentication scheme or the digital signature scheme, wherein an amount of the memory required for repeated execution of the document authentication is reduced by the erasure of the challenge-response information shared between the entities.

2. An information processing apparatus, comprising:
a memory configured to store challenge-response information; and
one or more processors configured to:
generate numbers used in coefficients of terms included in a pair of multi-order multivariate polynomials $F=(f1, \ldots, fm)$,
wherein the pair of multi-order multivariate polynomials F is based on a function,
wherein the numbers are generated based on the challenge-response information shared between entities that execute document authentication,
wherein the document authentication is based on a public-key authentication scheme or a digital signature scheme that uses a public key,
wherein the public key includes the pair of multi-order multivariate polynomials F, and
wherein the numbers are generated based on a group of a number of bits of a binary random number sequence;
allocate the generated numbers to the coefficients of the multi-order multivariate polynomials, wherein the coefficients are constituent elements of the pair of multi-order multivariate polynomials F;
group a coefficient matrix in each row or column based on an expression of the multi-order multivariate polynomials for which the pair of multi-order multivariate polynomials F are included in the constituent elements in a quadratic form;
execute an allocation process based on the group;
generate a message based on the pair of multi-order multivariate polynomials F defined in a ring K and a vector s, where the vector s is an element of a set $K^n$;
transmit, via a communication network, the message to a verifier apparatus,
wherein the verifier apparatus stores the pair of multi-order multivariate polynomials F and vectors y= (y1, ..., ym)=(f1(s), ..., fm(s)), and
wherein the verifier apparatus uses the pair of multi-order multivariate polynomials F for authentication of a prover apparatus;
generate third information based on first information and second information, wherein the first information is randomly selected by the verifier apparatus and the second information is obtained at a time of the generation of the message,
wherein a grouping length of the group of the number of bits of the binary random number sequence is such that a probability of N or more ternary numerals that are unextractable is below a threshold probability, and
wherein N is a number of times of execution of a session protocol that corresponds to the challenge-response information; and
erase the challenge-response information from the memory after the execution of the document authentication based on the public-key authentication scheme or the digital signature scheme, wherein an amount of the memory required for repeated execution of the document authentication is reduced by the erasure of the challenge-response information shared between the entities.

3. The information processing apparatus according to claim 1, wherein the one or more processors are further configured to generate the numbers by a number of coefficients that belong to one group based on the allocation process executed on the one group.

4. The information processing apparatus according to claim 3, wherein the one or more processors are further configured to:
generate one number based on the numbers generated by the number of coefficients that belong to the one group; and
generate a number of the numbers based on bit-by-bit rotation of the generated numbers.

5. The information processing apparatus to claim 1, wherein the one or more processors are further configured to store, as a table in the memory, values obtained based on allocation of the coefficients to a term and substitution of a given number for the variables of the terms, and wherein the term is associated with the group.

6. An information processing apparatus, comprising:
a memory configured to store challenge-response information; and
one or more processors configured to:
generate an identical number of numbers with a number of coefficients of terms included in a pair of multi-order multivariate polynomials F=(f1, ..., fm),
wherein the pair of multi-order multivariate polynomials F is based on a function,
wherein the numbers are generated based on challenge-response information shared between entities that execute document authentication,
wherein the document authentication is based on a public-key authentication scheme or a digital signature scheme that uses a public key,
wherein the public key includes the pair of multi-order multivariate polynomials F, and
wherein the numbers are generated based on a group of a number of bits of a binary random number sequence;
allocate the generated numbers to the coefficients of the multi-order multivariate polynomials,
wherein the coefficients are constituent elements of the pair of multi-order multivariate polynomials F, and
wherein the numbers are allocated in a sequence determined in advance between a prover apparatus and a verifier apparatus;
generate a message based on the pair of multi-order multivariate polynomials F defined in a ring K and a vector s, where the vector s is an element of a set $K^n$;
transmit, via a communication network, the message to the verifier apparatus,
wherein the verifier apparatus that stores the pair of multi-order multivariate polynomials F and vectors y=(y1, ..., ym)=(f1(s), ..., fm(s)), and
wherein the verifier apparatus uses the pair of multi-order multivariate polynomials F for authentication of the prover apparatus;
generate third information based on first information and second information, wherein the first information is randomly selected by the verifier apparatus and the second information is obtained at a time of the generation of the message,
wherein a grouping length of the group of the number of bits of the binary random number sequence is such that a probability of N or more ternary numerals that are unextractable is below a threshold probability,
wherein N is a number of times of execution of a session protocol that corresponds to the challenge-response information; and
erase the challenge-response information from the memory after the execution of the document authentication based on the public-key authentication scheme or the digital signature scheme, wherein an amount of the memory required for repeated execution of the document authentication is reduced by erasure of the challenge-response information shared between the entities.

7. The information processing apparatus according to claim 1,
wherein the challenge-response information is a seed of the binary random number sequence,
wherein the function is a random number generator configured to generate the binary random number sequence, and
wherein the binary random number sequence is generated based on the seed.

8. The information processing apparatus according to claim 1, wherein the one or more processors are further configured to:
supply the verifier apparatus with response information, wherein the response information corresponds to a verification pattern which the verifier apparatus selects from among k (where k≥3) verification patterns,
wherein the vector s is a secret key,
wherein the pair of multi-order multivariate polynomials F and the vectors y are public keys, wherein the response information is information selected from among a pair of random numbers and the message based on the verification pattern, wherein the message is information obtained based on the verification pattern that corresponds to the response information, and wherein the message is based on the public keys and the response information.

9. The information processing apparatus according to claim 1, wherein the one or more processors are further configured to:

store the pair of multi-order multivariate polynomials F=(f1, . . . , fm) defined in the ring K and vectors y=(y1, . . . , ym)=(f1(s), . . . , fm(s));

acquire the message, wherein the message is generated based on the stored pair of multi-order multivariate polynomials F and the vector s;

transmit, via the communication network, to the prover apparatus the message with information on a verification pattern randomly selected from among k (where k≥3) verification patterns;

acquire response information that corresponds to the selected verification pattern from the prover apparatus; and verify that the prover apparatus stores the vector s based on the message, the pair of multi-order multivariate polynomials F, the vectors y, and the response information, wherein the vector s is a secret key, wherein the pair of multi-order multivariate polynomials F and the vectors y are public keys, wherein the message is information obtained based on the selected verification pattern that corresponds to the response information, and wherein the response information is based on the public keys and the response information.

10. The information processing apparatus according to claim 1 wherein the one or more processors are further configured to:

transmit, via the communication network, the third information to the verifier apparatus; and supply the verifier apparatus with response information that corresponds to a verification pattern, wherein the verifier apparatus selects the verification pattern from among k (where k≥2) verification patterns, wherein the vector s is a secret key, wherein the pair of multi-order multivariate polynomials F and the vectors y are public keys, wherein the response information is information selected from among messages based on the verification pattern, wherein the message is information obtained based on the verification pattern that corresponds to the response information, and wherein the message is based on the public keys, the first information, the third information, and the response information.

11. The information processing apparatus according to claim 1, wherein the one or more processors are further configured to:

store the pair of multi-order multivariate polynomials F=(f1, . . . , fm) defined in the ring K and vectors y=(y1, . . . , ym)=(f1(s), . . . , fm(s));

acquire the message, wherein the message is generated based on the stored pair of multi-order multivariate polynomials F and the vector s;

transmit, via the communication network, to the prover apparatus the message with the randomly selected first information;

acquire the third information which the prover apparatus generates based on the first information and the second information;

supply the prover apparatus with information on a verification pattern randomly selected from among k (where k≥3) verification patterns;

acquire response information that corresponds to the selected verification pattern from the prover apparatus; and verify that the prover apparatus stores the vector s, wherein the verification is based on the message, the first information, the third information, the pair of multi-order multivariate polynomials F, and the response information, wherein the vector s is a secret key, wherein the pair of multi-order multivariate polynomials F and the vectors y are public keys, wherein the message is information obtained based on the verification pattern that corresponds to the response information, and wherein the message is based on the public keys, the first information, the third information, and the response information.

12. The information processing apparatus according to claim 1, wherein the one or more processors are further configured to generate the numbers once and execute the allocation process once, based on the execution of the document authentication repeatedly a plurality of times, and wherein the document authentication repeatedly uses allocated coefficients.

13. The information processing apparatus according to claim 1, wherein the one or more processors are further configured to:

generate a digital signature for a document M based on the pair of multi-order multivariate polynomials F=(f1, . . . , fm) defined in the ring K and a signature key, wherein the signature key is the element of the set $K^n$, and transmit, via the communication network, the digital signature to the verifier apparatus, wherein the verifier apparatus stores the pair of multi-order multivariate polynomials F and vectors y=(f1(s), . . . , fm(s)).

14. An information processing method, comprising:

storing challenge-response information in a memory;

generating numbers used in coefficients of terms included in a pair of multi-order multivariate polynomials F=(f1, . . . , fm), wherein the pair of multi-order multivariate polynomials F is based on a function, wherein the numbers are generated based on the challenge-response information shared between entities executing document authentication, wherein the document authentication is based on a public-key authentication scheme or a digital signature scheme that uses a public key, wherein the public key includes the pair of multi-order multivariate polynomials F, and wherein the numbers are generated based on a group of a number of bits of a binary random number sequence;

allocating the generated numbers to the coefficients of the multi-order multivariate polynomials, wherein the coefficients are constituent elements of the pair of multi-order multivariate polynomials F, grouping a set of coefficients of the terms having an identical kind of combination of variables among the coefficients of the multi-order multivariate polynomials;
executing an allocation process based on the group;
generating a message based on the pair of multi-order multivariate polynomials F defined in a ring K and a vector s, where the vector s is an element of a set $K^n$;
transmitting, via a communication network, the message to a verifier apparatus,
wherein the verifier apparatus stores the pair of multi-order multivariate polynomials F and vectors y=(y1, . . . , ym)=(f1(s), . . . , fm(s)), and
wherein the verifier apparatus uses the pair of multi-order multivariate polynomials F for authentication of a prover apparatus;
generating third information based on first information and second information, wherein the first information is randomly selected by the verifier apparatus and the second information is obtained at a time of the generation of the message,
wherein a grouping length of the group of the number of bits of the binary random number sequence is such that a probability of N or more ternary numerals that are unextractable is below a threshold probability, and
wherein N is a number of times of execution of a session protocol corresponding to the challenge-response information; and
erasing the challenge-response information from the memory after the execution of the document authentication based on the public-key authentication scheme or the digital signature scheme, wherein an amount of the memory required for repeated execution of the document authentication is reduced by the erasure of the challenge-response information shared between the entities.

15. An information processing method, comprising:
storing challenge-response information in a memory;
generating numbers used in coefficients of terms included in a pair of multi-order multivariate polynomials F=(f1, . . . , fm),
wherein the pair of multi-order multivariate polynomials F is based on a function,
wherein the numbers are generated based on the challenge-response information shared between entities executing document authentication,
wherein the document authentication is based on a public-key authentication scheme or a digital signature scheme that uses a public key,
wherein the public key includes the pair of multi-order multivariate polynomials F, and
wherein the numbers are generated based on a group of a number of bits of a binary random number sequence; and
allocating the generated numbers to the coefficients of the multi-order multivariate polynomials, wherein the coefficients are constituent elements of the pair of multi-order multivariate polynomials F;
grouping a coefficient matrix in each row or column based on an expression of the multi-order multivariate polynomials for which the pair of multi-order multivariate polynomials F are included in the constituent elements in a quadratic form;
executing an allocation process based on the group;
generating a message based on the pair of multi-order multivariate polynomials F defined in a ring K and a vector s, where the vector s is an element of a set $K^n$;
transmitting, via a communication network, the message to a verifier apparatus,
wherein the verifier apparatus stores the pair of multi-order multivariate polynomials F and vectors y=(y1, . . . , ym)=(f1(s), . . . , fm(s)), and
wherein the verifier apparatus uses the pair of multi-order multivariate polynomials F for authentication of a prover apparatus;
generating third information based on first information and second information, wherein the first information is randomly selected by the verifier apparatus and the second information is obtained at a time of the generation of the message,
wherein a grouping length of the group of the number of bits of the binary random number sequence is such that a probability of N or more ternary numerals that are unextractable is below a threshold probability, and
wherein N is a number of times of execution of a session protocol corresponding to the challenge-response information; and
erasing the challenge-response information from the memory after the execution of the document authentication based on the public-key authentication scheme or the digital signature scheme, wherein an amount of the memory required for repeated execution of the document authentication is reduced by the erasure of the challenge-response information shared between the entities.

16. An information processing method, comprising:
storing challenge-response information in a memory;
generating an identical number of numbers with a number of coefficients of terms included in a pair of multi-order multivariate polynomials F=(f1, . . . , fm),
wherein the pair of multi-order multivariate polynomials F is based on a function,
wherein the numbers are generated based on the challenge-response information shared between entities executing document authentication,
wherein the document authentication is based on a public-key authentication scheme or a digital signature scheme that uses a public key,
wherein the public key includes the pair of multi-order multivariate polynomials F, and
wherein the numbers are generated based on a group of a number of bits of a binary random number sequence; and
allocating the generated numbers to the coefficients of the multi-order multivariate polynomials, wherein the coefficients are constituent elements of the pair of multi-order multivariate polynomials F,
wherein the generated numbers are allocated in a sequence determined in advance between a prover apparatus and a verifier apparatus;
generating a message based on the pair of multi-order multivariate polynomials F defined in a ring K and a vector s, where the vector s is an element of a set $K^n$;
transmitting, via a communication network, the message to the verifier apparatus,
wherein the verifier apparatus stores the pair of multi-order multivariate polynomials F and vectors y=(y1, . . . , ym)=(f1(s), . . . , fm(s)), and
wherein the verifier apparatus uses the pair of multi-order multivariate polynomials F for authentication of the prover apparatus;
generating third information based on first information and second information, wherein the first information is randomly selected by the verifier apparatus and the second information is obtained at a time of the generation of the message, wherein a grouping length of the group of the number of bits of the binary random number sequence is such that a probability of N or more ternary numerals that are unextractable is below a threshold probability, and wherein N is a number of times of execution of a session protocol corresponding to the challenge-response information; and erasing the challenge-response information from the memory after the execution of the document authentication based on the public-key authentication scheme or the digital signature scheme, wherein an amount of the memory required for repeated execution of the document authentication is reduced by the erasure of the challenge-response information shared between the entities.

17. A non-transitory computer-readable medium having stored thereon, computer-executable instructions, which when executed by a computer, cause the computer to execute operations, the operations comprising:

storing challenge-response information in a memory;

generating numbers used in coefficients of terms included in a pair of multi-order multivariate polynomials $F=(f1, \ldots, fm)$, wherein the pair of multi-order multivariate polynomials F is based on a function, wherein the numbers are generated based on the challenge-response information shared between entities executing document authentication, wherein the document authentication is based on a public-key authentication scheme or a digital signature scheme that uses a public key, wherein the public key includes the pair of multi-order multivariate polynomials F, and wherein the numbers are generated based on a group of a number of bits of a binary random number sequence;

allocating the generated numbers to the coefficients of the multi-order multivariate polynomials, wherein the coefficients are constituent elements of the pair of multi-order multivariate polynomials F; and grouping a set of coefficients of the terms having an identical kind of combination of variables among the coefficients of the multi-order multivariate polynomials;

executing an allocation process based on the group;

generating a message based on the pair of multi-order multivariate polynomials F defined in a ring K and a vector s, where the vector s is an element of a set $K^n$;

transmitting, via a communication network, the message to a verifier apparatus, wherein the verifier apparatus stores the pair of multi-order multivariate polynomials F and vectors $y=(y1, \ldots, ym)=(f1(s), \ldots, fm(s))$, and wherein the verifier apparatus uses the pair of multi-order multivariate polynomials F for authentication of a prover apparatus;

generating third information based on first information and second information, wherein the first information is randomly selected by the verifier apparatus and the second information is obtained at a time of the generation of the message, wherein a grouping length of the group of the number of bits of the binary random number sequence is such that a probability of N or more ternary numerals that are unextractable is below a threshold probability, and wherein N is a number of times of execution of a session protocol corresponding to the challenge-response information; and erasing the challenge-response information from the memory after the execution of the document authentication based on the public-key authentication scheme or the digital signature scheme, wherein an amount of the memory required for repeated execution of the document authentication is reduced by the erasure of the challenge-response information shared between the entities.

18. A non-transitory computer-readable medium having stored thereon, computer-executable instructions, which when executed by a computer, cause the computer to execute operations, the operations comprising:

storing challenge-response information in a memory;

generating numbers used in coefficients of terms included in a pair of multi-order multivariate polynomials $F=(f1, \ldots, fm)$, wherein the pair of multi-order multivariate polynomials F is based on a function, wherein the numbers are generated based on the challenge-response information shared between entities executing document authentication, wherein the document authentication is based on a public-key authentication scheme or a digital signature scheme that uses a public key, wherein the public key includes the pair of multi-order multivariate polynomials F, and wherein the numbers are generated based on group of a number of bits of a binary random number sequence;

allocating the generated numbers to the coefficients of the multi-order multivariate polynomials, wherein the coefficients are constituent elements of the pair of multi-order multivariate polynomials F; and grouping a coefficient matrix in each row or column based on an expression of the multi-order multivariate polynomials for which the pair of multi-order multivariate polynomials F are included in the constituent elements in a quadratic form;

executing an allocation process based on the group;

generating a message based on the pair of multi-order multivariate polynomials F defined in a ring K and a vector s, where the vector s is an element of a set $K^n$;

transmitting, via a communication network, the message to a verifier apparatus, wherein the verifier apparatus stores the pair of multi-order multivariate polynomials F and vectors $y=(y1, \ldots, ym)=(f1(s), \ldots, fm(s))$, and wherein the verifier apparatus uses the pair of multi-order multivariate polynomials F for authentication of a prover apparatus;

generating third information based on first information and second information, wherein the first information is randomly selected by the verifier apparatus and the second information is obtained at a time of the generation of the message, wherein a grouping length of the group of the number of bits of the binary random number sequence is such that a probability of N or more ternary numerals that are unextractable is below a threshold probability, and wherein N is a number of times of execution of a session protocol corresponding to the challenge-response information; and erasing the challenge-response information from the memory after the execution of the document authentication based on the public-key authentication scheme or the digital signature scheme, wherein an amount of the memory required for repeated execution of the document authentication is reduced by the erasure of the challenge-response information shared between the entities.

19. A non-transitory computer-readable medium having stored thereon, computer-executable instructions, which when executed by a computer, cause the computer to execute operations, the operations comprising:

storing challenge-response information in a memory;

generating an identical number of numbers with a number of coefficients of terms included in a pair of multi-order multivariate polynomials $F=(f1, \ldots, fm)$, wherein the pair of multi-order multivariate polynomials F is based on a function, wherein the numbers are generated based on the challenge-response information shared between entities executing document authentication, wherein the document authentication is based on a public-key authentication scheme or a digital signature scheme that uses a public key, wherein the public key includes the pair of multi-order multivariate polynomials F, and wherein the numbers are generated based on a group of a number of bits of a binary random number sequence; and allocating the generated numbers to the coefficients of the multi-order multivariate polynomials, wherein the coefficients are constituent elements of the pair of multi-order multivariate polynomials F, and wherein the numbers are allocated in a sequence determined in advance between a prover apparatus and a verifier apparatus;

generating a message based on the pair of multi-order multivariate polynomials F defined in a ring K and a vector s, where the vector s is an element of a set $K^n$;

transmitting, via a communication network, the message to the verifier apparatus, wherein the verifier apparatus stores the pair of multi-order multivariate polynomials F and vectors $y=(y1, \ldots, ym)=(f1(s), \ldots, fm(s))$, and wherein the verifier apparatus uses the pair of multi-order multivariate polynomials F for authentication of the prover apparatus;

generating third information based on first information and second information, wherein the first information is randomly selected by the verifier apparatus and the second information is obtained at a time of the generation of the message, wherein a grouping length of the group the number of bits of the binary random number sequence is such that a probability of N or more ternary numerals that are unextractable is below a threshold probability, and wherein N is a number of times of execution of a session protocol corresponding to the challenge-response information; and erasing the challenge-response information from the memory after the execution of the document authentication based on the public-key authentication scheme or the digital signature scheme, wherein an amount of the memory required for repeated execution of the document authentication is reduced by the erasure of the challenge-response information shared between the entities.

* * * * *